(12) United States Patent
Sano et al.

(10) Patent No.: US 12,124,737 B2
(45) Date of Patent: Oct. 22, 2024

(54) STORAGE SYSTEM CAPABLE OF OPERATING AT A HIGH SPEED INCLUDING STORAGE DEVICE AND CONTROL DEVICE

(71) Applicant: Kioxia Corporation, Tokyo (JP)

(72) Inventors: Shintaro Sano, Kawasaki (JP); Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 339 days.

(21) Appl. No.: 17/574,922

(22) Filed: Jan. 13, 2022

(65) Prior Publication Data

US 2023/0106923 A1 Apr. 6, 2023

(30) Foreign Application Priority Data

Sep. 22, 2021 (JP) ................................ 2021-154547

(51) Int. Cl.
*G06F 3/06* (2006.01)

(52) U.S. Cl.
CPC .......... *G06F 3/0659* (2013.01); *G06F 3/0604* (2013.01); *G06F 3/0613* (2013.01); *G06F 3/0656* (2013.01); *G06F 3/0673* (2013.01)

(58) Field of Classification Search
CPC .... G06F 3/0659; G06F 3/0604; G06F 3/0613; G06F 3/0656; G06F 3/0673; G06F 3/0679
See application file for complete search history.

(56) References Cited

U.S. PATENT DOCUMENTS

| 6,415,373 | B1 * | 7/2002 | Peters | G06F 16/70 |
| | | | | 714/E11.034 |
| 8,838,879 | B2 * | 9/2014 | Yoshida | G06F 12/0607 |
| | | | | 710/52 |
| 9,727,503 | B2 | 8/2017 | Kagan et al. | |
| 10,061,743 | B2 | 8/2018 | Kamble et al. | |
| 10,423,568 | B2 | 9/2019 | Berman et al. | |
| 2016/0100027 | A1 * | 4/2016 | Haghighi | G06F 3/067 |
| | | | | 709/214 |
| 2021/0149599 | A1 | 5/2021 | Kajihara et al. | |
| 2022/0083269 | A1 | 3/2022 | Sano et al. | |
| 2023/0106923 | A1 | 4/2023 | Sano et al. | |

FOREIGN PATENT DOCUMENTS

| JP | 2021-81858 A | 5/2021 |
| JP | 2022-48716 A | 3/2022 |
| JP | 2023-45927 A | 4/2023 |

\* cited by examiner

*Primary Examiner* — Michelle T Bechtold
(74) *Attorney, Agent, or Firm* — Oblon, McClelland, Maier & Neustadt, L.L.P.

(57) ABSTRACT

A storage system includes: a storage device including a memory and a memory controller; a first device coupled to the storage device; and a control part. The control part is configured to: store, in a first storing device, a first order that orders the storage device to read first data from the memory; and store a second order in a second storing device. The second order orders the first device to transmit a first request to the storage device. The first request requests the first data to be transferred to the first device. The first device is configured to start processing the second order before completion of the reading of the first data from the memory.

20 Claims, 57 Drawing Sheets

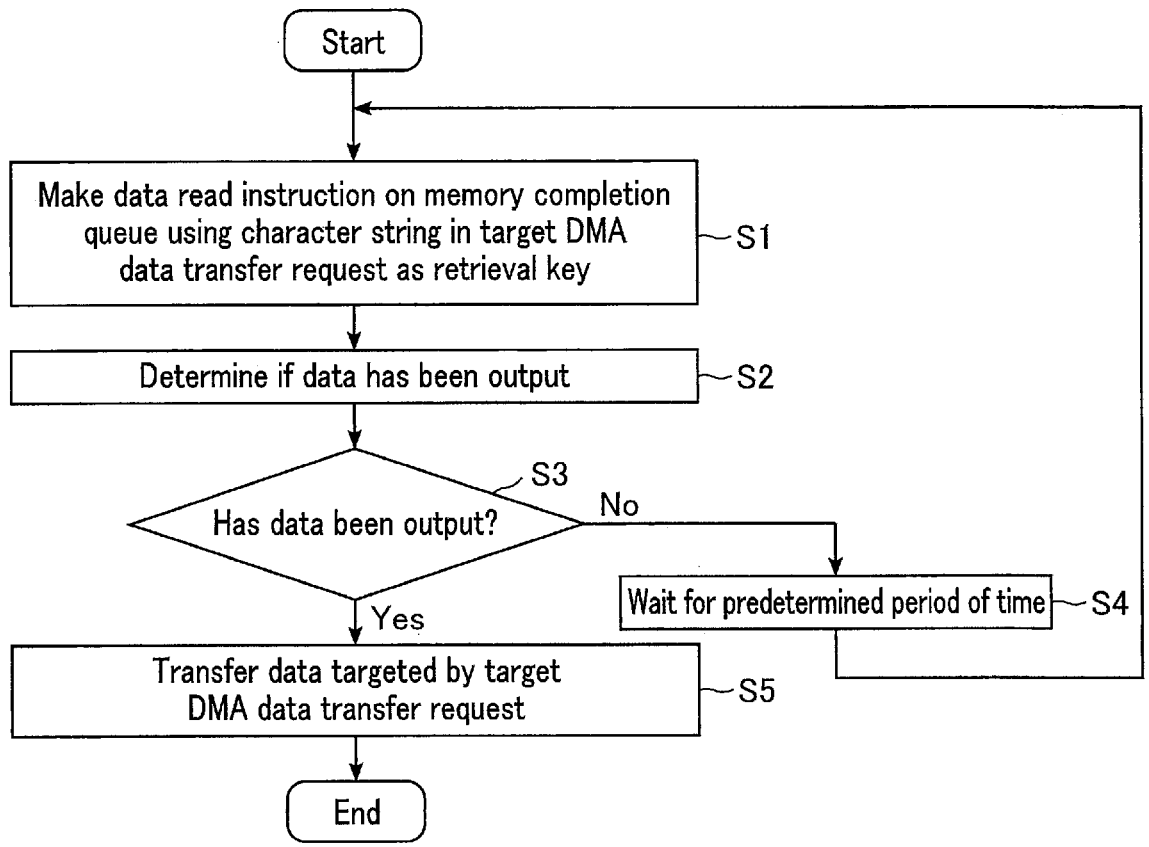
F I G. 4

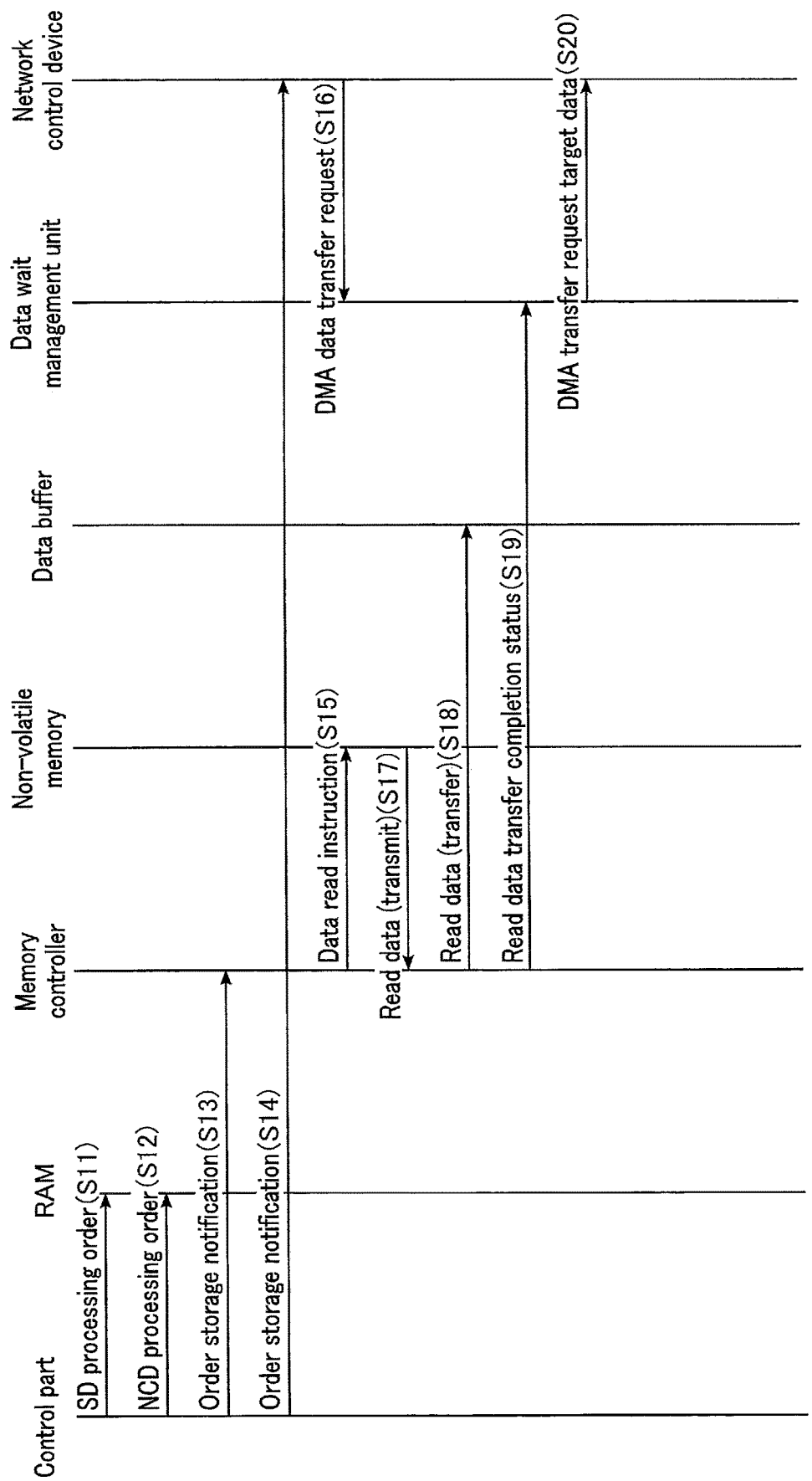
F I G. 5

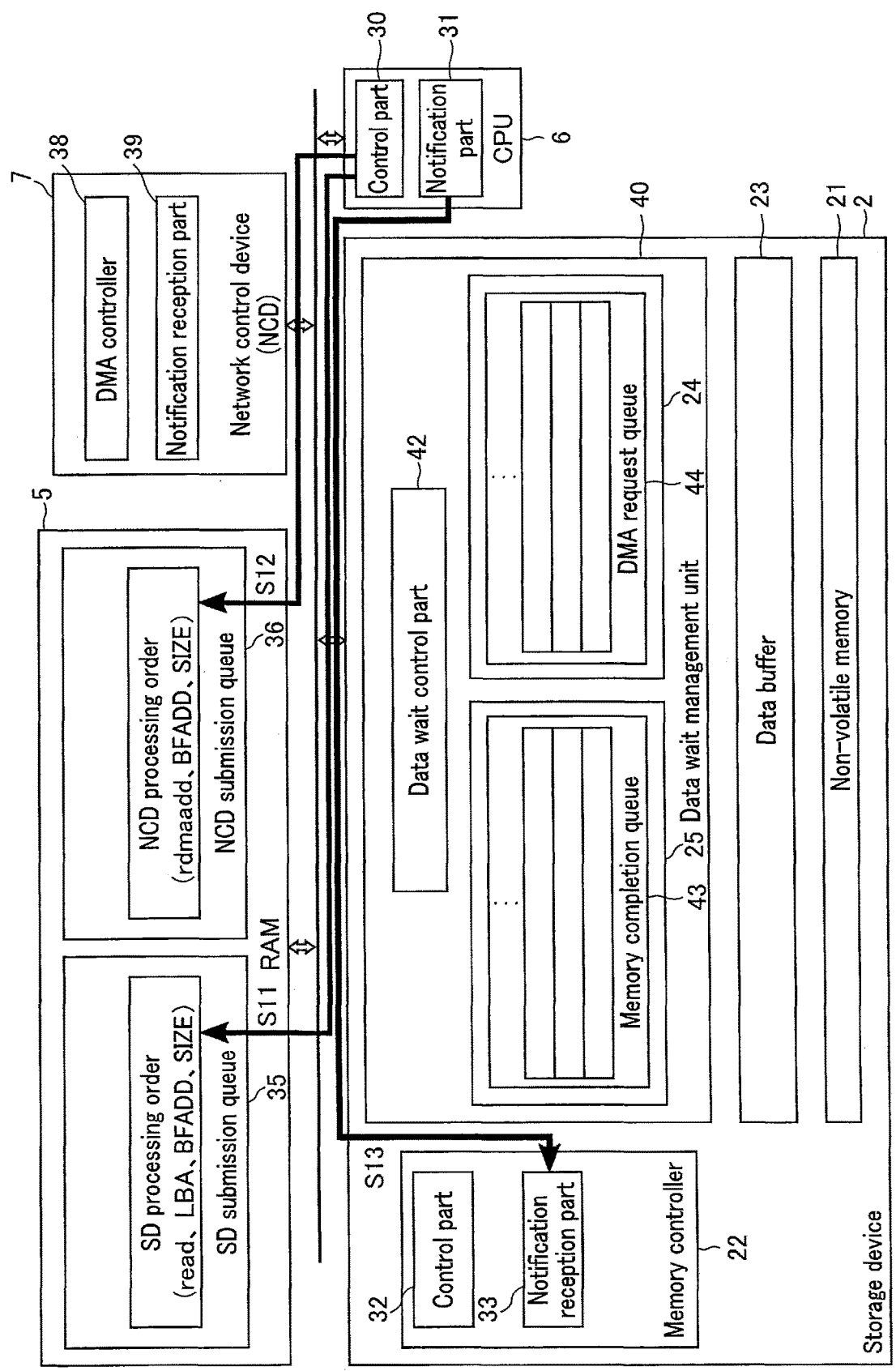
F I G. 6

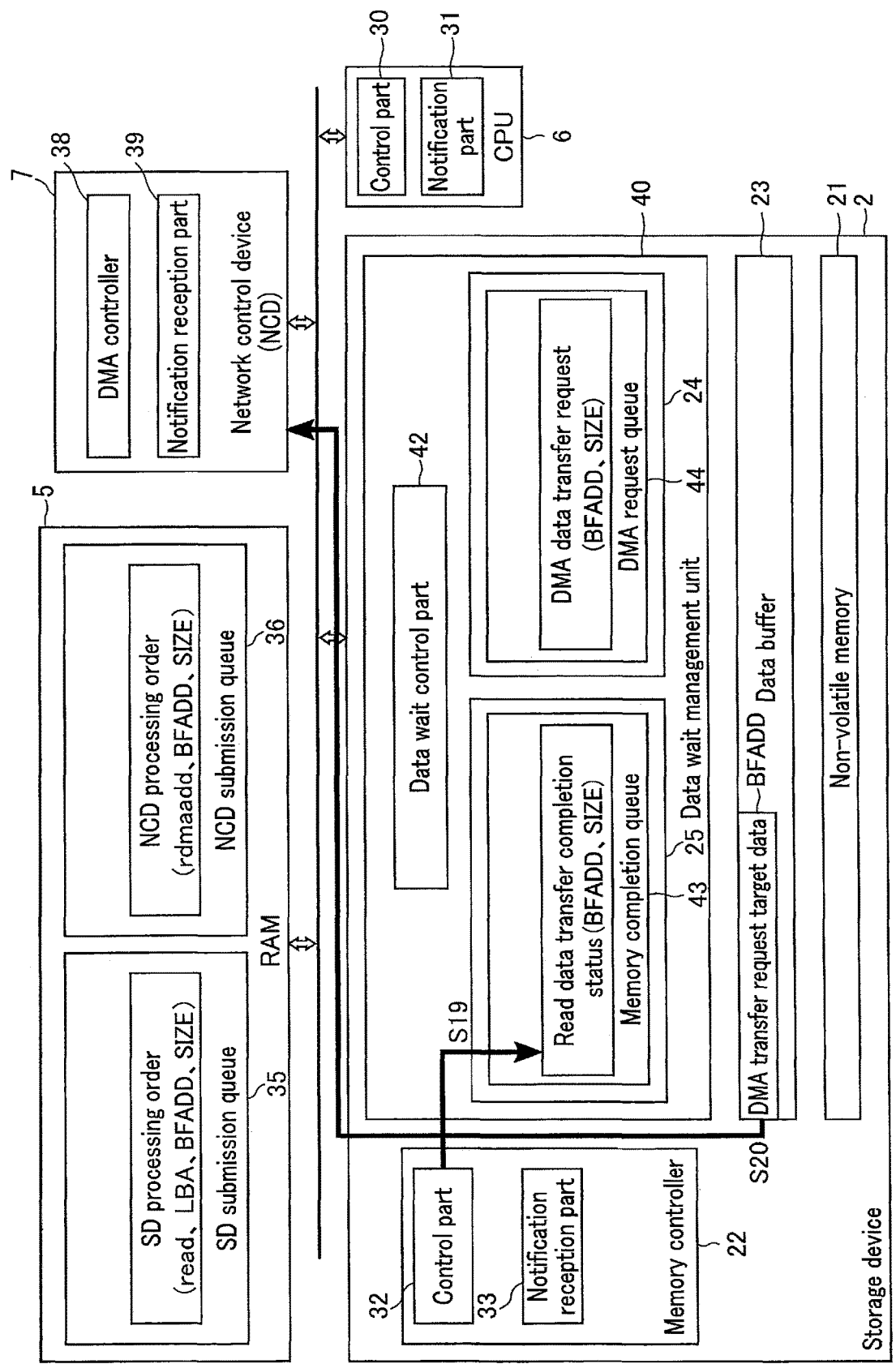
F I G. 8

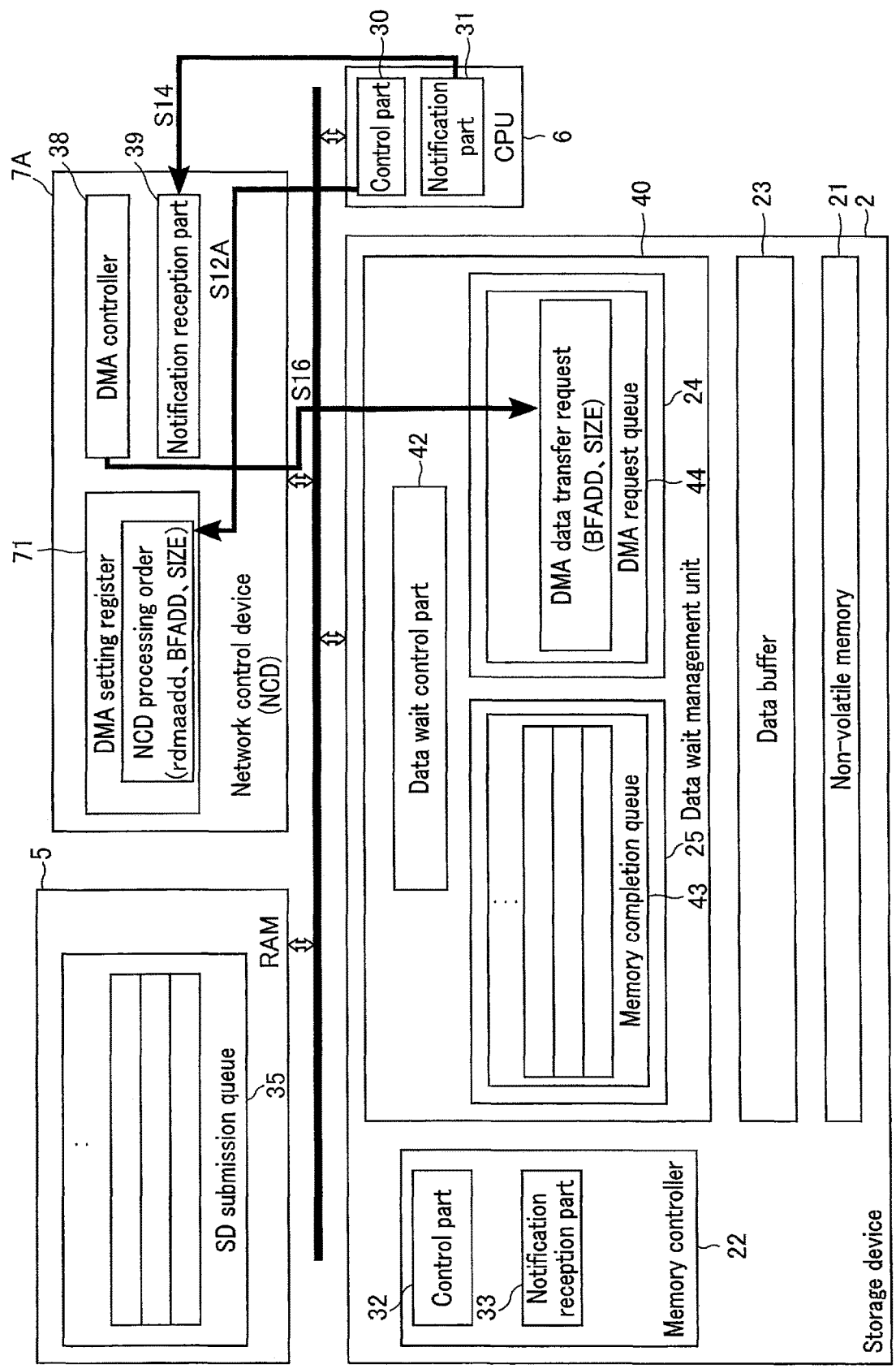
F I G. 12

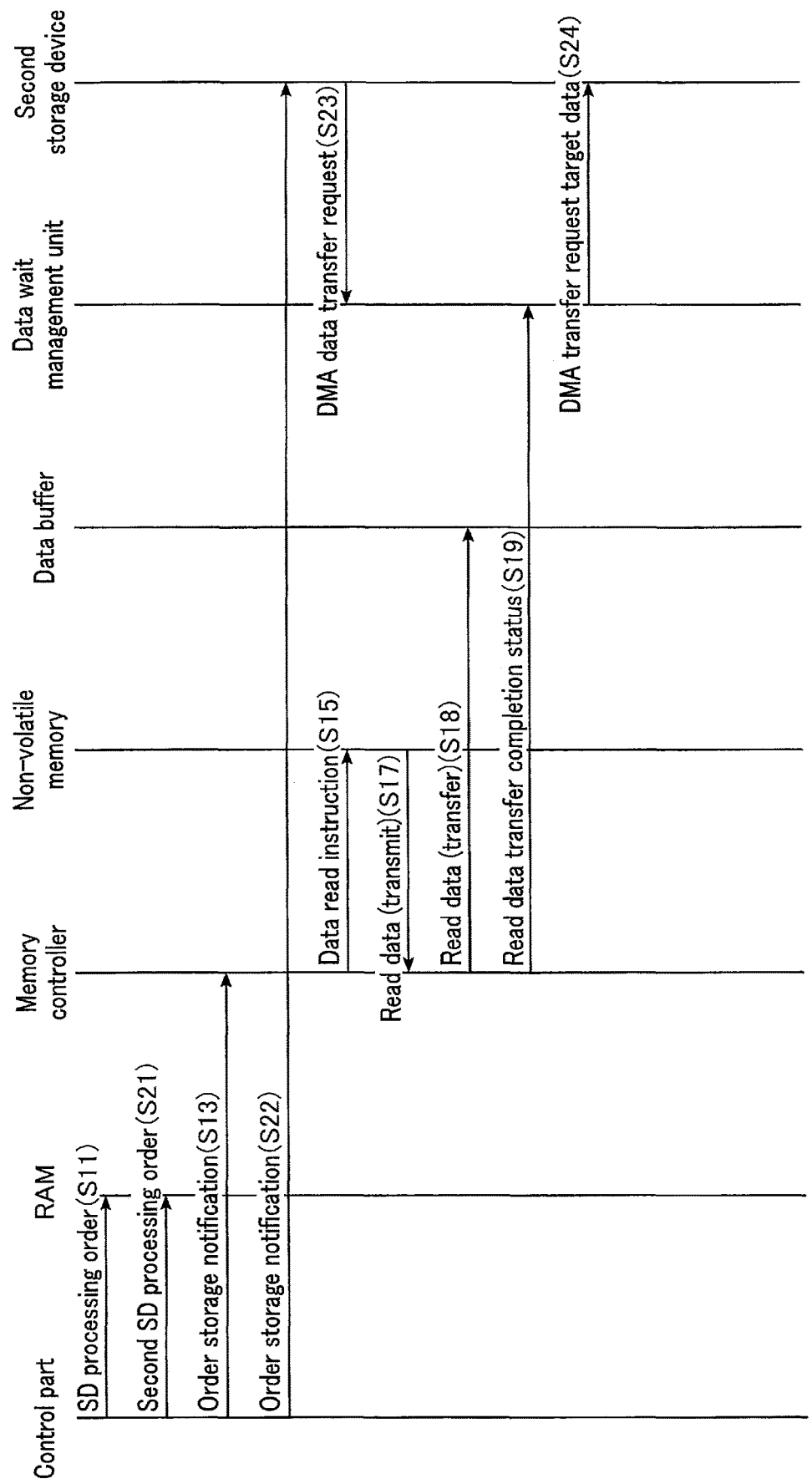
F I G. 15

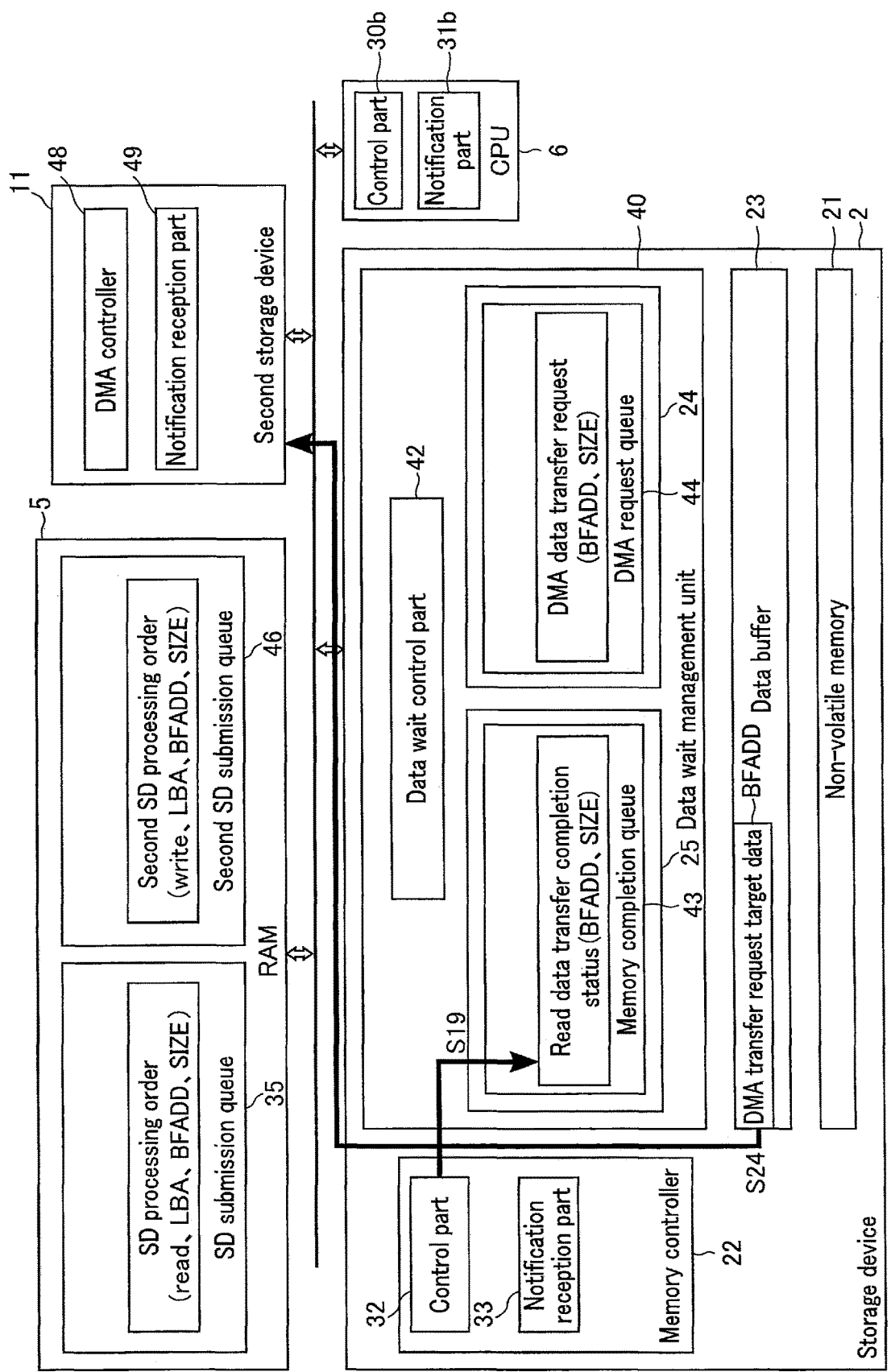
F I G. 18

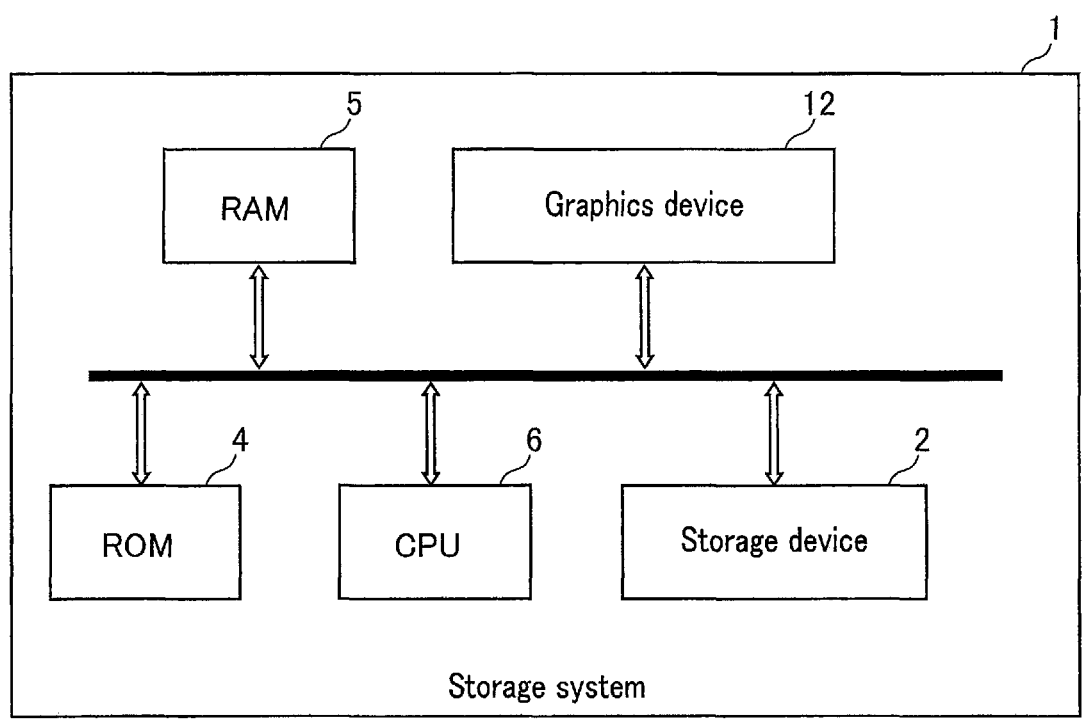
F I G. 19

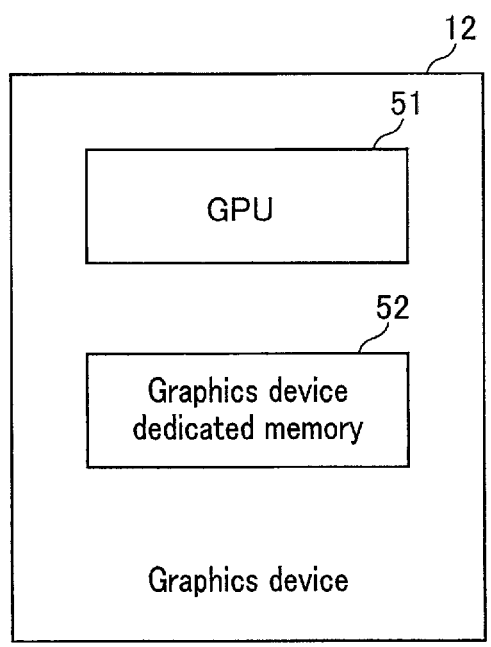
F I G. 20

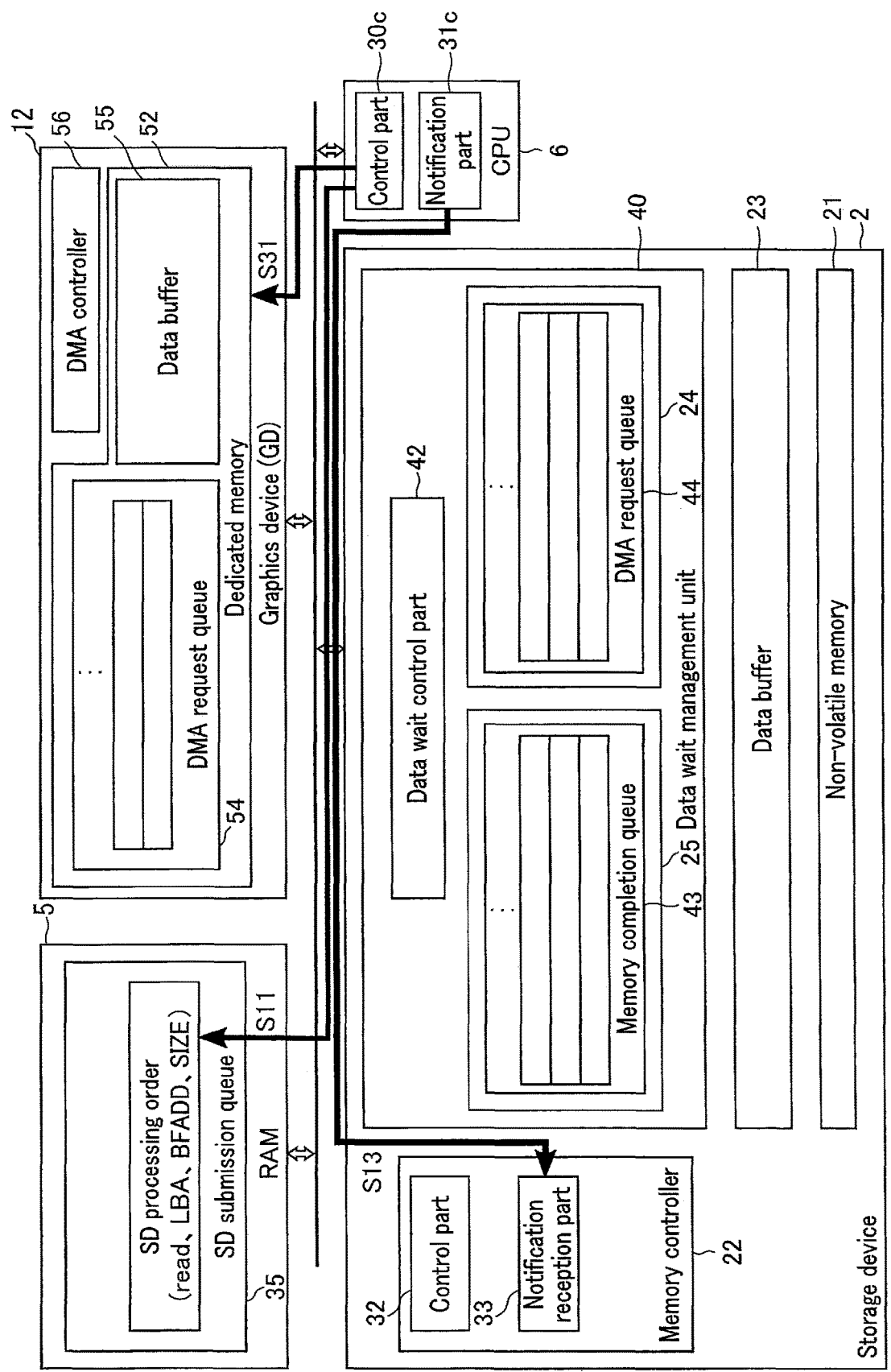
F I G. 23

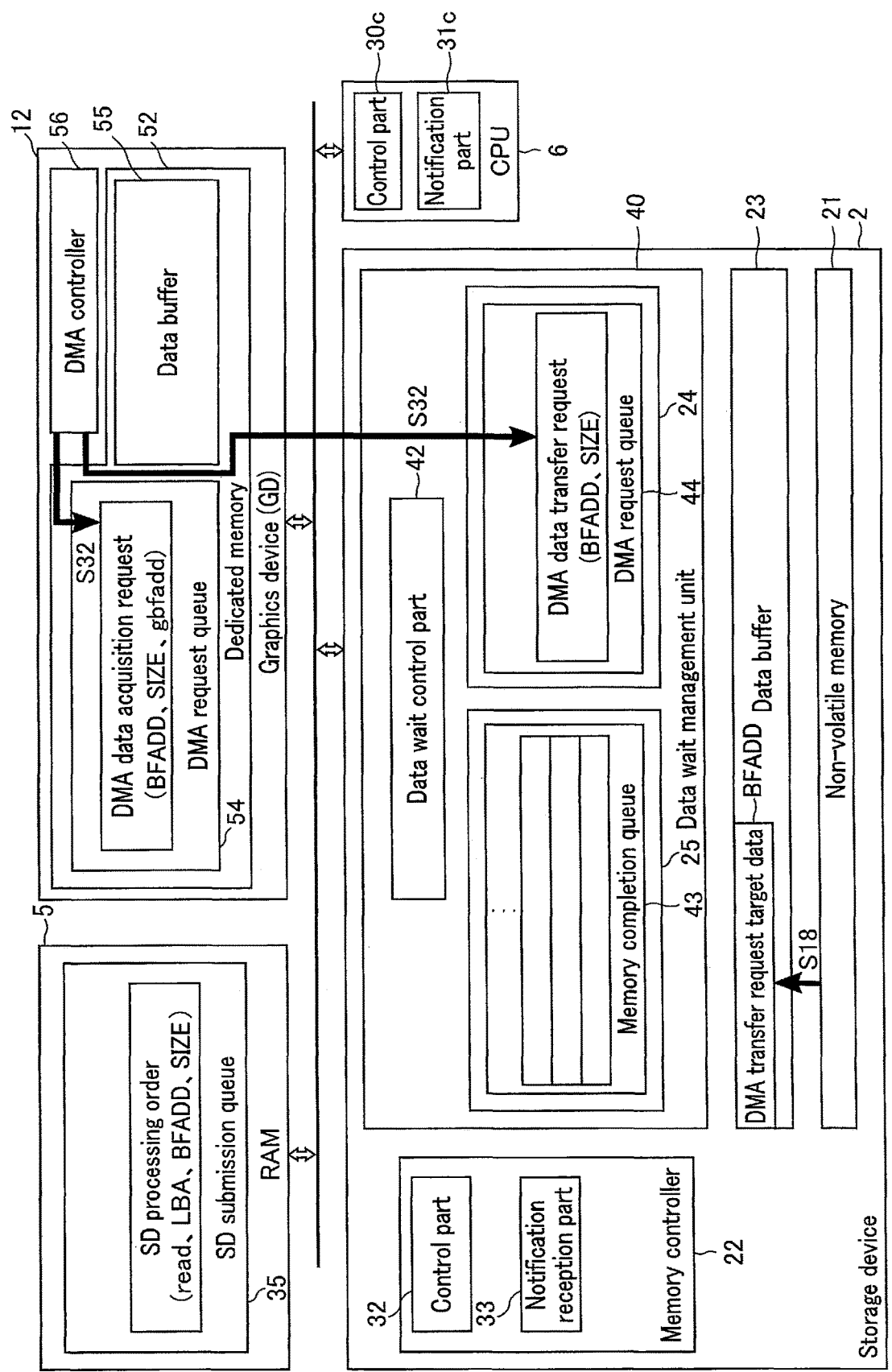
F I G. 24

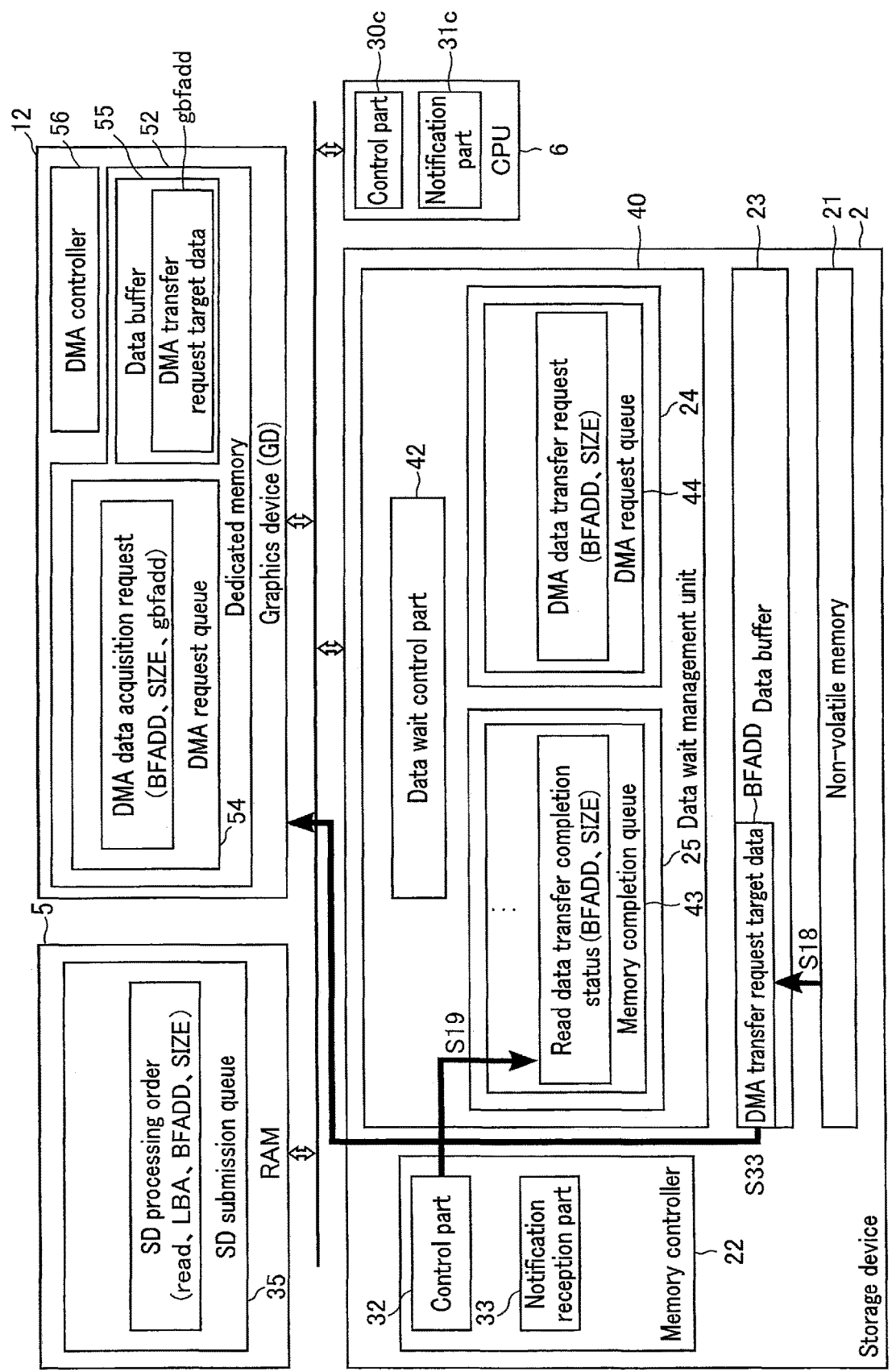
F I G. 25

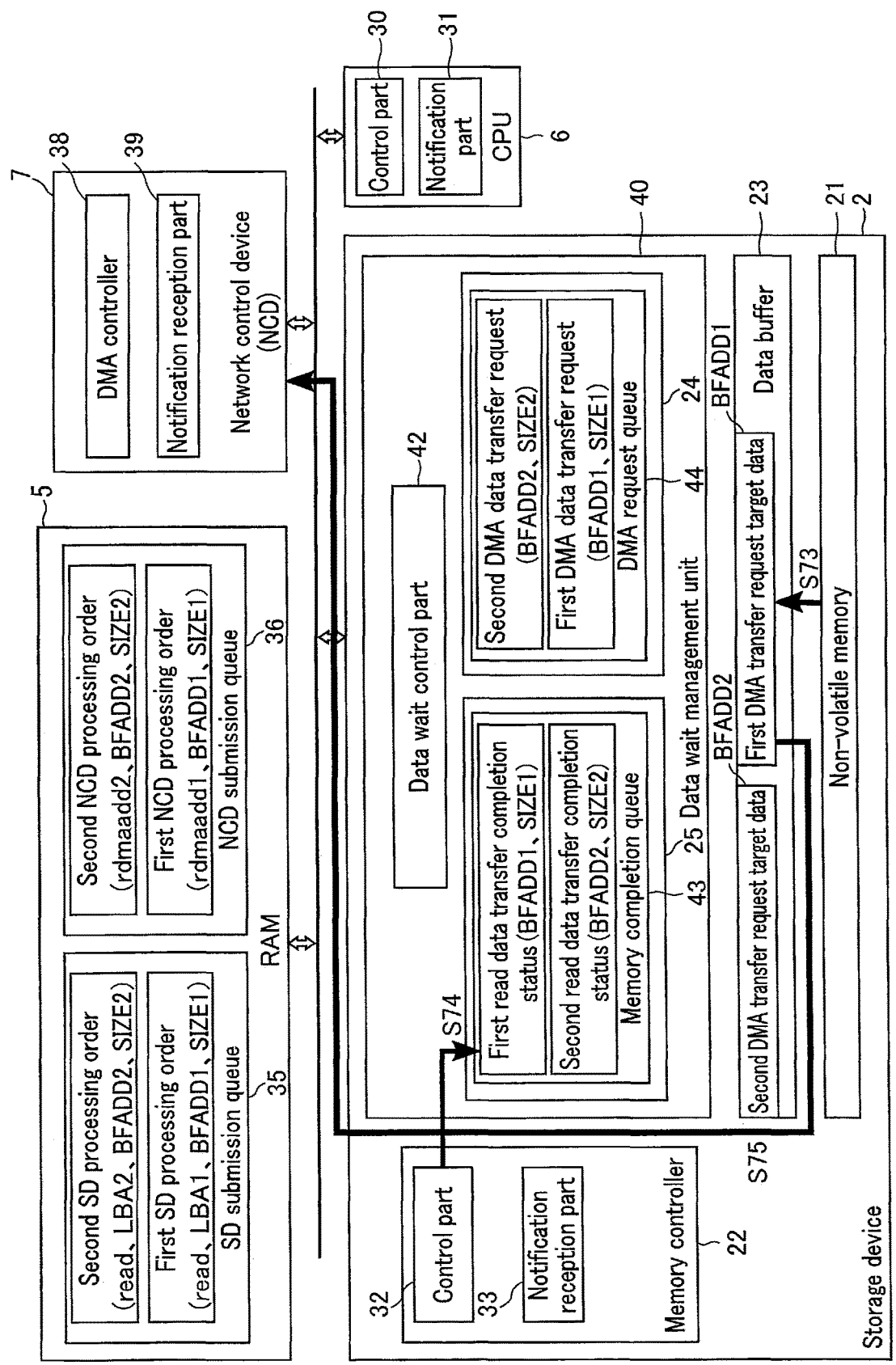
F I G. 30

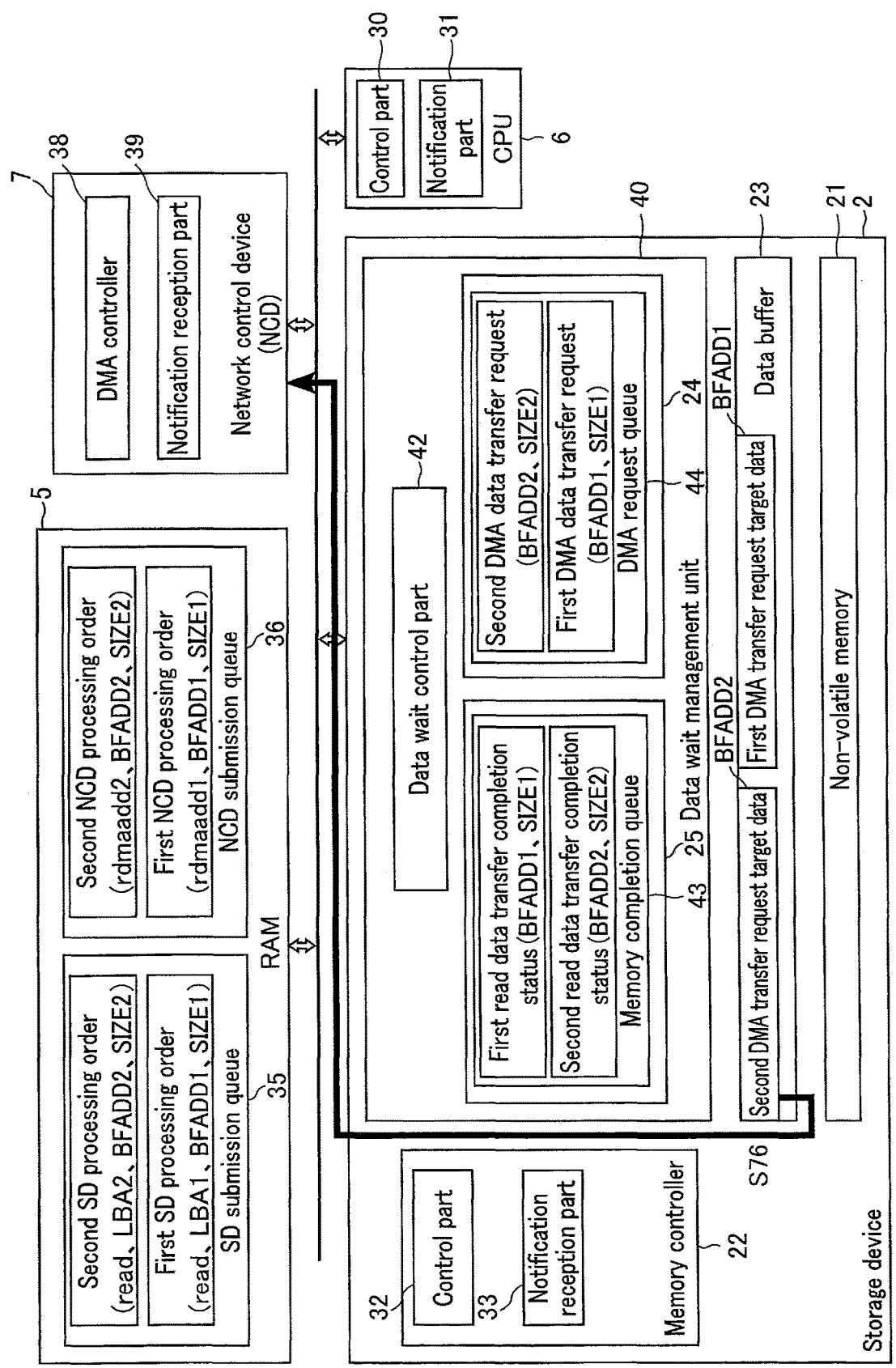
F I G. 31

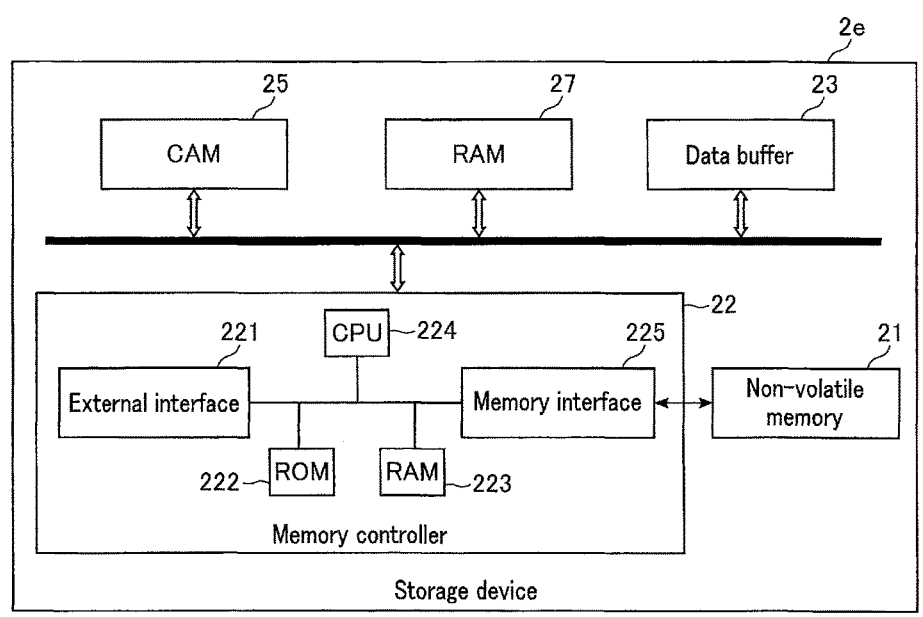
F I G. 32

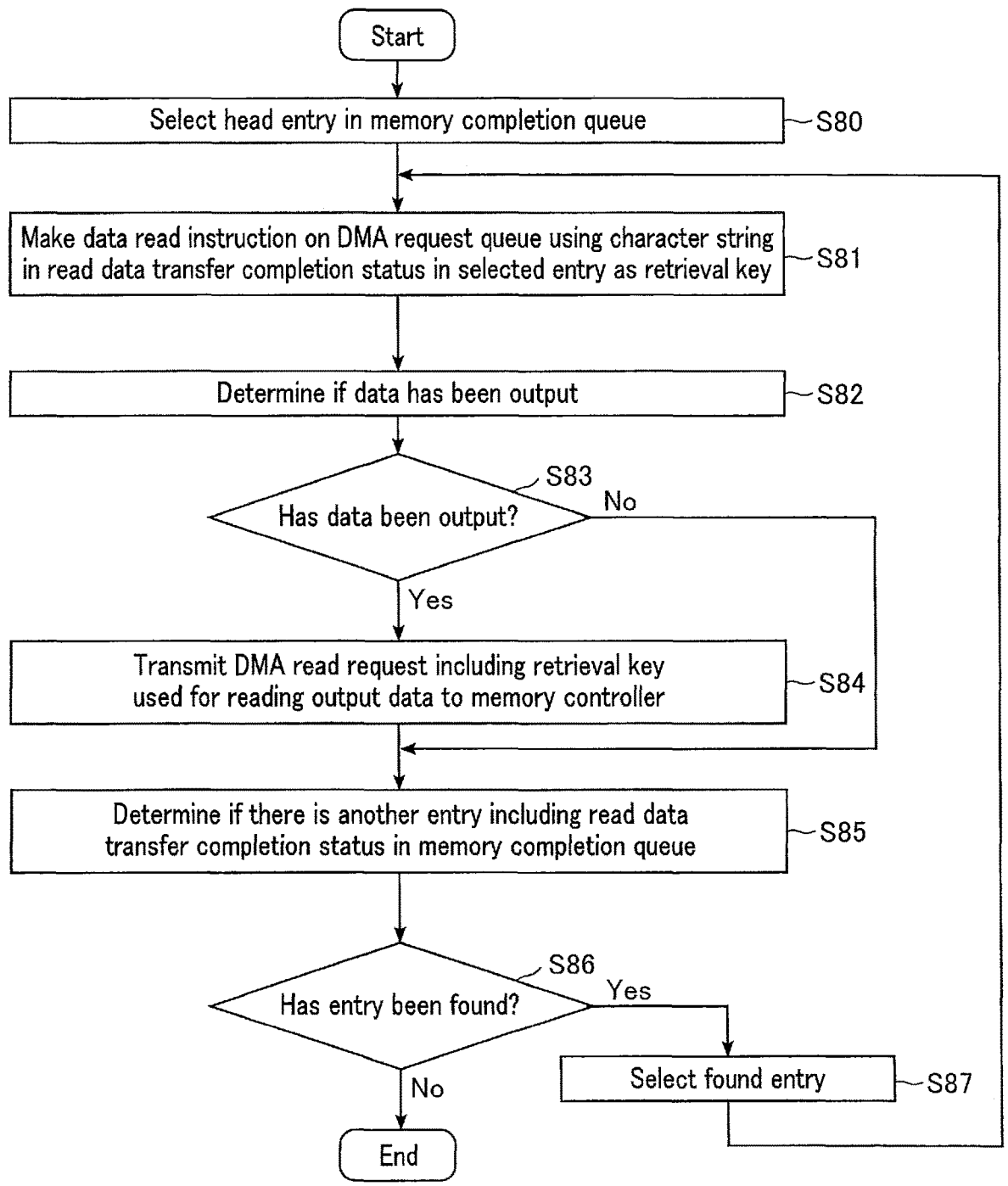
F I G. 34

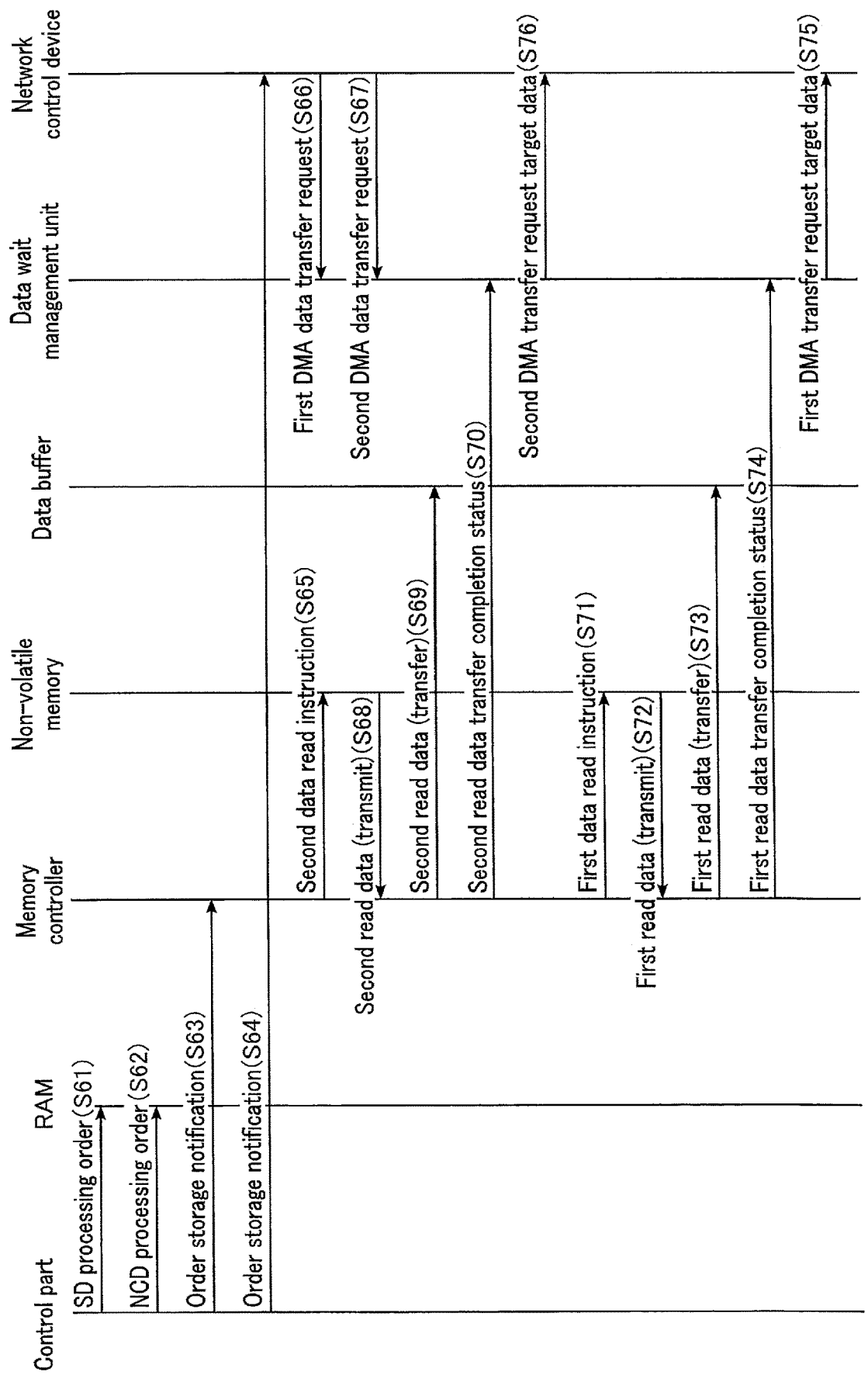
F I G. 35

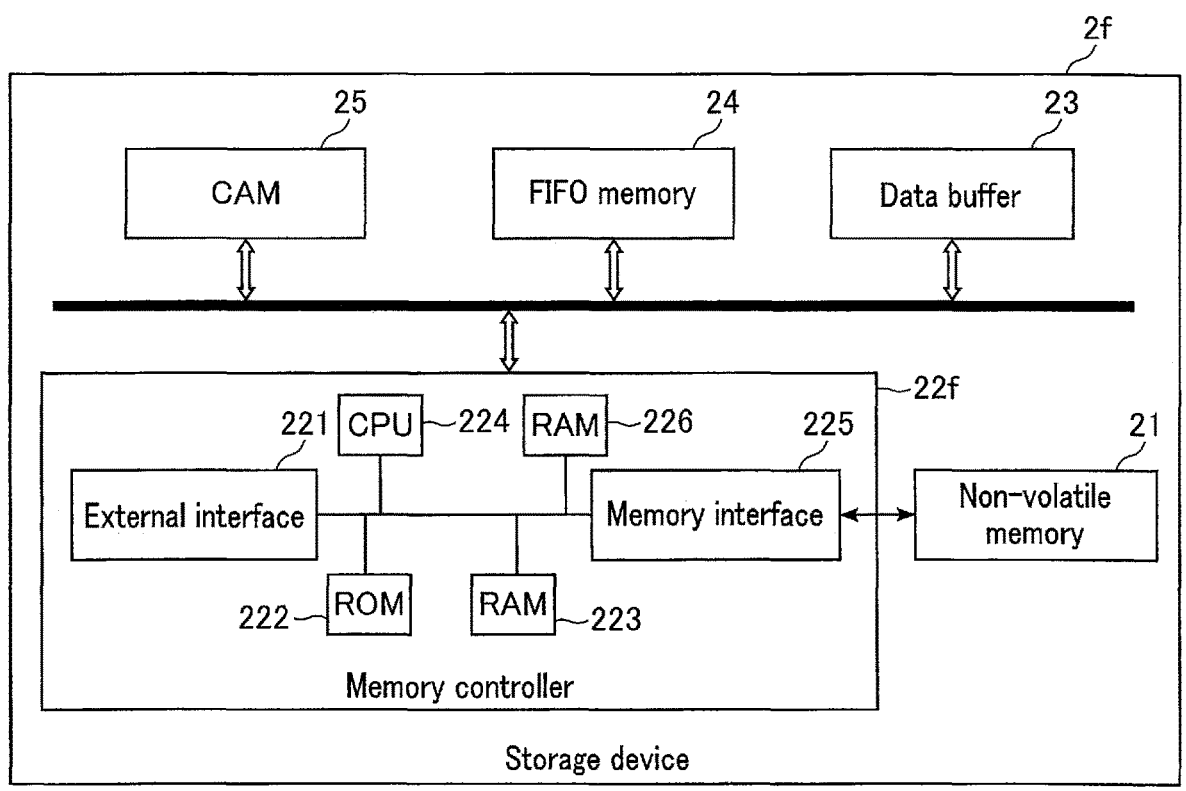
F I G. 36

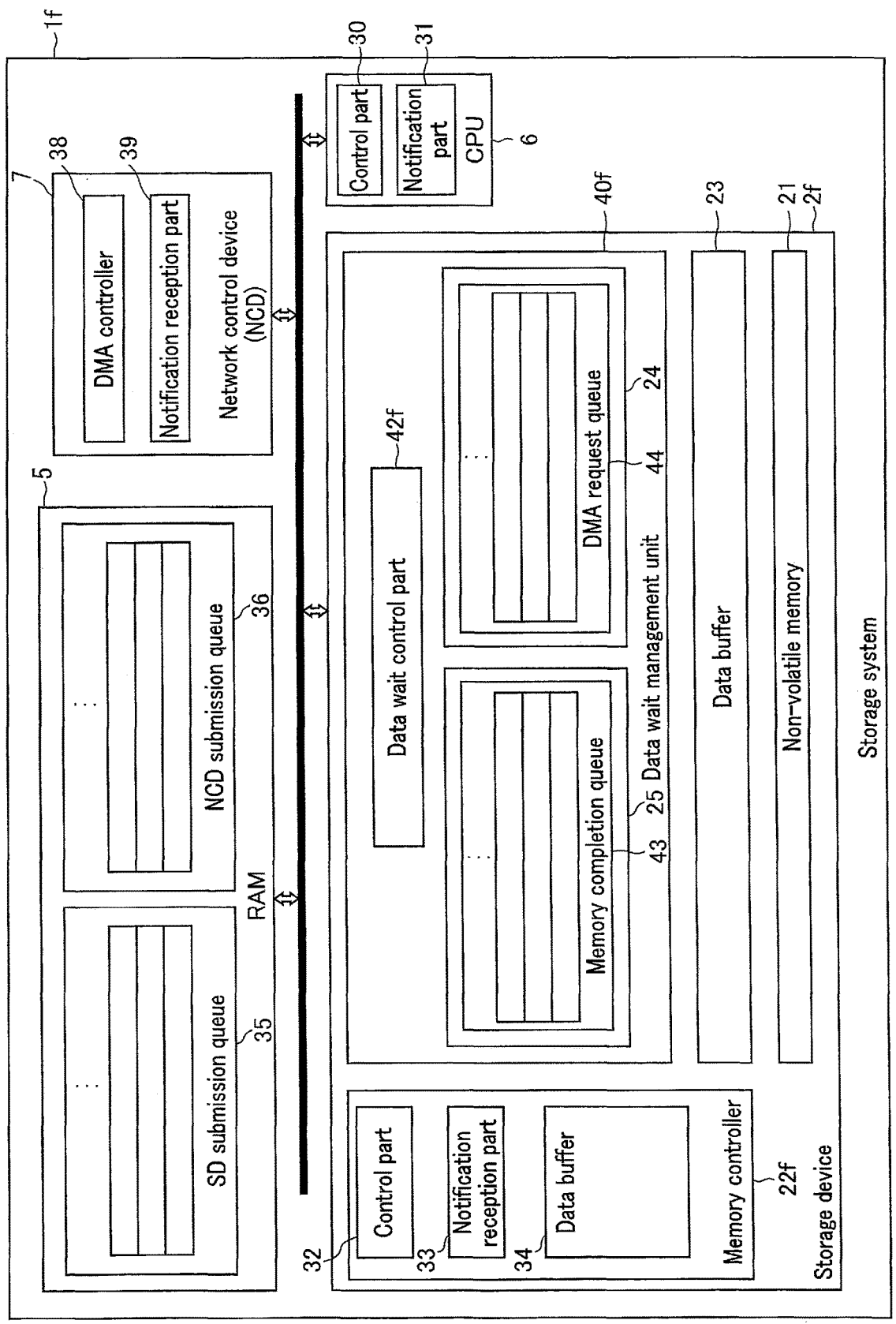
F I G. 37

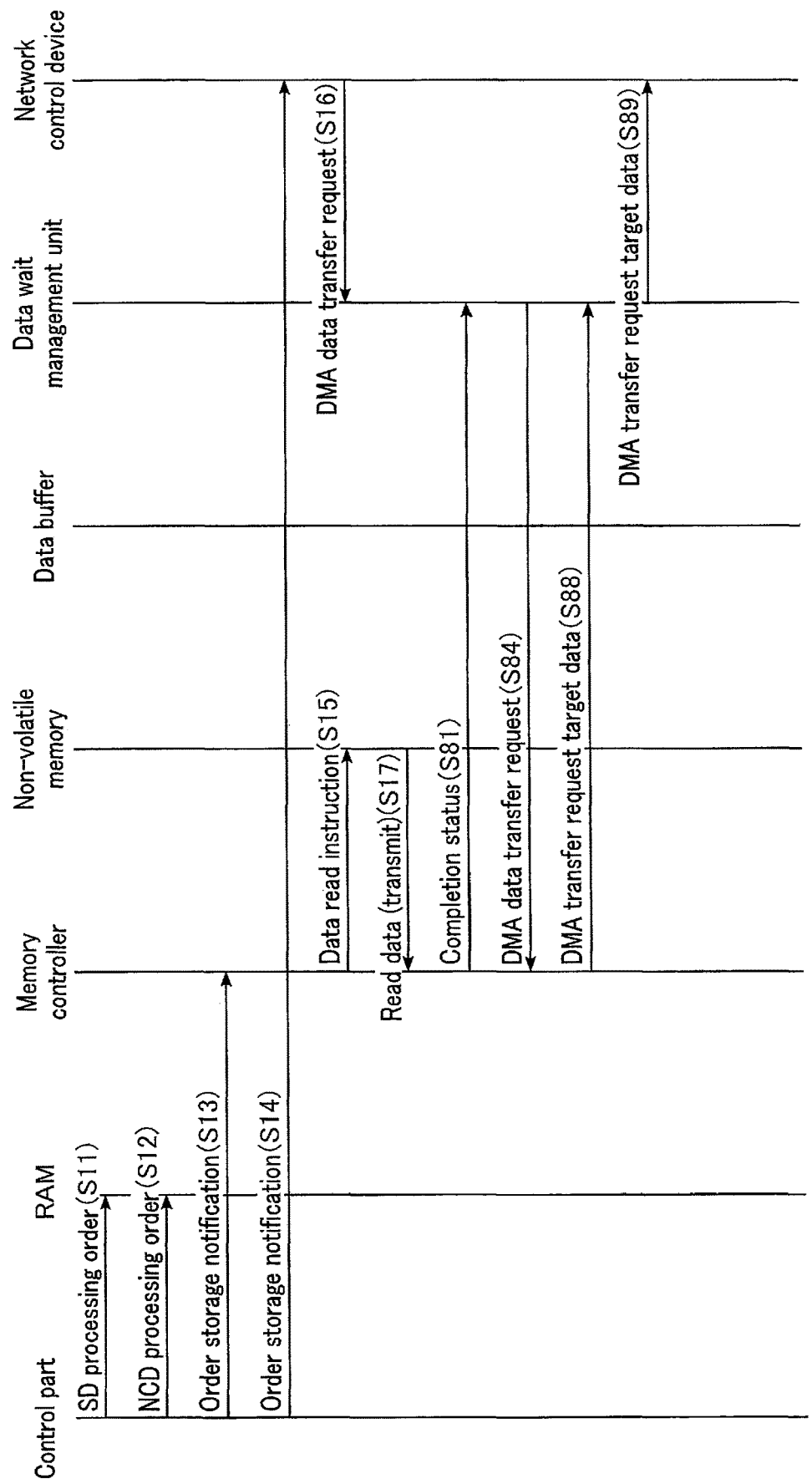
F I G. 39

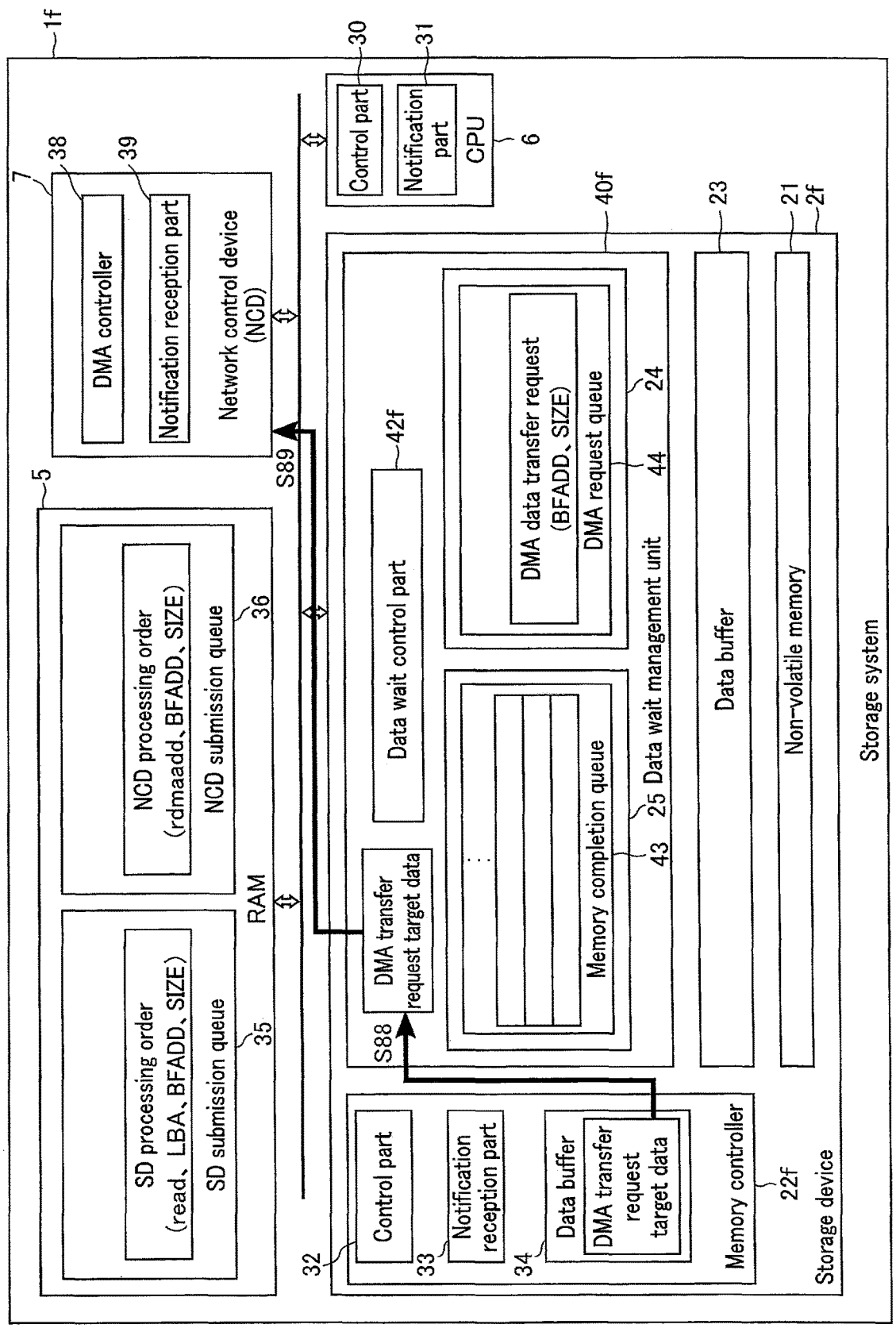
F I G. 43

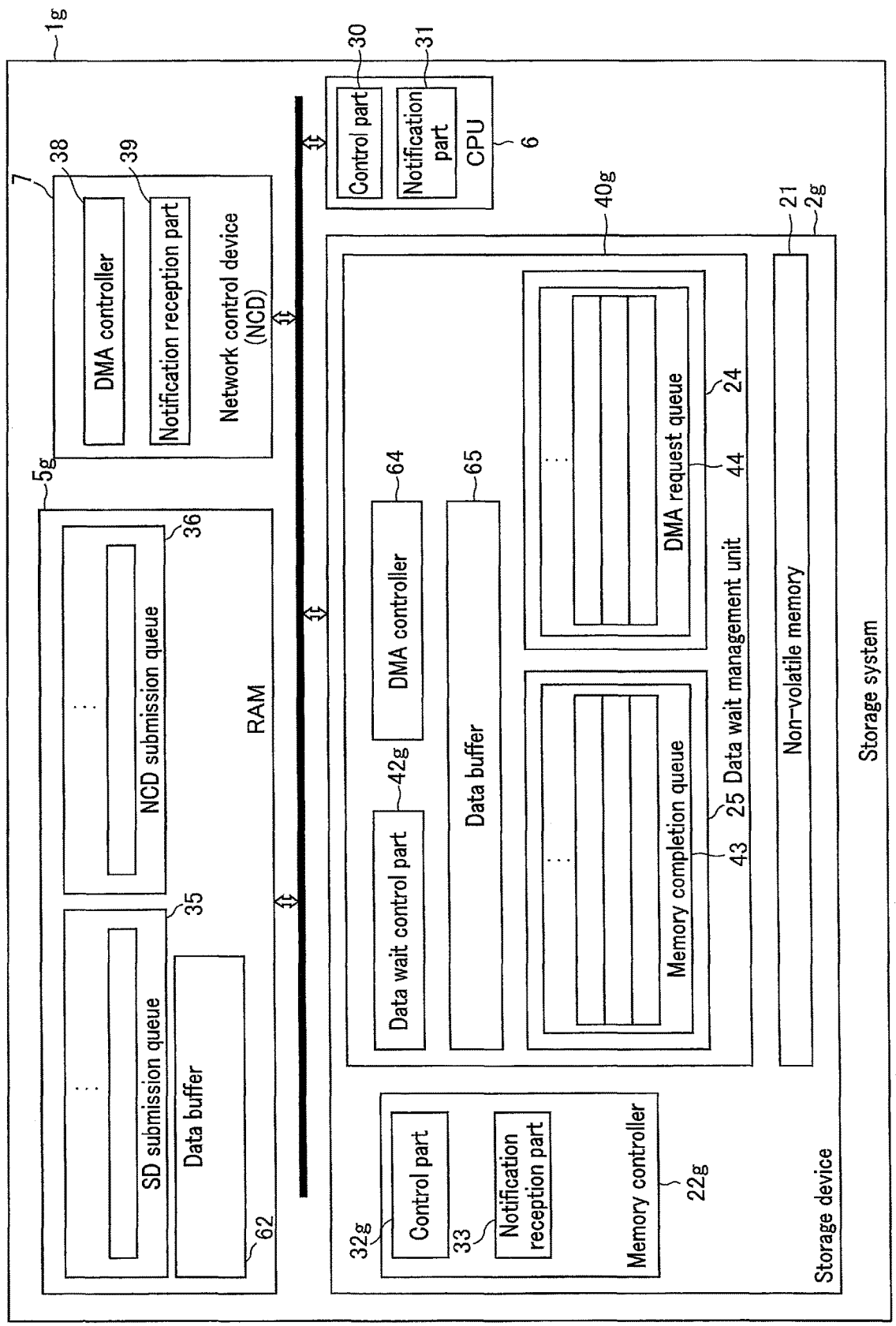
F I G. 46

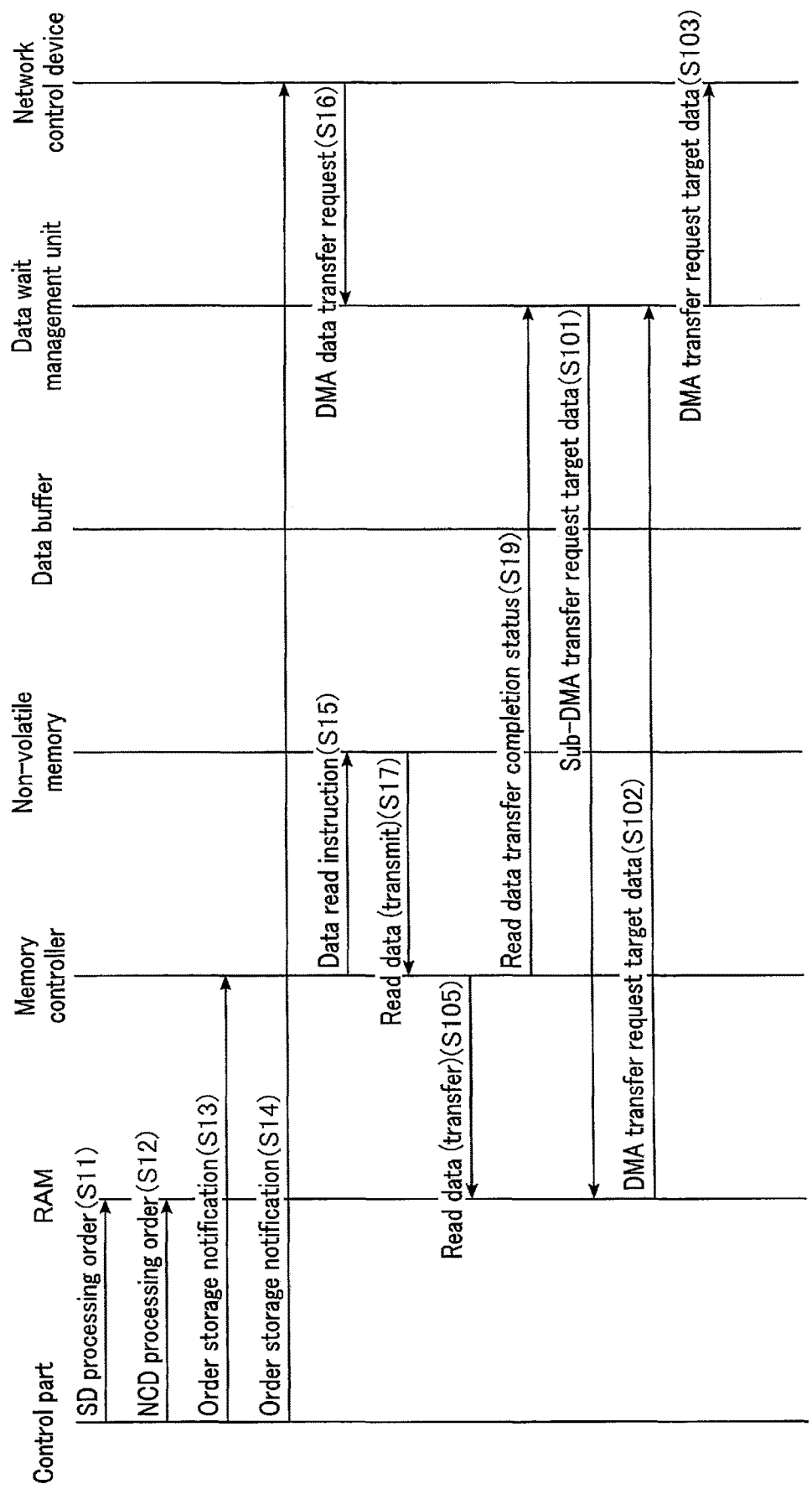
F I G. 48

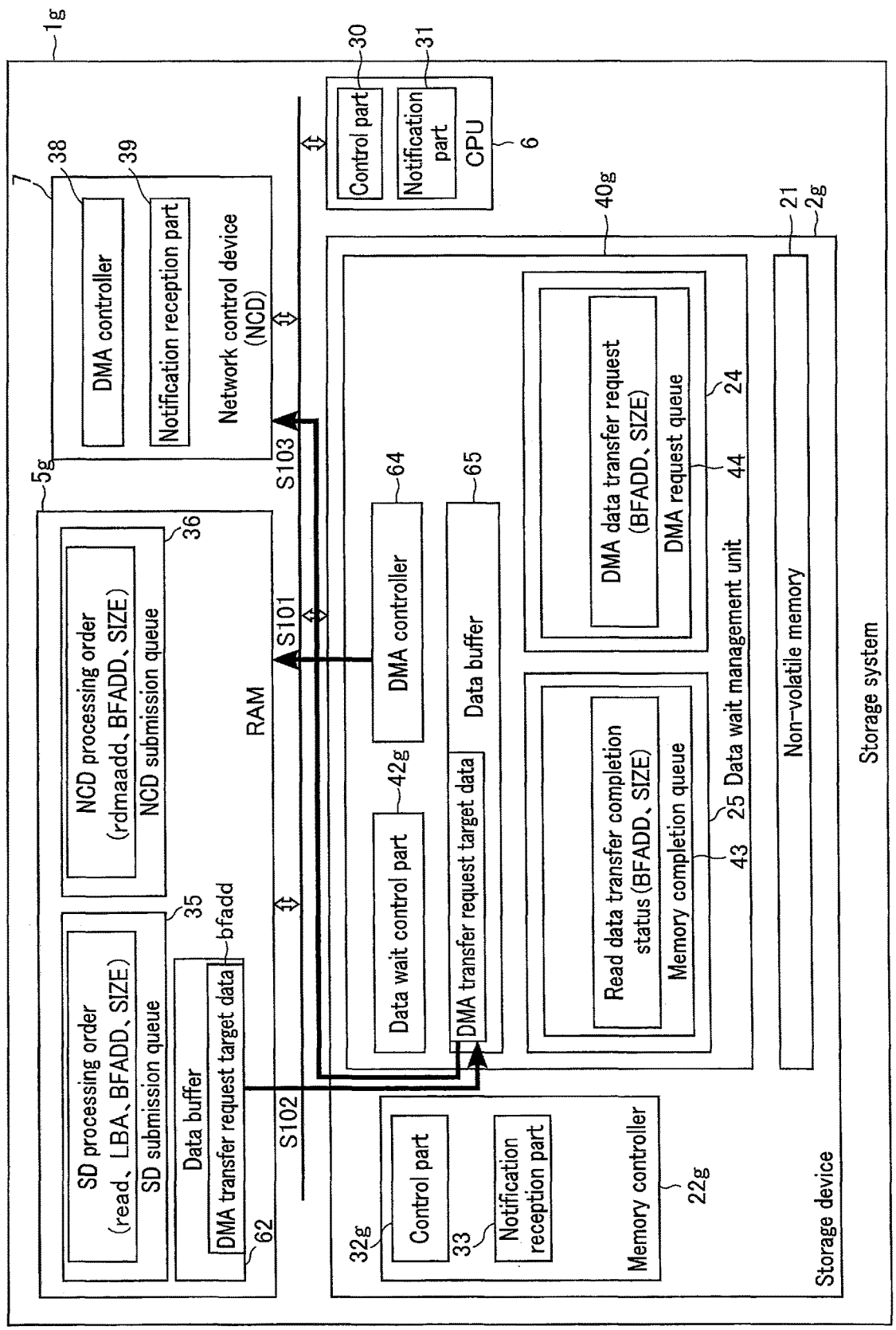
F I G. 51

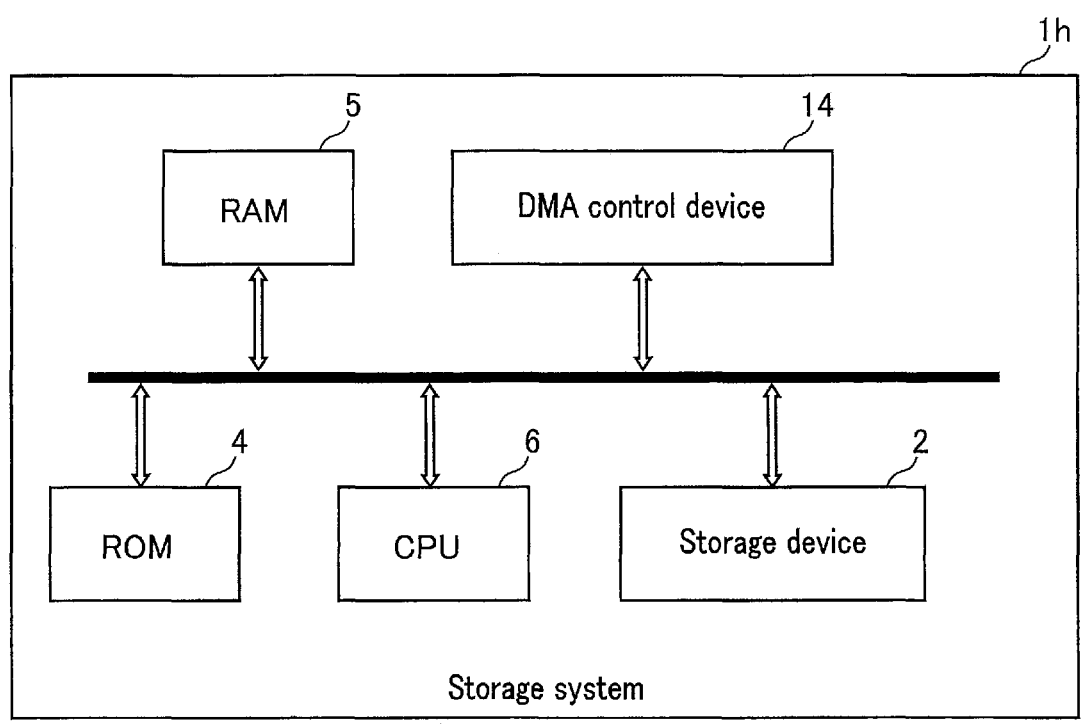
F I G. 52

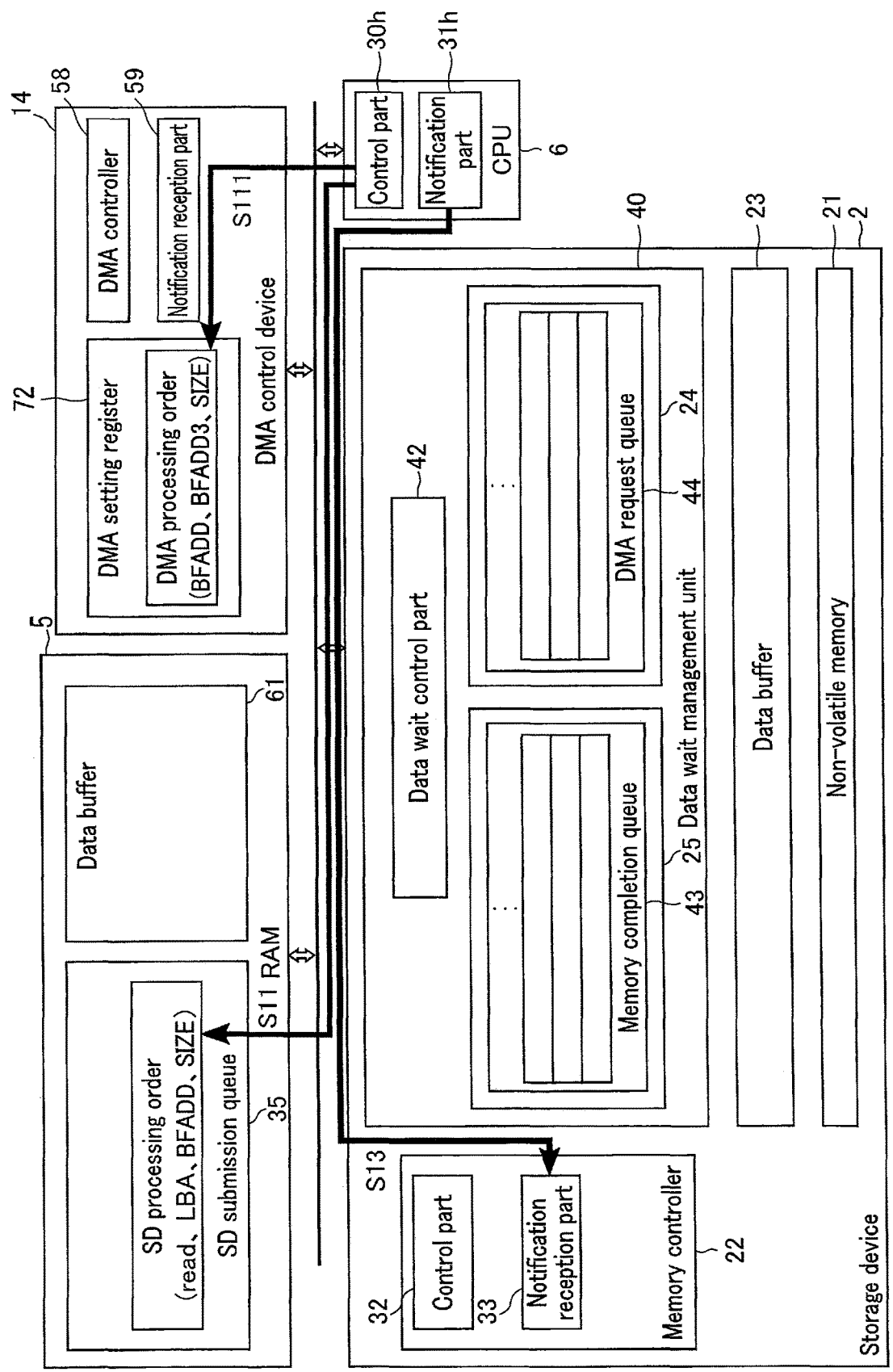
F I G. 55

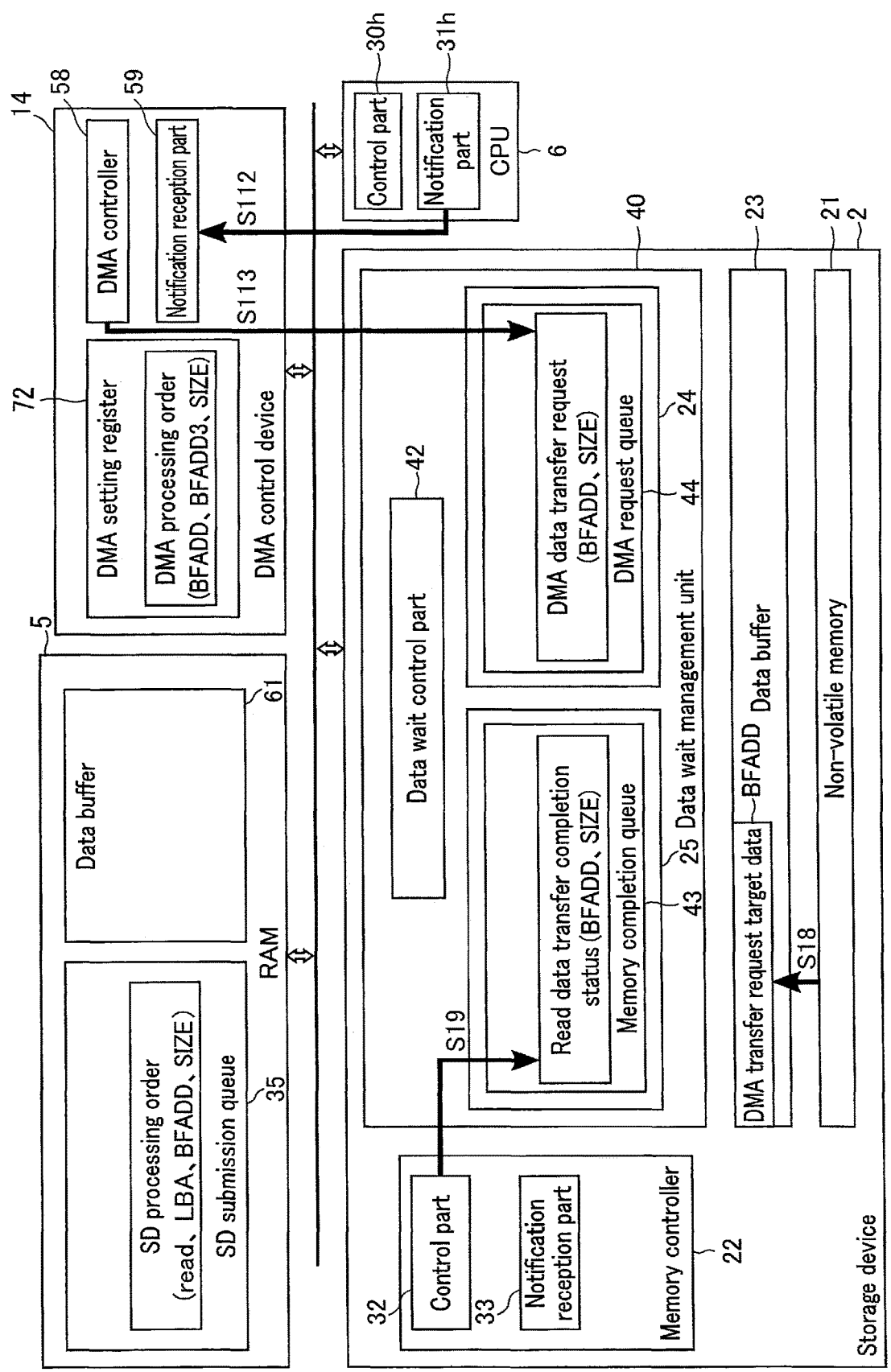
F I G. 56

STORAGE SYSTEM CAPABLE OF OPERATING AT A HIGH SPEED INCLUDING STORAGE DEVICE AND CONTROL DEVICE

CROSS-REFERENCE TO RELATED APPLICATIONS

This application is based upon and claims the benefit of priority from Japanese Patent Application No. 2021-154547, filed Sep. 22, 2021, the entire contents of which are incorporated herein by reference.

FIELD

Embodiments described herein relate generally to a storage system.

BACKGROUND

A storage system including a storage device and other devices is known. The storage device includes a memory and a memory controller. The other devices are a network control device, an additional storage device, a graphic processing unit (GPU), etc. It is required that the storage system be capable of operating at a high speed. A high-speed operation can be realized by improvement in processing efficiency.

BRIEF DESCRIPTION OF THE DRAWINGS

FIG. 4 shows a flow of an operation of a data wait management unit according to the first embodiment.

FIG. 5 is a sequence diagram of an operation in the storage system according to the first embodiment.

FIG. 6 shows data generated and transmitted and received during a process in the storage system according to the first embodiment

FIG. 8 shows data generated and transmitted and received during a process in the storage system according to the first embodiment.

FIG. 12 shows data generated and transmitted and received during a process in the storage system according to the modification of the first embodiment.

FIG. 15 is a sequence diagram of an operation in the storage system according to the second embodiment.

FIG. 18 shows data generated and transmitted and received during a process in the storage system according to the second embodiment.

FIG. 19 shows an example of a hardware configuration of a storage system according to a third embodiment.

FIG. 20 shows an example of a hardware configuration of a graphics device according to the third embodiment.

FIG. 23 shows data generated and transmitted and received during a process in the storage system according to the third embodiment.

FIG. 24 shows data generated and transmitted and received during a process in the storage system according to the third embodiment.

FIG. 25 shows data generated and transmitted and received during a process in the storage system according to the third embodiment.

FIG. 30 shows data generated and transmitted and received during a process in the storage system according to the fourth embodiment.

FIG. 31 shows data generated and transmitted and received during a process in the storage system according to the fourth embodiment.

FIG. 32 shows a hardware configuration of a storage device according to a fifth embodiment.

FIG. 34 shows a flow of an operation of a data wait management unit according to the fifth embodiment.

FIG. 35 is a sequence diagram of an operation in the storage system according to the fifth embodiment.

FIG. 36 shows a hardware configuration of a storage device according to a sixth embodiment.

FIG. 37 shows functional blocks of the storage system according to the sixth embodiment.

FIG. 39 is a sequence diagram of an operation in the storage system according to the sixth embodiment.

FIG. 43 shows data generated and transmitted and received during a process in the storage system according to the sixth embodiment.

FIG. 46 shows functional blocks of a storage system according to a seventh embodiment.

FIG. 48 is a sequence diagram of an operation in the storage system according to the seventh embodiment.

FIG. 51 shows data generated and transmitted and received during a process in the storage system according to the seventh embodiment.

FIG. 52 shows an example of a hardware configuration of a storage system according to an eighth embodiment.

FIG. 55 shows data generated and transmitted and received during a process in the storage system according to the eighth embodiment.

FIG. 56 shows data generated and transmitted and received during a process in the storage system according to the eighth embodiment.

DETAILED DESCRIPTION

Figure 1:
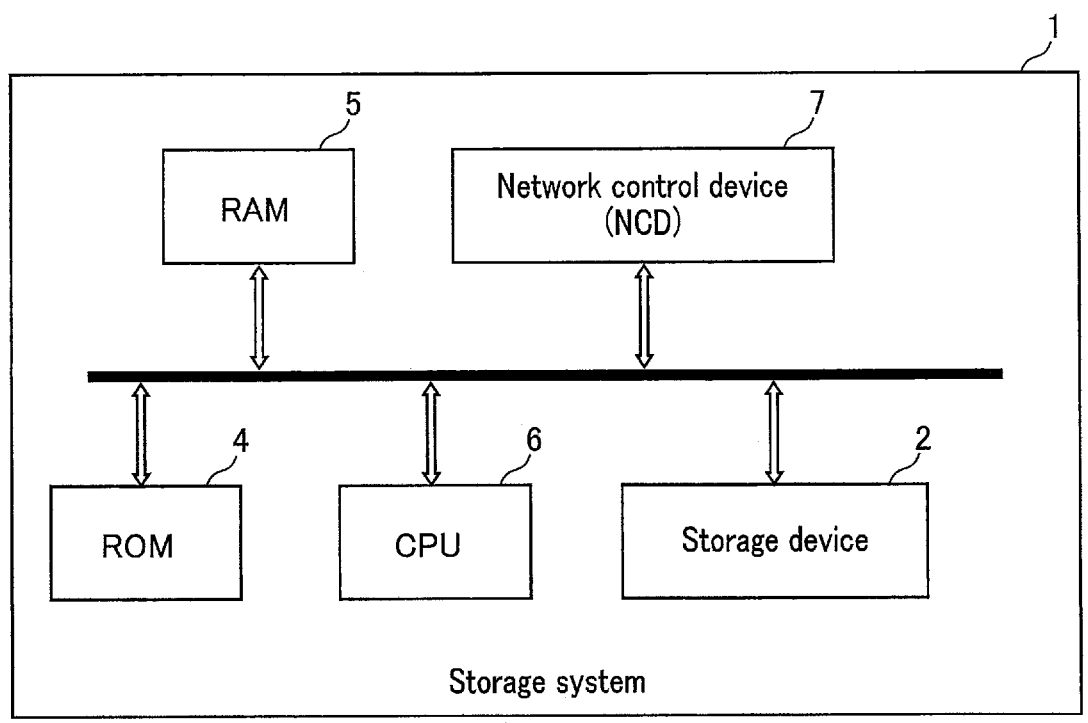
FIG. 1 shows an example of a hardware configuration of a storage system according to a first embodiment.

In general, according to one embodiment, a storage system includes: a storage device including a memory and a memory controller; a first device coupled to the storage device; and a control part. The control part is configured to: store, in a first storing device, a first order that orders the storage device to read first data from the memory; and store a second order in a second storing device. The second order orders the first device to transmit a first request to the storage device. The first request requests the first data to be transferred to the first device. The first device is configured to start processing the second order before completion of the reading of the first data from the memory.

Embodiments will now be described with reference to the figures. In the following description, components with substantially the same functionalities and configurations will be referred to with the same reference numerals, and repeated descriptions may be omitted. In order to distinguish components having substantially the same function and configuration from each other, an additional numeral or letter may be added to the end of each reference numeral. For components with substantially the same function and configuration in one embodiment and a subsequent embodiment, an additional number or letter will be appended at the end of a reference numeral indicating the component in the subsequent embodiment for distinction from the component in the preceding embodiment. For example, a specific component A in a second embodiment may be referred to as a "component Ab". With respect to matters other than those described in a certain embodiment regarding a certain component, all the matters discussed in the preceding embodiment regarding a component with substantially the same function and configuration apply.

In an embodiment subsequent to an embodiment that has already been described, matters that differ from the already described embodiment will mainly be discussed. The entire description of a particular embodiment also applies to other embodiments unless explicitly mentioned otherwise or obviously excluded.

It is not necessary that functional blocks be distinguished as in the following examples. For example, some of the functions may be implemented by functional blocks different from those illustrated below. Furthermore, an illustrated functional block may be divided into functional sub-blocks.

Moreover, any step in a flow of a method of an embodiment is not limited to any illustrated order, and can occur in an order different from an illustrated order and/or can occur concurrently with another step.

1. First Embodiment 1.1. Configuration 1.1.1. Overall Hardware Configuration

FIG. 1 shows an example of a hardware configuration of a storage system according to a first embodiment. A storage system 1 is a system that performs processing including storing of data and outputting of the stored data. The storage system 1 includes hardware such as a storage device 2, a read-only memory (ROM) 4, a random access memory (RAM) (storing device) 5, a central processing unit (CPU) or processor 6, and a network control device (NCD) 7. The storage device 2, the ROM 4, the RAM 5, the CPU 6, and the network control device 7 are coupled to, for example, a bus in the storage system 1 to enable interactive communications.

The storage device 2 is a device that stores data. The storage device 2 includes a memory and a memory controller, as will be described later. The storage device 2 is, for example, a solid-state device (SSD).

The ROM 4 stores data in a non-volatile manner. Examples of the ROM 4 include an electrically erasable programmable read-only memory (EEPROM). The ROM 4 stores programs including firmware. The programs are configured to allow the CPU 6 to perform operations to be described in the embodiments.

The RAM 5 temporarily stores data, and stores the programs stored in the ROM 4 while the storage system 1 is supplied with power. Also, the RAM 5 stores data necessary for operations of the storage system 1.

The CPU 6 reads the programs and interprets the read programs to perform various types of information processing. Through execution of the programs stored in the ROM 4 and loaded onto the RAM 5 by the CPU 6, the storage system 1 executes various operations.

The network control device 7 is hardware for providing a physical coupling to a network. Also, the network control device 7 provides a function of allowing the storage system 1 to communicate with another device via a network. The network control device 7 includes a connector and/or a terminal for a physical coupling. The network control device 7 provides a function of enabling the storage system 1 to communicate with another device via a network, and has a configuration including a circuit for such a function. Examples of the network control device 7 include a network interface card (NIC) and a network adapter.

1.1.1.2. Storage Device

Figure 2:
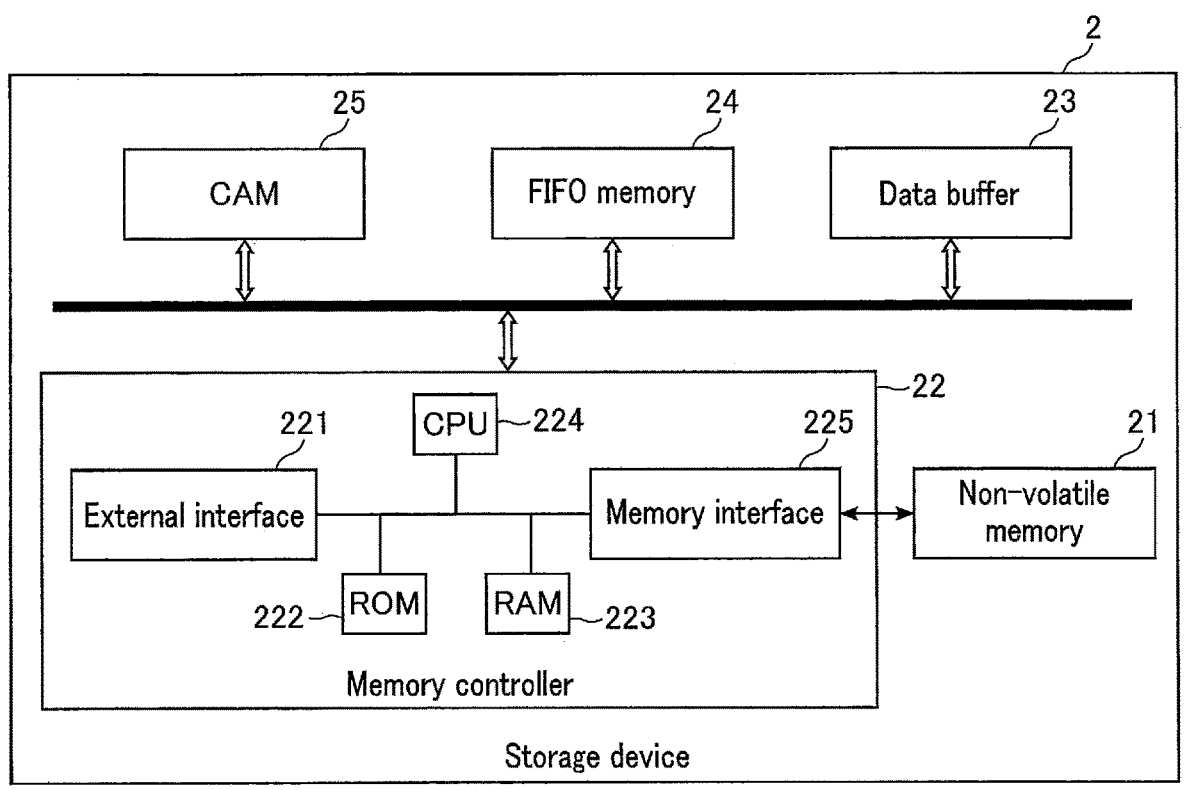
FIG. 2 shows a hardware configuration of the storage device according to the first embodiment.

FIG. 2 shows a hardware configuration of the storage device 2 according to the first embodiment. As shown in FIG. 2, the storage device 2 includes hardware such as a non-volatile memory 21, a memory controller 22, a data buffer 23, a first-in first-out (FIFO) memory 24, and a content addressable memory (CAM) 25. The memory controller 22, the data buffer 23, the FIFO memory 24, and the CAM 25 are coupled to, for example, a bus in the storage device 2 to enable interactive communications.

The non-volatile memory 21 includes one or more semiconductor chips. The non-volatile memory 21 includes, for example, a NAND flash memory chip.

The memory controller 22 controls the non-volatile memory 21 so as to perform a process indicated by a request from a component in the storage system 1 other than the storage device 2. Examples of the form of the memory controller 22 include a semiconductor chip and a system on a chip (SoC).

The memory controller 22 includes an external interface 221, a ROM 222, a RAM 223, a CPU 224, and a memory interface 225.

The external interface 221 is a circuit for allowing the memory controller 22 to communicate with a component (device) in the storage system 1 other than the memory controller 22. Some of the functions of the external interface 221 can be realized by software. The external interface 221 complies with a communication standard or interface standard. The external interface 221 includes a connector and/or a terminal for performing communications compliant with the communication standard with which the external interface 221 complies. The communication standard with which the external interface 221 complies is, for example, Non-Volatile Memory Express (NVMe).

The ROM 222 stores data in a non-volatile manner. Examples of the ROM 222 include EEPROM. The ROM 222 stores programs including firmware.

The RAM 223 temporarily stores data, and stores the programs stored in the ROM 222 while the storage device 2, in particular, the storage system 1, is supplied with power. The RAM 223 is, for example, a dynamic random-access memory (DRAM).

The CPU 224 reads the programs and interprets the read programs to perform various types of information processing. Through execution of programs stored in the ROM 222 and loaded onto the RAM 223 by the CPU 224, the memory controller 22 executes various operations. The programs are configured to allow the CPU 224 to perform operations that will be described in the embodiments.

The memory interface 225 is a circuit for allowing the memory controller 22 to communicate with the non-volatile memory 21. Some of the functions of the memory interface 225 can be realized by software. Based on an example in which the non-volatile memory 21 is a NAND flash memory, the memory interface 225 is a NAND memory interface.

The data buffer 23 stores data while, for example, the storage system 1 is supplied with power. The data buffer 23 is, for example, a DRAM. The data buffer 23 includes a plurality of areas of a certain size. Each area is assigned a unique address, and can be identified by the address.

The FIFO memory 24 is a memory that stores and outputs data in a first-in-first-out method.

The CAM 25 is a memory capable of outputting, when a character string included in data is designated as a key, data including the designated character string.

1.1.2. Functional Configuration of Storage System

Figure 3:
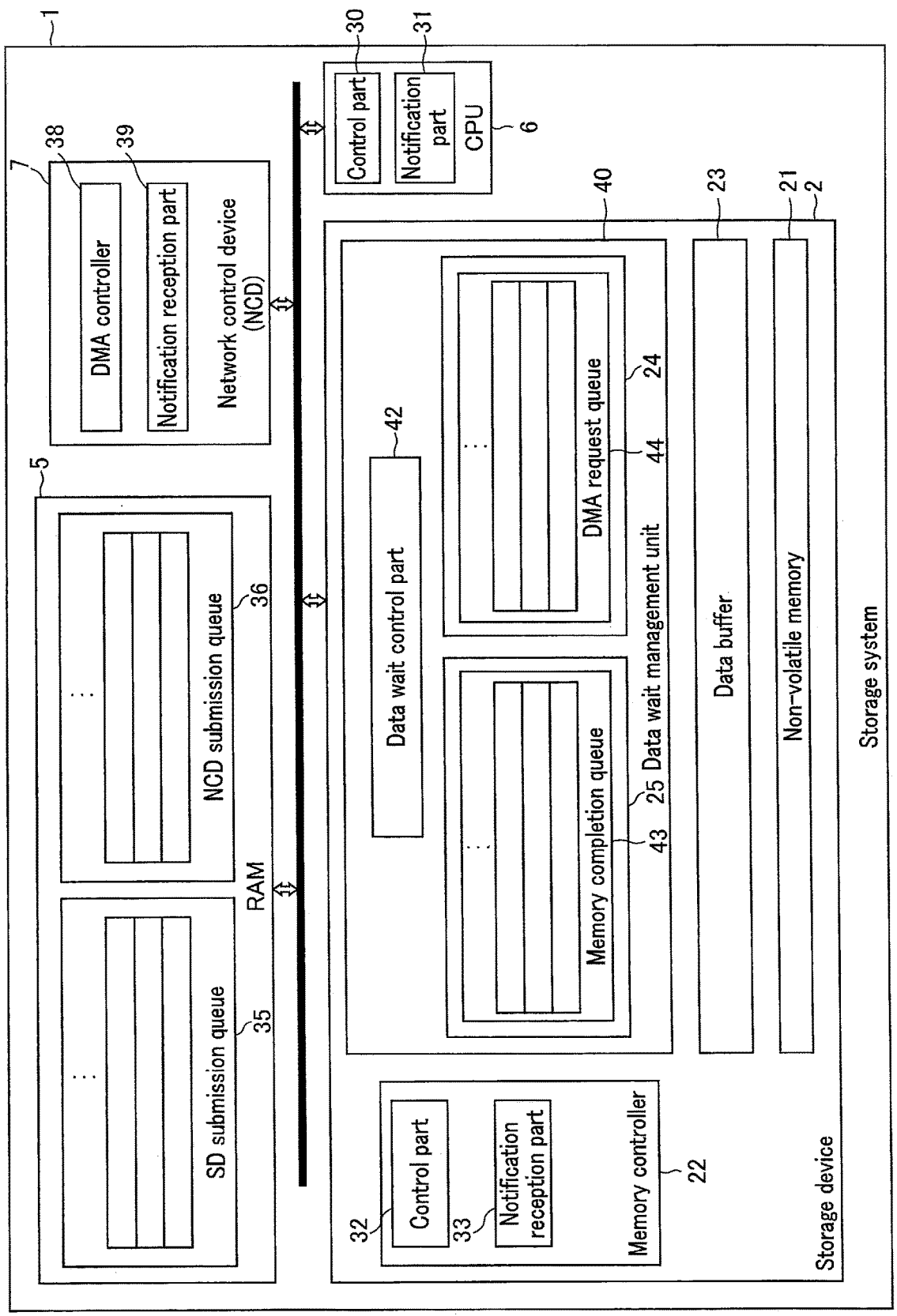
FIG. 3 shows functional blocks of the storage system according to the first embodiment.

FIG. 3 shows functional blocks of the storage system 1 according to the first embodiment. The storage system 1 is capable of serving the functions of the functional blocks to be described below with reference to FIG. 3, using the hardware and software included in the storage system 1.

As shown in FIG. 3, the storage system 1 includes a control part 30, a notification part 31, a control part 32, a notification reception part 33, an SD submission queue 35, an NCD submission queue 36, a direct memory access (DMA) controller 38, a notification reception part 39, and a data wait management unit 40.

The control part 30 can be realized as a function that is implemented through execution of a program loaded into the ROM 4 by the CPU 6. The control part 30 controls the overall operation of the storage system 1. The control part 30 divides a memory space provided by the storage device 2 into a plurality of logical areas of an identical size, assigns a unique logical address to each logical area, and manages the memory space of the storage device 2 using the logical address. Upon deciding that data of a write target is to be stored in a logical area, the control part 30 assigns the determined logical address to the write target data. Thereafter, the control part 30 requests that the storage device 2 write the write target data into the logical area specified by the logical address.

The notification part 31 can be realized as a function that is implemented through execution of a program loaded into the RAM 5 by the CPU 6. In accordance with control by the control part 30, the notification part 31 transmits a notification (notification signal) to another functional block (or a component or device) in the storage system 1. A notification requests that the functional block that has received the notification start an operation, and requests, in particular, that the functional block that has received the notification read an order in a queue for the functional block and start a process indicated by the read order. A notification can be regarded as a signal that activates the functional block that has received the notification. A notification is, for example, a signal for ringing a doorbell defined by NVMe.

The control part 32 controls the overall operation of the memory controller 22 as well as various other operations. The control part 32 controls writing of data into the non-volatile memory 21 and reading of data from the non-volatile memory 21. The control part 32 manages the memory space of the non-volatile memory 21 using an address system different from that of the logical address. That is, the memory areas provided by the non-volatile memory 21 are assigned addresses in a system different from that of the logical address. An address that specifies a memory area in the non-volatile memory 21 is referred to as a physical address. Using the physical address, the control part 32 writes data into the non-volatile memory 21, and reads data from the non-volatile memory 21. Also, the control part 32 controls writing of data into the data buffer 23 and reading of data from the data buffer 23.

The notification reception part 33 receives a notification from the notification part 31. The notification reception part 33 can be realized as a part of a function of the memory controller 22. The notification reception part 33 can be realized, for example, as a function that is implemented through execution of a program loaded onto the RAM 223 of the memory controller 22 by the CPU 224. When the notification reception part 33 receives a notification, the memory controller 22 becomes aware of the reception of the notification. Upon becoming aware of the reception of the notification, the memory controller 22 reads an order in a head entry in the SD submission queue 35, and executes the order. The notification reception part 33 is, for example, a doorbell.

The SD submission queue 35 is a queue that stores an order on the storage device 2. Hereinafter, an order on the storage device 2 may be referred to as an "SD processing order". The SD submission queue 35 can be realized by the memory space of the RAM 5. A functional block that desires execution of a process by the storage device 2 stores an order containing details of the process in the SD submission queue 35. The SD submission queue 35 includes a plurality of entries. The entries are represented by rectangles in the drawings. Each order is put in an entry. The orders are stored and output according to the first-in-first-out principle. An order in a head entry is an order to be output next. The SD submission queue 35 is, for example, a submission queue defined by NVMe.

The NCD submission queue 36 is a queue that stores an order on the network control device 7. Hereinafter, an order on the network control device 7 may be referred to as an "NCD processing order". The NCD submission queue 36 can be realized by the memory space of the RAM 5. A functional block that desires execution of a process by the network control device 7 stores an order containing details of the process in the NCD submission queue 36. The NCD submission queue 36 includes a plurality of entries. Each order is put in an entry. The orders are stored and output according to the first-in-first-out principle. An order in a head entry is an order to be output next. The NCD submission queue 36 plays, for example, the same role for the network control device 7 as the role of the issue key (Submission Queue) defined by NVMe.

The DMA controller 38 is a functional block that performs control for allowing the network control device 7 to access the storage device 2 without intervention of the CPU 6 (control part 30). In the network control device 7, the DMA controller 38 can be realized by, for example, a dedicated circuit or a combination of a program and a CPU in the network control device 7. The DMA controller 38 generates and outputs a request (DMA data transfer request) to instruct transfer (DMA data transfer) of data from the storage device 2 without intervention of the CPU 6.

The notification reception part 39 receives a notification from the notification part 31. In the network control device 7, the notification reception part 39 can be realized by, for example, a dedicated circuit or a combination of a program and a CPU in the network control device 7. When the notification reception part 39 receives a notification, the network control device 7 becomes aware of the reception of the notification. Upon becoming aware of the reception of the notification, the network control device 7 reads an order in a head entry in the NCD submission queue 36, and executes the order. If the order orders DMA data transfer, the notification reception part 39 notifies the DMA controller 38 of the reception of the notification. Upon becoming aware of the reception of the notification, the DMA controller 38 executes an order in the head entry in the NCD submission queue 36. The notification reception part 39 is, for example, a doorbell.

The data wait management unit 40 stores a plurality of uncompleted DMA data transfer requests, and outputs the uncompleted DMA data transfer requests under a certain condition.

The data wait management unit 40 includes a data wait control part 42, a memory completion queue 43, and a DMA request queue 44. The data wait control part 42 controls the overall operation of the data wait management unit 40. The data wait control part 42 can be realized by, for example, a dedicated circuit. The data wait management unit 40 may use part of the memory space of the RAM 223 or another RAM.

The memory completion queue 43 is a queue that stores data (completion status data) indicating a completion status of an order (command) on the non-volatile memory 21, and outputs the stored completion status data. The memory completion queue 43 is realized by the CAM 25. The memory completion queue 43 includes a plurality of entries. The memory completion queue 43 is, for example, a completion queue defined by NVMe.

The DMA request queue 44 is a queue that receives a DMA data transfer request, stores the received request, and outputs the stored request. The DMA request queue 44 is realized by the FIFO memory 24. The DMA request queue 44 includes a plurality of entries. The DMA data transfer request is output when a certain condition is satisfied. The output order is transferred to the memory controller 22 by the data wait control part 42.

1.2. Operation

FIG. 4 shows a flow of an operation of the data wait management unit 40 according to the first embodiment. The flow of FIG. 4 can be started, for example, when a new DMA data transfer request is stored in the DMA request queue 44, when a DMA data transfer request in the head entry of the DMA request queue 44 is changed, when a new completion status (status data) is stored in the memory completion queue 43, or when a predetermined periodic timing comes. The flow of FIG. 4 shows a DMA data transfer request in the head entry. The DMA data transfer request in the head entry may be hereinafter referred to as a target DMA data transfer request.

The flow of FIG. 4 shows a process in which the data wait management unit 40 outputs a target DMA data transfer request. As shown in FIG. 4, the data wait control part 42 instructs the memory completion queue 43 to perform a data read using a character string in the target DMA data transfer request as a retrieval key (S1). As described with reference to FIG. 3, the memory completion queue 43 stores completion status data. A DMA data transfer request includes details about DMA data transfer, and completion status data may include, as will be described later, the same character string as the character string included in the DMA data transfer request. Accordingly, the data read instruction to the memory completion queue 43 using a character string in the target DMA data transfer request as a retrieval key corresponds to retrieval of an entry using a character string in the target DMA data transfer request as a retrieval key.

The data wait control part 42 determines whether or not data designated by the retrieval key has been output from the memory completion queue 43 (S2). If the instructed data has not been output from the memory completion queue 43 (S3; No), the data wait control part 42 waits for a predetermined period of time (S4). If the data designated by the retrieval key is not output from the memory completion queue 43, it means that outputting (reading) of data targeted by the target DMA data transfer request from the non-volatile memory 21 has not been completed. After S4, the flow continues to S2. Instead of S4, another process may be performed. Examples of another process include a new DMA data transfer request having been stored in the DMA request queue 44, a new completion status having been stored in the memory completion queue 43, and a predetermined periodic timing having arrived.

If the data designated by the retrieval key has been output from the memory completion queue 43 (S3; Yes), the data wait control part 42 transfers data targeted by the target DMA data transfer request to the network control device 7 (S5). If the data designated by the retrieval key has been output from the memory completion queue 43, it means that outputting of data targeted by the target DMA data transfer request from the non-volatile memory 21 has been completed. The data output by the reading designated by the retrieval key is a read data transfer completion status of data targeted by the DMA data transfer request including the retrieval key, and may be hereinafter referred to as a "read data transfer completion status" corresponding to the DMA data transfer request. After completion of S5, the flow of FIG. 4 is completed.

Hereinafter, a data read instruction to the memory completion queue 43 using a character string included in a DMA data transfer request in (a head entry, in particular, of) the DMA request queue 44 as a retrieval key may be referred to as retrieval of an entry corresponding to a DMA data transfer request.

FIG. 5 is a sequence diagram of an operation in the storage system 1 according to the first embodiment. Specifically, FIG. 5 shows a process in which the control part 30 transfers data stored in the non-volatile memory 21 to the network control device 7. The operation of FIG. 5 is started when the control part 30 determines to transfer data stored in the non-volatile memory 21 to the network control device 7. The data transfer to the network control device 7 is performed for the purpose of, for example, allowing the data to be transferred to be transmitted to another device via a network by the network control device 7.

As shown in FIG. 5, the control part 30 generates an SD processing order, and stores the generated SD processing order in the SD submission queue 35 in the RAM 5 (S11). The SD processing order orders a data read and includes information that designates a data read, information for specifying data of a read target, and information (address information) indicating an address of an area that is to store the read data in the data buffer 23. An address of an area in the data buffer 23 may be hereinafter simply referred to as a "data buffer address". Specific examples of the SD processing order that orders a data read include a logical address of read target data, a data buffer address, and information (size information) on a size of the read target data. A data buffer address in an SD processing order that orders a data read is a data buffer address in which read data will be stored, and may be referred to as "transfer destination buffer address BFADD." A read target data size in an SD processing order that orders a data read may be referred to as "transfer target data size SIZE."

The control part 30 specifies read target data using a logical address assigned to the data. A logical address of the read target data is, for example, a logical address of a head portion of the read target data.

The control part 30 generates an NCD processing order, and stores the generated NCD processing order in the NCD submission queue 36 in the RAM 5 (S12). The NCD processing order generated as S12 orders that a DMA data transfer request for transferring data in the data buffer 23 to the network control device 7 be generated. Specifically, an NCD processing order includes a data buffer address that stores target data of a DMA data transfer request, and size information of a target data of the DMA transfer request. The data buffer address included in the NCD processing order stored as S12 is the same as the transfer destination buffer address BFADD. The data size included in the NCD processing order stored as S12 is the same as the transfer target data size SIZE. A target data of a DMA data transfer request may be hereinafter referred to as "DMA transfer request target data". Based on an example in which data transfer to the network control device 7 is performed for the purpose of allowing the network control device 7 to transmit the data to another device via a network, the NCD processing order further includes an address rdmaadd of a transmission destination device.

After S11, namely, after the control part 30 stores the SD processing order in the SD submission queue 35, the notification part 31 transmits, for example, a notification (order storage notification) that an SD processing order has been stored in the SD submission queue 35 to the memory controller 22 in accordance with an instruction from the control part 30 (S13). The order storage notification is received by the notification reception part 33 in the memory controller 22. Through reception of the order storage notification, the memory controller 22 learns that a new SD processing order has been stored in the SD submission queue 35.

After S12, namely, after the control part 30 stores an NCD processing order in the NCD submission queue 36, the notification part 31 transmits, to the network control device 7, a notification (order storage notification) that an NCD processing order has been stored in the NCD submission queue 36 in accordance with, for example, an instruction from the control part 30 (S14). The order storage notification is received by the notification reception part 39 in the network control device 7. Through reception of the order storage notification, the network control device 7 learns that a new NCD processing order has been stored in the NCD submission queue 36.

After S13, namely, upon learning that an order has been stored in the SD submission queue 35, the memory controller 22 instructs the non-volatile memory 21 to perform a data read based on the SD processing order (S15). Specifically, the memory controller 22 reads the SD processing order from the SD submission queue 35, and receives the SD processing order. An SD processing order includes, as described with reference to S11, a logical address of a read target data, a data buffer address (i.e., transfer destination buffer address BFADD), and size information (i.e., transfer target data size SIZE). Based on the SD processing order, the memory controller 22 learns that it has been ordered to read data of a size of the transfer target data size SIZE of the logical address indicated by the SD processing order and to store the read data in the transfer destination buffer address BFADD. The logical address of the read target data in the SD processing order, the transfer destination buffer address BFADD, and the transfer target data size SIZE are received by the control part 32. The control part 32 transmits a data read instruction based on the SD processing order to the non-volatile memory 21. That is, the control part 32 transmits one or more read command sets for a data read to the non-volatile memory 21. Each read command set includes a data read instruction and a physical address of a data read target.

After S14, namely, upon learning that an order has been stored in the NCD submission queue 36, the network control device 7 transmits a DMA data transfer request based on the NCD processing order (S16). Specifically, the network control device 7 reads the NCD processing order from the NCD submission queue 36, and receives the NCD processing order. An NCD processing order includes, as described with reference to S12, at least a data buffer address (i.e., transfer destination buffer address BFADD) and size information (i.e., transfer target data size SIZE). Upon receiving the NCD processing order, the network control device 7 learns that DMA data transfer is required to execute the process indicated by the NCD processing order. Based thereon, the DMA controller 38 generates a necessary DMA data transfer request. The generated DMA data transfer request includes the transfer destination buffer address BFADD and the transfer target data size SIZE. The DMA controller 38 transmits the generated DMA data transfer request to the storage device 2. The transmitted DMA data transfer request will also be referred to as a "target DMA data transfer request", and is to be a target of the flow of FIG. 4, as will be described later.

The target DMA data transfer request is transferred to the data wait management unit 40, and is received by the data wait management unit 40, for example under the control of the memory controller 22. The data wait control part 42 of the data wait management unit 40 stores the received target DMA data transfer request in the DMA request queue 44. The data wait control part 42 periodically retrieves an entry corresponding to the stored target DMA data transfer request. Until a result of the retrieval is returned as a hit, namely, until data corresponding to the DMA data transfer request is output, the data wait control part 42 does not process the stored target DMA data transfer request.

After S15, namely, upon receiving one or more read command sets, the non-volatile memory 21 transmits data (read data) read based on an instruction by the read command set to the memory controller 22 (S17). The read data is received by the RAM 223 in the memory controller 22.

After S17, namely, after the read data is received by the RAM 223, the memory controller 22 transfers the read data to the data buffer 23 (S18). Specifically, reception of the read data at the RAM 223 is recognized by, for example, the control part 32. Upon recognizing the reception, the control part 32 stores (transfers) the read data in (to) an area specified by the transfer destination buffer address BFADD. The read data is data requested by the control part 30 to be transferred to the network control device 7, and may be hereinafter referred to as "DMA transfer request target data".

One or more of S15, S17, and S18 can be performed in parallel with S16 (DMA data transfer request).

After S18, namely, after the read data (i.e., the DMA transfer request target data) is stored in the data buffer 23, the control part 32 in the memory controller 22 transmits, to the data wait management unit 40, a status indicating that transfer of the read data has been completed (S19). When the data wait management unit 40 receives the read data transfer completion status, the data wait control part 42 stores the received read data transfer completion status in a given entry in the memory completion queue 43. The read data transfer completion status includes a size of read data which the read data transfer completion status indicates a status of, and an address of an area in which the read data in the data buffer 23 is stored (a data buffer address of an area in which the read data is to be stored). In the present example, the read data size is the transfer target data size SIZE, and the data buffer address of an area in which the read data is to be stored is the transfer destination buffer address BFADD.

After S16, the data wait control part 42 periodically retrieves an entry corresponding to the target DMA data transfer request from the memory completion queue 43, as described with reference to the operation performed as S16. That is, the data wait management unit 40 executes the flow shown in FIG. 4. If an entry corresponding to the target DMA data transfer request is returned as a hit as a result of the execution of the flow, the data wait management unit 40 transfers data having a size of the transfer target data size SIZE in the transfer destination buffer address BFADD, namely, the DMA transfer request target data, to the network control device 7 (S20). The data wait management unit 40 transfers DMA transfer request target data at a timing when a signal can be transferred by a bus in the storage system 1, namely, when the storage device 2 can use a bus. Through completion of S20, the processing of FIG. 4 ends.

Figure 7:
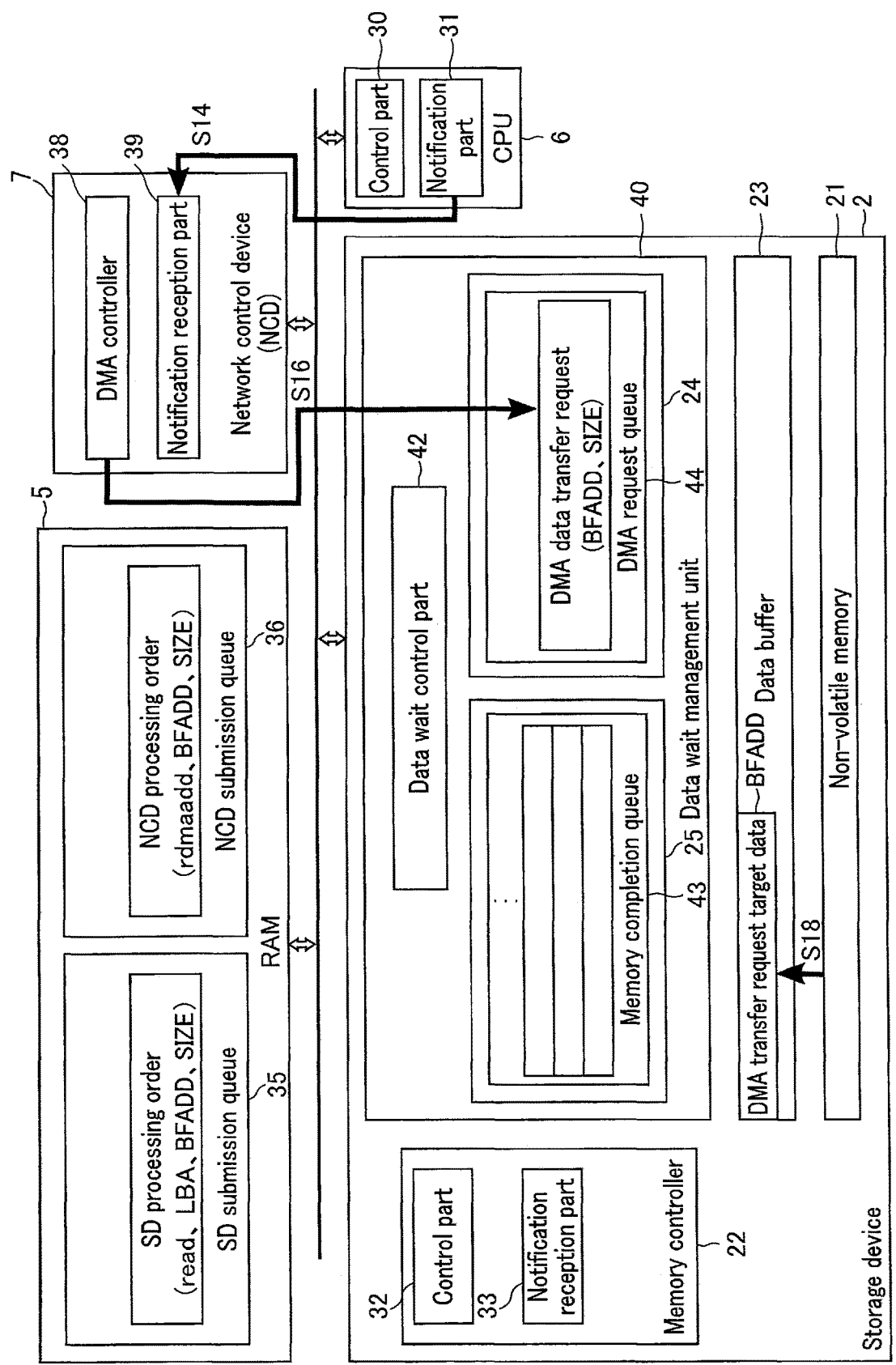
FIG. 7 shows data generated and transmitted and received during a process in the storage system according to the first embodiment.

FIGS. 6 to 8 show data generated and transmitted and received during a process in the storage system 1 according to the first embodiment, specifically, data generated and transmitted and received during the process of FIG. 5. FIGS. 6 to 8 show only data generated and transmitted and received in the process of FIG. 5. FIG. 7 shows a state subsequent to the state of FIG. 6, and FIG. 8 shows a state subsequent to the state of FIG. 7.

As shown in FIG. 6, the SD processing order is stored in the SD submission queue 35 (S11). The SD processing order includes a data read designation, the logical address LBA of the DMA transfer request target data (read target data), the transfer destination buffer address BFADD, and the transfer target data size SIZE. The NCD processing order is stored in the NCD submission queue 36 (S12). The NCD processing order includes at least the transfer destination buffer address BFADD and the transfer target data size SIZE. The order storage notification is transmitted to the memory controller 22 (S13).

As shown in FIG. 7, the order storage notification is transmitted to the network control device 7 (S14). The DMA data transfer request is stored in the DMA request queue 44 (S16). The DMA data transfer request includes the transfer destination buffer address BFADD and the transfer target data size SIZE. Under the control of the memory controller 22, the DMA transfer request target data is stored in the area of the transfer destination buffer address BFADD (S18).

As shown in FIG. 8, the read data transfer completion status is stored in the memory completion queue 43 (S19). The read data transfer completion status includes the transfer destination buffer address BFADD and the transfer target data size SIZE. Under the control of the data wait management unit 40, the DMA transfer request target data is transferred to the network control device 7 (S20).

1.3. Advantages (Advantageous Effects)

According to the first embodiment, it is possible to provide a storage system capable of operating at a high speed, as will be described below.

A storage system 100 for reference and comparison includes a CPU 101, a RAM 102, a storage device 103, and a network control device 104. The storage device 103 includes a non-volatile memory 111 and a memory controller, similarly to the storage device 2 of the first embodiment, but does not include the data buffer 23, the FIFO memory 24, and the CAM 25 of the first embodiment. An SD submission queue 114, a memory completion queue 115, an NCD request queue 116, and a data buffer 117 are realized by the RAM 102.

Figure 9:
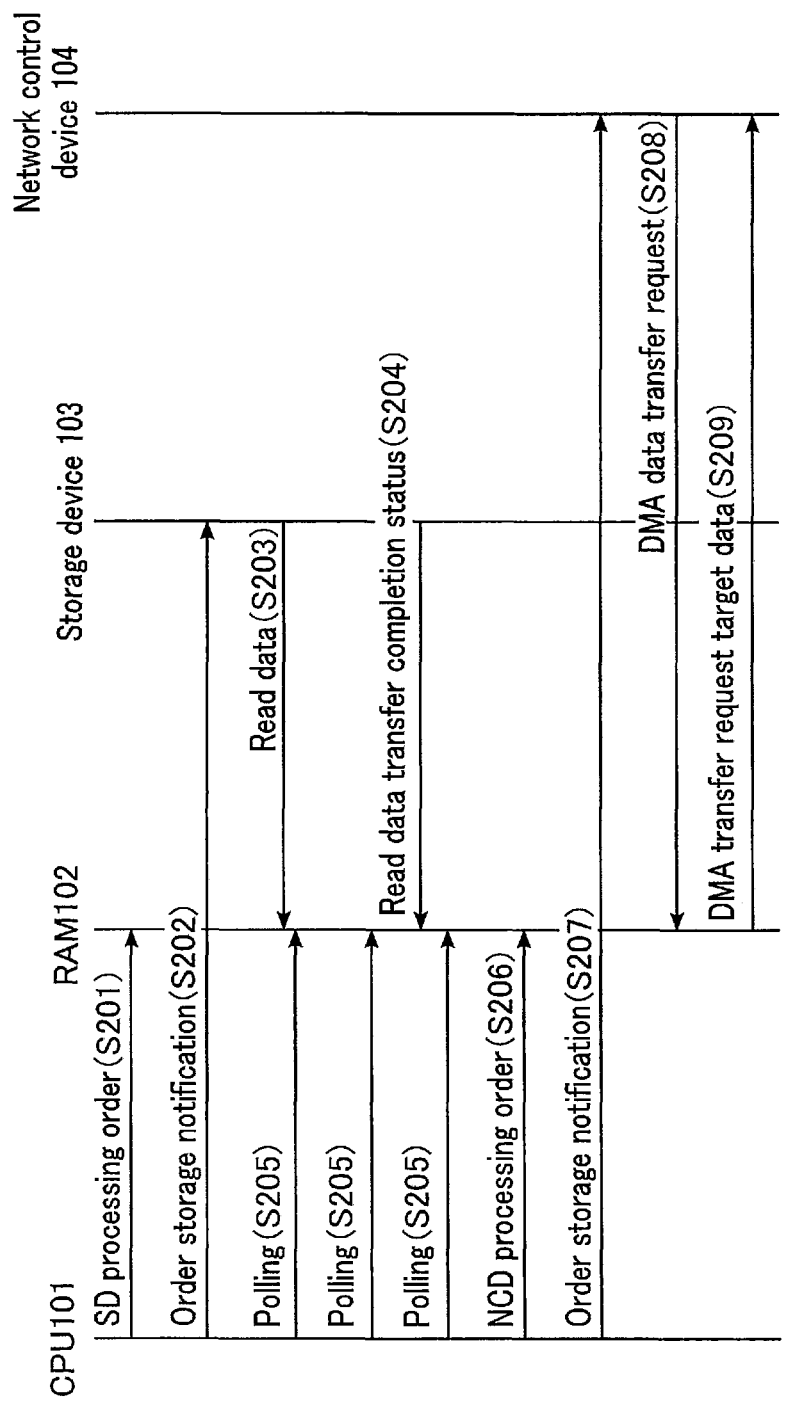
FIG. 9 is a sequence diagram of an operation in a storage system for reference.

FIG. 9 is a sequence diagram of an operation in the storage system 100 for reference, and shows a process in which data stored in the non-volatile memory 111 is transferred to the network control device 104, similarly to FIG. 4. As shown in FIG. 9, the CPU 101 stores an SD processing order that orders a read to the storage device 103 in the SD submission queue 114 in the RAM 102 (S201).

The CPU 101 notifies the storage device 103 that an order has been stored in the SD submission queue 114 (S202). Upon receiving the notification, the storage device 103 starts reading data from the non-volatile memory 111 based on the SD processing order (S203). The read data is transferred to the data buffer 117 in the RAM 102. It takes time to perform a data read from the non-volatile memory 111. Accordingly, it takes time until data transfer from the non-volatile memory 111 to the RAM 102 is completed and the completion status is stored in the memory completion queue 115 in the RAM 102 (S204).

The CPU 101 waits until the data read from the non-volatile memory 111 is completed before generating an NCD processing order that orders generation of a DMA data transfer request from the data buffer 117 in the RAM 102 to the network control device 104. This is for the purpose of preventing execution of the DMA data transfer request before the DMA data transfer request target data is read from the non-volatile memory 111 and prepared in the data buffer 117. After S202, the CPU 101 repeatedly polls the memory completion queue 115 in the RAM 102 to find out whether the completion status has been stored in the memory completion queue 115 (S205).

Upon learning that the read data transfer completion status has been stored as a result of the polling, the CPU 101 stores an NCD processing order that orders generation of a DMA data transfer request in the NCD request queue 116 in the RAM 102 (S206). Subsequently, the CPU 101 notifies the network control device 104 that the NCD processing order has been stored (S207). Upon receiving the notification, the network control device 104 transmits a DMA data transfer request to the RAM 102 based on the NCD processing order (S208). The DMA transfer request target data is transferred from the RAM 102 to the network control device 104 (S209).

Thus, the CPU 101 waits until the data read from the non-volatile memory 111 is completed before the NCD processing order is generated. Accordingly, an NCD processing order is not issued until the completion, and the waiting time until the completion makes the time taken from start to completion of the process of transferring data in the non-volatile memory 111 to the network control device 104 longer. The CPU 101 repeatedly polls the RAM 102 to find out whether the read data transfer completion status has been stored in the memory completion queue 115. The execution of polling consumes computational resources, namely, resources of the CPU 101.

According to the first embodiment, the control part 30 is capable of notifying an order destination (network control device 7) that an order for generating a DMA data transfer request has been stored in a queue (NCD submission queue 36) before a status indicating that reading of the DMA transfer request target data has been completed is transmitted (prior to completion of reading). Accordingly, the control part 30 does not need to wait until the DMA transfer request target data is prepared to transmit a DMA data transfer request. This reduces the waiting time by the control part 30, and enables an efficient operation of the control part 30, which in turn results in an efficient operation of the storage system 1. Also, the control part 30 does not need to perform polling to learn that the completion status has been transmitted. This avoids consumption of the resources of the CPU 6 required to execute polling.

Also, the storage system 1 includes a data wait management unit 40. The data wait management unit 40 is capable of storing a DMA data transfer request and a read data transfer completion status, and outputs, when a read data transfer completion status corresponding to the DMA data transfer request is stored, the DMA data transfer request. This enables execution of the DMA data transfer request to be started after the DMA data transfer request target data is prepared. It is thereby possible to issue a DMA data transfer request before DMA transfer request target data is prepared.

1.4. Modification

Figure 10:
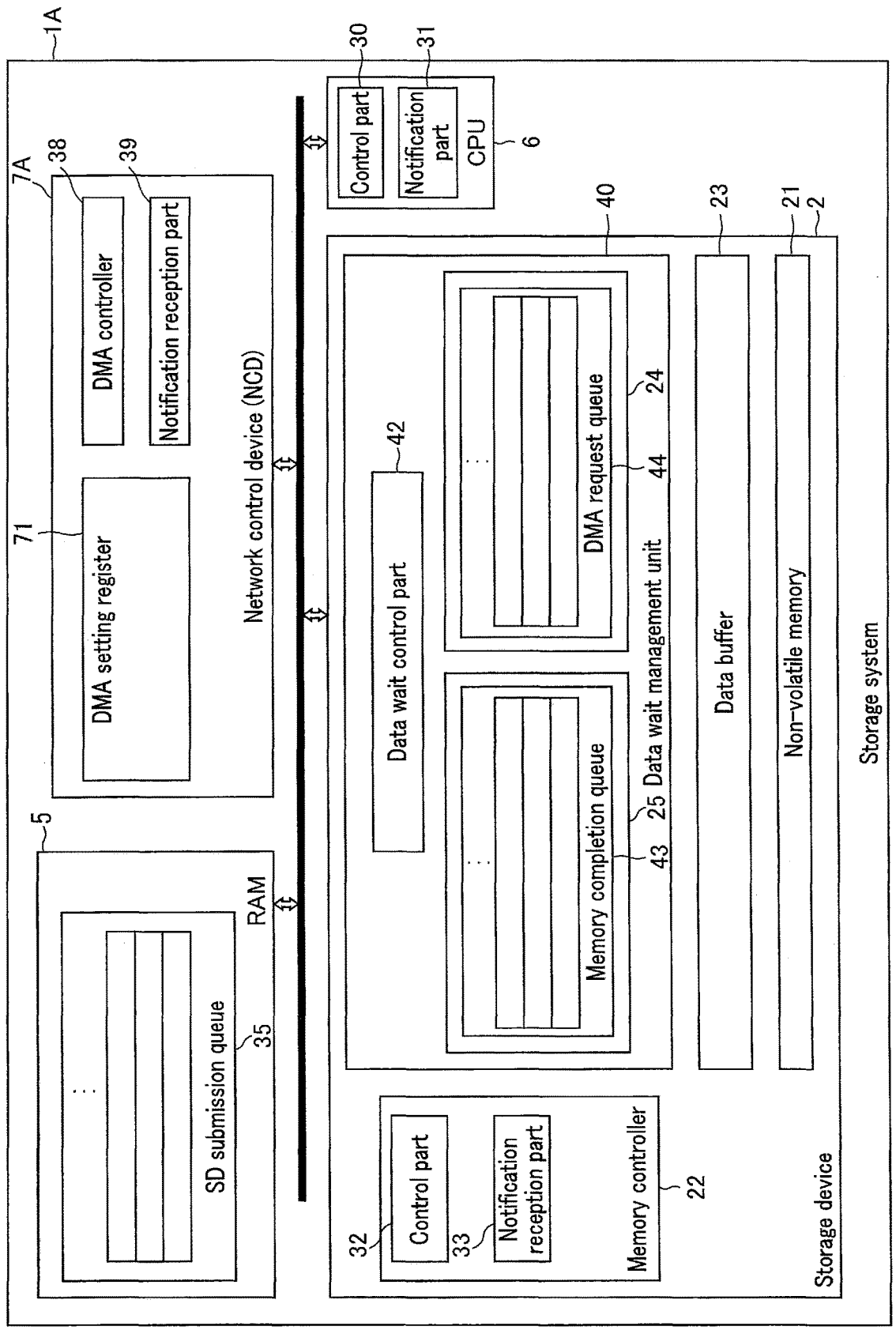
FIG. 10 shows functional blocks of a storage system according to a modification of the first embodiment.

The NCD processing order may be stored in the network control device 7 instead of being stored in the RAM 5 (in the NCD submission queue 36, in particular). FIG. 10 shows such an example, in which a functional block of the storage system 1A according to a modification of the first embodiment is shown. Hereinafter, a description will be given mainly of differences from the basic forms of the first embodiment.

As shown in FIG. 10, the network control device 7A according to the modification includes a register (storing device) 71.

Figure 11:
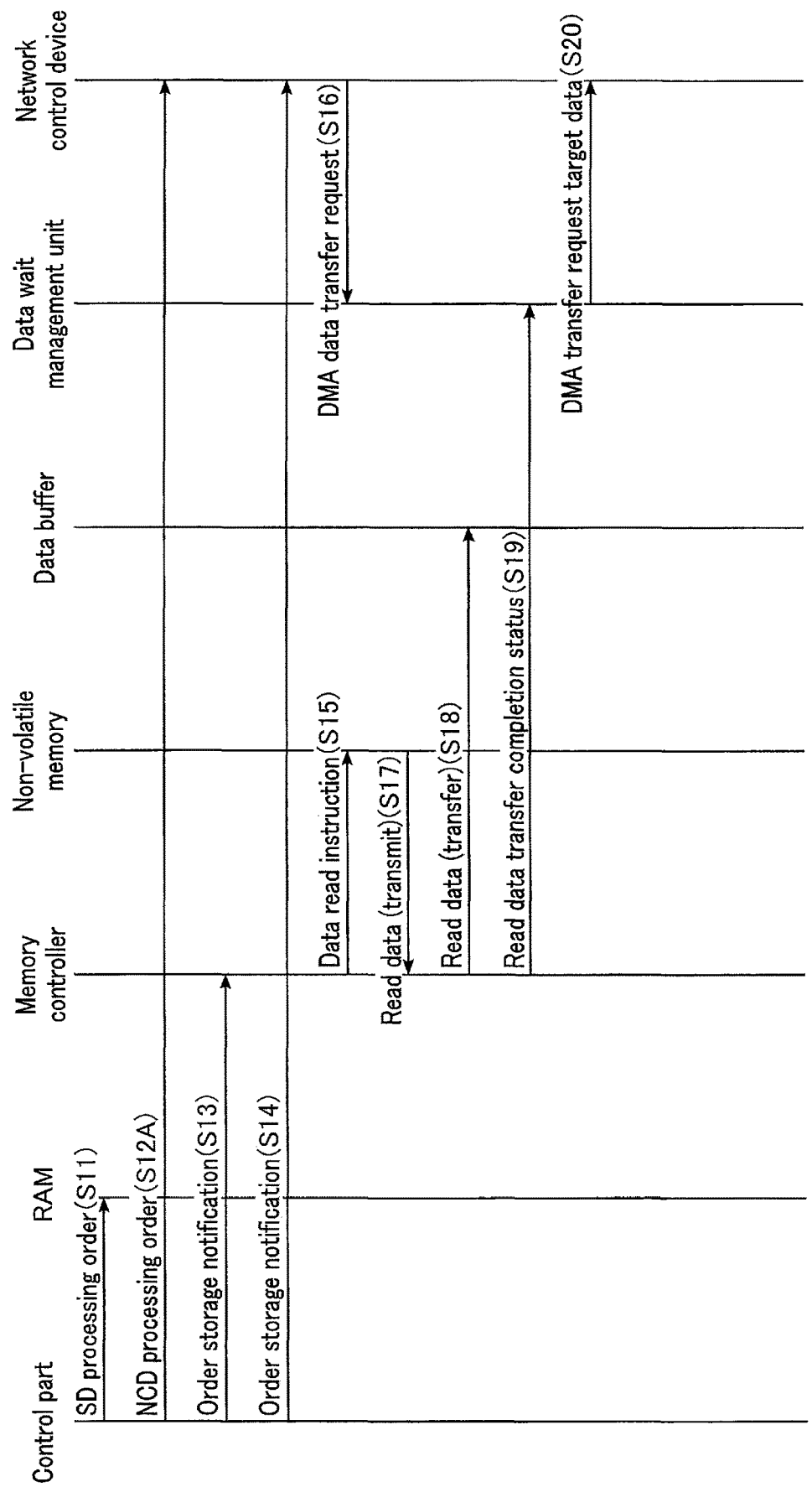
FIG. 11 is a sequence diagram of an operation in the storage system according to the modification of the first embodiment.

FIG. 11 is a sequence diagram of an operation in the storage system 1A according to the modification. As shown in FIG. 11, instead of S12 in FIG. 5, the control part 30 generates an NCD processing order, and stores the generated NCD processing order in a register 71 (S12A). After S14, namely, upon learning that the NCD processing order has been stored, the network control device 7 reads the NCD processing order from the register 71, and generates and transmits a DMA data transfer request (S16).

FIG. 12 shows data generated and transmitted and received during a process in the storage system 1A according to the modification, specifically, data generated and transmitted and received during the process of FIG. 11. As shown in FIG. 12, the NCD processing order is stored in the register 71 (S12A). The NCD processing order includes at least the transfer destination buffer address BFADD and the transfer target data size SIZE. An order storage notification is transmitted to the network control device 7 (S14). A DMA data transfer request is stored in the DMA request queue 44 (S16).

The modification can be applied to a second embodiment to be described below as well as the other embodiments.

2. Second Embodiment

A second embodiment differs from the first embodiment in terms of the destination of data transfer by the DMA.

2.1. Configuration

2.1.1. Overall Hardware Configuration

Figure 13:
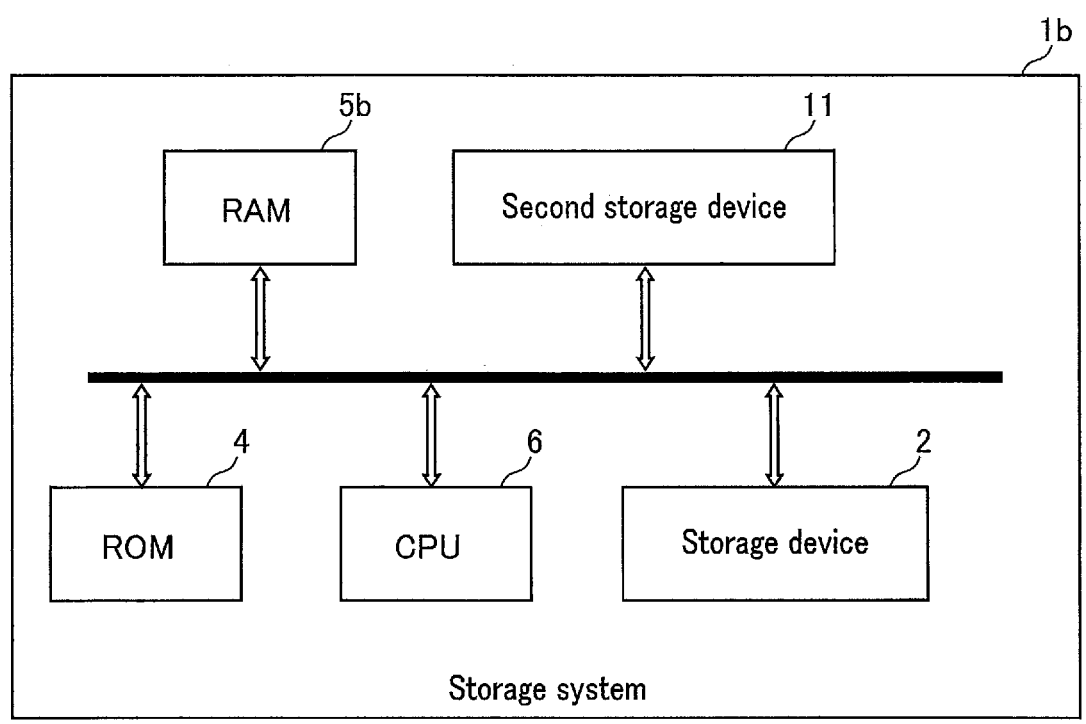
FIG. 13 shows an example of a hardware configuration of a storage system according to a second embodiment.

FIG. 13 shows an example of a hardware configuration of a storage system according to the second embodiment. A storage system 1b includes hardware such as a storage device 2, a ROM 4, a RAM 5, a CPU 6, and a second storage device 11. The storage device 2, the ROM 4, the RAM 5, the CPU 6, and the second storage device 11 are coupled to, for example, a bus in the storage system 1b to enable interactive communications.

The second storage device 11 is a device that stores data, similarly to the storage device 2, and is, for example, an SSD. The second storage device 11 includes hardware, similarly to the storage device 2 as shown in FIG. 2, and includes a non-volatile memory and a memory controller.

2.1.2. Functional Configuration of Storage System

Figure 14:
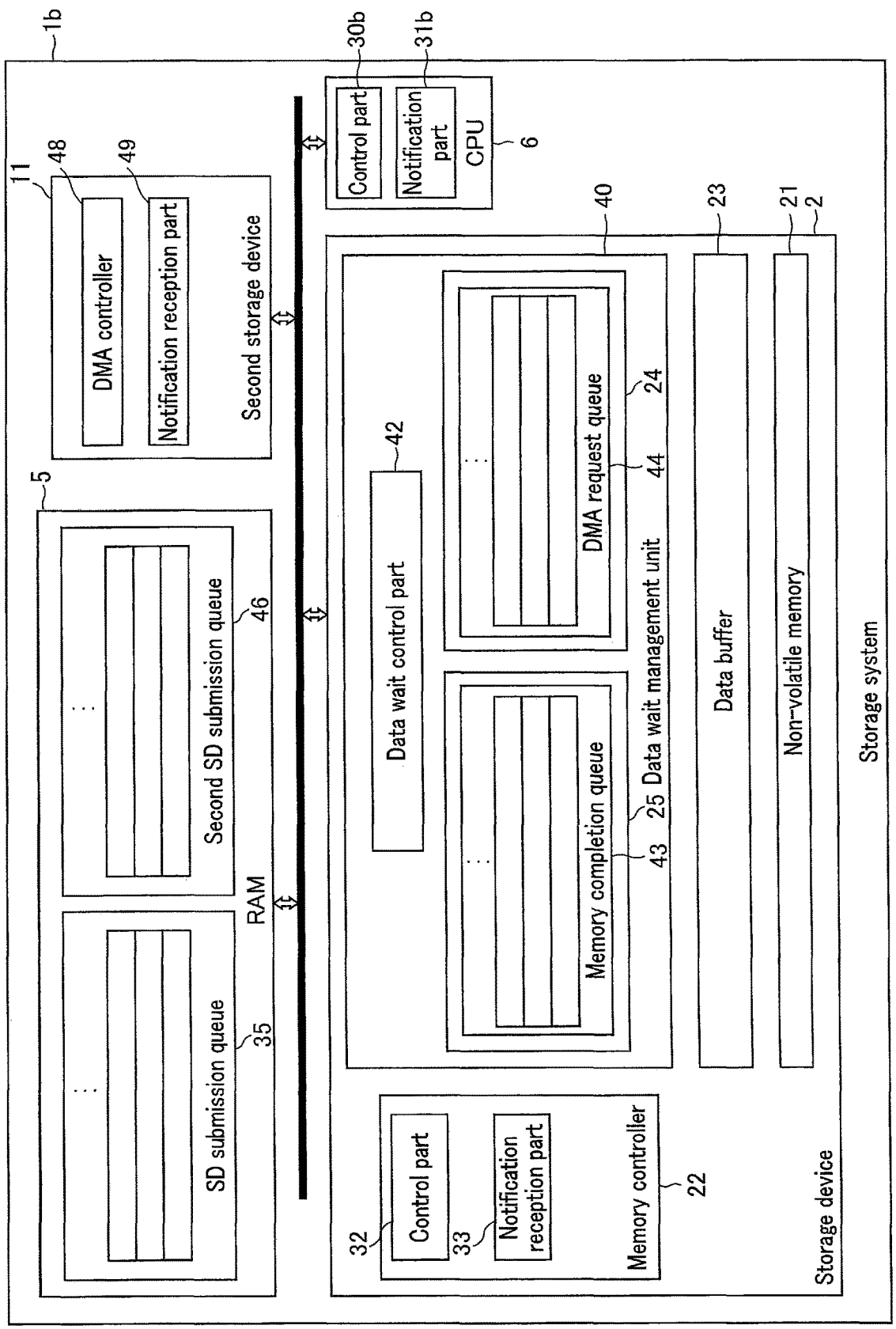
FIG. 14 shows functional blocks of the storage system according to the second embodiment.

FIG. 14 shows functional blocks of the storage system 1b according to the second embodiment. The storage system 1b is capable of serving the functions of the functional blocks to be described below with reference to FIG. 14, using the hardware and software included in the storage system 1b.

As shown in FIG. 14, the storage system 1b includes a control part 30b, a notification part 31b, a control part 32, a notification reception part 33, an SD submission queue 35, a second SD submission queue 46, a DMA controller 48, a notification reception part 49, and a data wait management unit 40.

The second SD submission queue 46 is a queue that stores an order on the second storage device 11. Hereinafter, an order on the second storage device 11 may be referred to as a second SD processing order. The second SD submission queue 46 can be realized by a memory space of the RAM 5. A functional block that desires execution of a process by the second storage device 11 transmits an order containing details of the process to the second SD submission queue 46. The second SD submission queue 46 includes a plurality of entries. The orders are stored in and output from entries according to the first-in-first-out principle. An order in a head entry is an order to be output next. The second SD submission queue 46 is, for example, an submission queue defined by NVMe.

The DMA controller 48 is a functional block that performs control for allowing the second storage device 11 to access the storage device 2 without intervention of the CPU 6 (control part 30b). In the second storage device 11, the DMA controller 48 can be realized by, for example, a dedicated circuit or a combination of a program and a CPU in a memory controller of the second storage device 11.

The notification reception part 49 receives a notification from the notification part 31b. In the second storage device 11, the notification reception part 49 can be realized by, for example, a dedicated circuit or a combination of a program and a CPU in the memory controller of the second storage device 11. When the notification reception part 49 receives a notification, the second storage device 11 learns reception of the notification. Upon learning that the notification has been received, the second storage device 11 reads an order in the head entry in the second SD submission queue 46, and executes the order. If the executed order orders DMA data transfer, the notification reception part 49 notifies the DMA controller 48 of reception of the notification. Upon learning the reception of the notification, the DMA controller 48 executes the stored in the head entry in the second SD submission queue 46. The notification reception part 49 is, for example, a doorbell.

2.2. Operation

FIG. 15 is a sequence diagram of an operation in the storage system 1b according to the second embodiment. Specifically, FIG. 15 shows a process in which the control part 30b transfers data stored in the non-volatile memory 21 to the second storage device 11. The operation of FIG. 15 is started when the control part 30b determines to transfer data stored in the non-volatile memory 21 to the second storage device 11. As an example, data transfer to the second storage device 11 is performed for the purpose of writing data to be transferred into the second storage device 11.

As shown in FIG. 15, S11 of the first embodiment is performed. That is, the control part 30b stores an SD processing order in the SD submission queue 35. The SD processing order includes information that designates a data read, a logical address LBA of DMA transfer request target data, a transfer destination buffer address BFADD, and a transfer target data size SIZE.

The control part 30b generates an order (second SD processing order) on the second storage device 11, and stores the generated second SD processing order in the second SD submission queue 46 in the RAM 5 (S21). The second SD processing order orders writing of data into the second storage device 11, and use of data in the data buffer 23 as write data. For that purpose, the second SD processing order includes information that designates a data write, a logical address LBA of write data, a data buffer address, and data size information. The logical address LBA of write data is the same as the logical address LBA of the DMA transfer request target data. The data buffer address in the second SD processing order is the transfer destination buffer address BFADD. The data size in the second SD processing order is the transfer target data size SIZE.

After S11, then S13 of the first embodiment is performed. That is, the control part 30b transmits an order storage notification to the memory controller 22.

After S21, namely, after the control part 30b stores the second SD processing order in the second SD submission queue 46 in the RAM 5, the notification part 31b transmits a notification (order storage notification) that a second SD processing order has been stored in the second SD submission queue 46 to the second storage device 11 (S22). The order storage notification is received by the notification reception part 49 in the second storage device 11. Through reception of the order storage notification, the second storage device 11 learns that a new order has been stored in the second SD submission queue 46.

After S21, then S15 of the first embodiment is performed. That is, the memory controller 22 instructs the non-volatile memory 21 to perform a data read based on the SD processing order.

After S22, namely, upon learning that the order has been stored in the second SD submission queue 46, the second storage device 11 transmits a DMA data transfer request based on the second SD processing order (S23). Specifically, the second storage device 11 reads the second SD processing order from the second SD submission queue 46, and receives the second SD processing order. The second SD processing order includes, as described with reference to S21, a data buffer address (i.e., transfer destination buffer address BFADD) and size information (i.e., transfer target data size SIZE). When the second storage device 11 receives the second SD processing order, the second storage device 11 learns that a DMA data transfer is required to execute the process indicated by the second SD processing order. Based thereon, the DMA controller 48 generates a required DMA data transfer request. The generated DMA data transfer request includes the transfer destination buffer address BFADD and the transfer target data size SIZE. The DMA controller 48 transmits the generated DMA data transfer request (target DMA data transfer request) to the storage device 2.

The target DMA data transfer request is transferred to the data wait management unit 40, and is received by the data wait management unit 40, for example, under the control of the memory controller 22. The data wait control part 42 of the data wait management unit 40 stores the received target DMA data transfer request in the DMA request queue 44. The data wait control part 42 periodically retrieves an entry corresponding to the stored target DMA data transfer request. Until a result of the retrieval is returned as a hit, the data wait control part 42 does not process the stored target DMA data transfer request.

After S15, then S17, S18, and S19 of the first embodiment are performed. That is, the non-volatile memory 21 transmits read data based on a read command set to the memory controller 22 (S17). The memory controller 22 transfers the read data to the data buffer 23 (S18). The control part 32 in the memory controller 22 transmits a read data transfer completion status to the data wait management unit 40 (S19). One or more of S15, S17, and S18 can be performed in parallel with S23.

After S23, similarly to the first embodiment, the data wait control part 42 periodically retrieves an entry corresponding to the target DMA data transfer request from the memory completion queue 43. That is, the data wait management unit 40 executes the flow shown in FIG. 4. If an entry corresponding to the target DMA data transfer request is returned as a hit as a result of the execution of the flow, the data wait management unit 40 transfers data having a size of the transfer target data size SIZE in the transfer destination buffer address BFADD, namely, the DMA transfer request target data, to the network control device 7 (S24). Through completion of S24, the processing of FIG. 15 ends. Upon receiving the DMA transfer request target data, the second storage device 11 uses it as write data, and performs data writing based on the second SD processing order.

Figure 16:
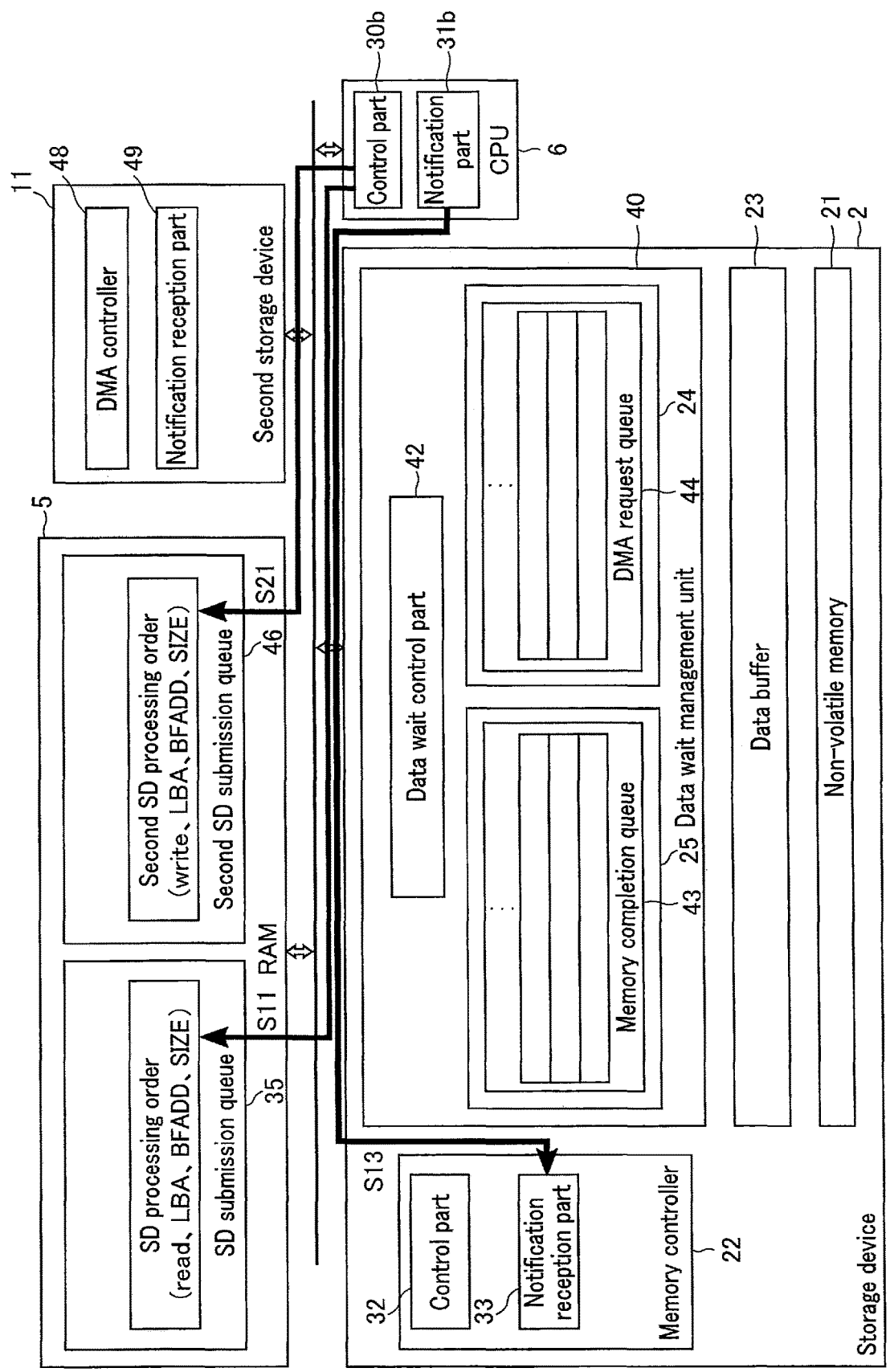
FIG. 16 shows data generated and transmitted and received during a process in the storage system according to the second embodiment.
Figure 17:
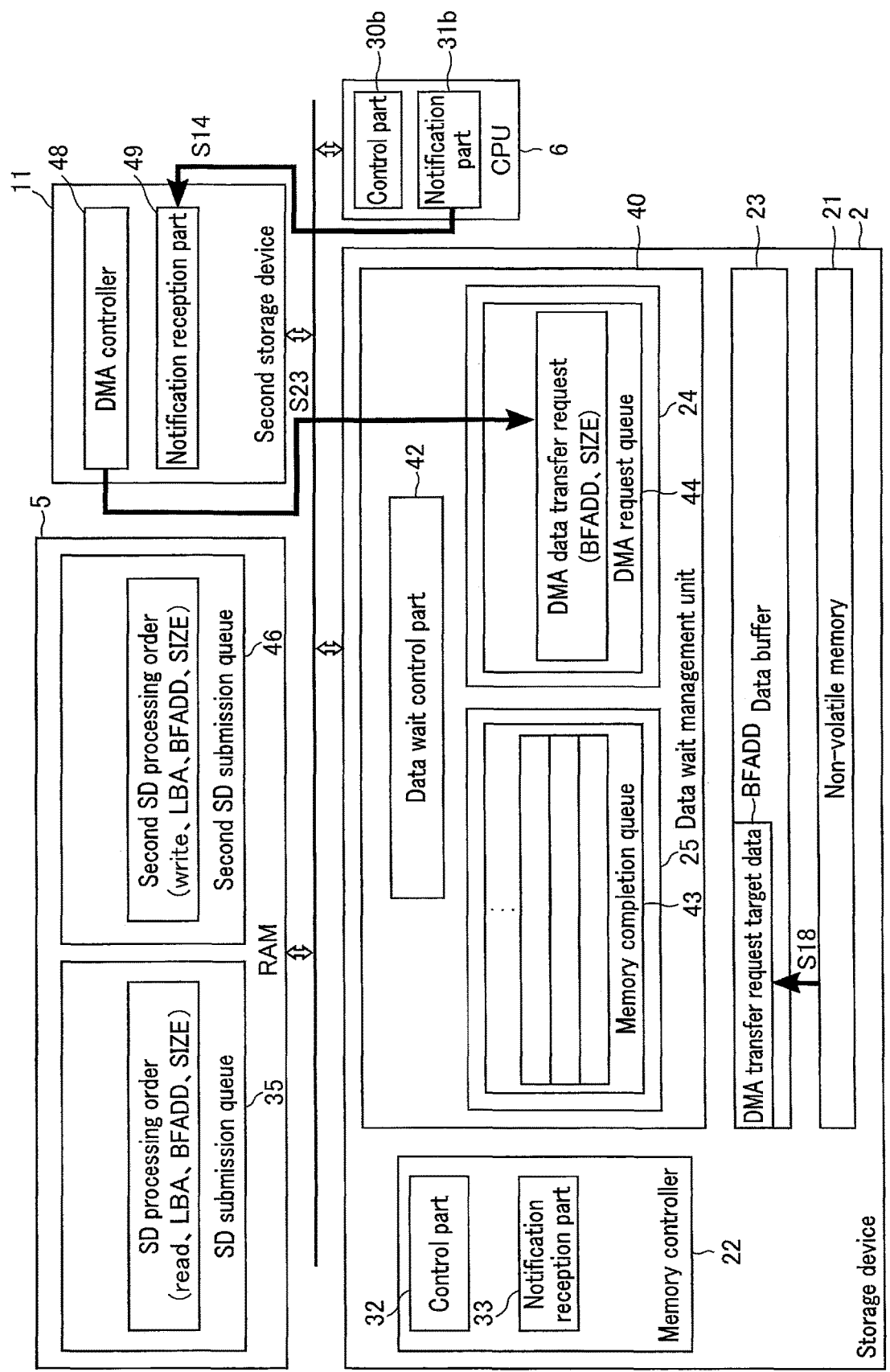
FIG. 17 shows data generated and transmitted and received during a process in the storage system according to the second embodiment.

FIGS. 16 to 18 show data generated and transmitted and received during a process in the storage system 1b according to the second embodiment, specifically, data generated and transmitted and received during the process of FIG. 15. FIGS. 16 to 18 show only data generated and transmitted and received in the process of FIG. 15. FIG. 17 shows a state subsequent to the state of FIG. 16, and FIG. 18 shows a state subsequent to the state of FIG. 17. As shown in FIG. 16, the SD processing order is stored in the SD submission queue 35 (S11). The SD processing order includes a data read designation, the logical address LBA of DMA transfer request target data, the transfer destination buffer address BFADD, and the transfer target data size SIZE. The second SD processing order is stored in the second SD submission queue 46 (S21). The second SD processing order includes a data write designation, the logical address LBA of DMA transfer request target data (write data), the transfer destination buffer address BFADD, and the transfer target data size SIZE. An order storage notification is transmitted to the memory controller 22 (S13).

As shown in FIG. 17, the order storage notification is transmitted to the second storage device 11 (S14). The DMA data transfer request is stored in the DMA request queue 44 (S23). The DMA data transfer request includes the transfer destination buffer address BFADD and the transfer target data size SIZE. Under the control of the memory controller 22, the DMA transfer request target data is stored in an area of the transfer destination buffer address BFADD (S18).

As shown in FIG. 18, the read data transfer completion status is stored in the memory completion queue 43 (S19). The read data transfer completion status includes the transfer destination buffer address BFADD and the transfer target data size SIZE. Under the control of the data wait management unit 40, the DMA transfer request target data is transferred to the second storage device 11 (S24).

2.3. Advantages

According to the second embodiment, as in the first embodiment, the control part 30b is capable of notifying an order destination (second storage device 11) that an order for generating a DMA data transfer request has been stored in a queue (second SD submission queue 46) before a status indicating that reading of the DMA transfer request target data has been completed is transmitted. Also, the storage system 1b includes a data wait management unit 40. Thus, even if the destination of data transfer by the DMA is the second storage device 11 unlike in the first embodiment, it is possible to obtain the same advantages as can be obtained by the first embodiment.

3. Third Embodiment

A third embodiment differs from the first and second embodiments in terms of the destination of data transfer by the DMA.

3.1. Configuration 3.1.1. Overall Hardware Configuration

FIG. 19 shows an example of a hardware configuration of a storage system according to the third embodiment. A storage system 1c includes hardware such as a storage device 2, a ROM 4, a RAM 5, a CPU 6, and a graphics device 12. The storage device 2, the ROM 4, the RAM 5, the CPU 6, and the second storage device 11 are coupled to, for example, a bus in the storage system 1c to enable interactive communications.

The graphics device 12 is a device that performs graphics processing, including plotting, of the processing performed by the storage system 1c. The graphics device 12 is, for example, a graphics card.

FIG. 20 shows an example of a hardware configuration of the graphics device 12 according to the third embodiment. As shown in FIG. 20, the graphics device 12 includes a GPU 51 and a dedicated memory 52. The GPU 51 performs various types of graphics processing by executing programs loaded into the dedicated memory 52 from the ROM in the storage system 1c. The dedicated memory 52 is a memory dedicated solely for use by the graphics device 12, in particular, the GPU 51, and is, for example, a DRAM.

3.1.2. Functional Configuration of Storage System

Figure 21:
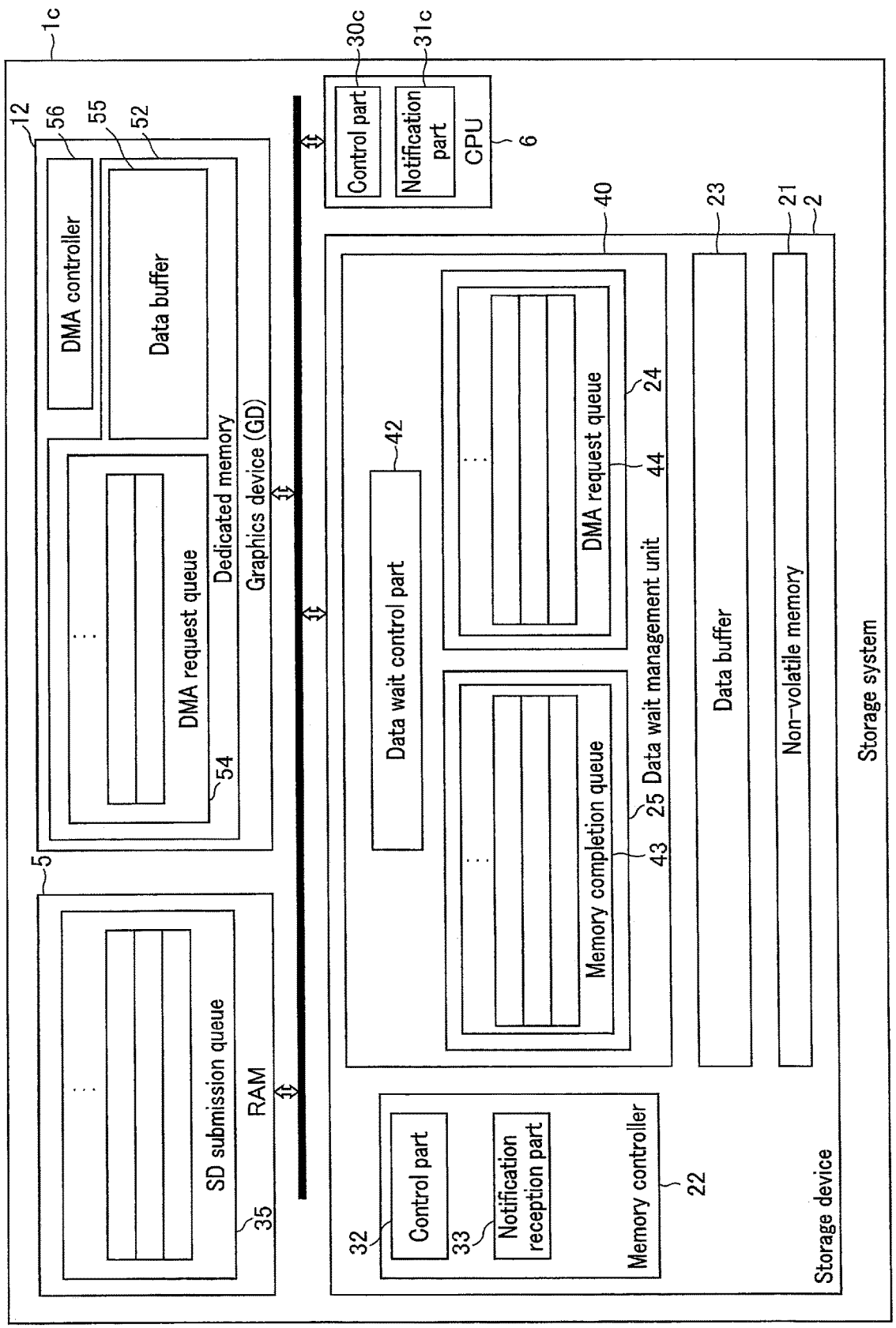
FIG. 21 shows functional blocks of the storage system according to the third embodiment.

FIG. 21 shows functional blocks of a storage system 1c according to the third embodiment. The storage system 1c is capable of serving the functions of the functional blocks to be described below with reference to FIG. 21, using the hardware and software included in the storage system 1c.

As shown in FIG. 21, the storage system 1c includes a control part 30c, a notification part 31c, a control part 32, a notification reception part 33, an SD submission queue 35, a DMA request queue 54, a data buffer 55, a DMA controller 56, and a data wait management unit 40.

The DMA request queue 54 is a queue that stores a DMA data transfer request generated by the DMA controller 56. The DMA request queue 54 can be realized by a memory space of the dedicated memory 52. The DMA request queue 54 includes a plurality of entries. The orders are stored in and output from entries according to the first-in-first-out principle.

The data buffer 55 can be realized by a memory space of the dedicated memory 52.

The DMA controller 56 is a functional block that performs control for allowing the graphics device 12 to access the storage device 2 without intervention of the CPU 6 (control part 30c). In the graphics device 12, the DMA controller 56 can be realized by, for example, a dedicated circuit or a combination of a program and the GPU 51 in the graphics device 12.

3.2. Operation

Figure 22:
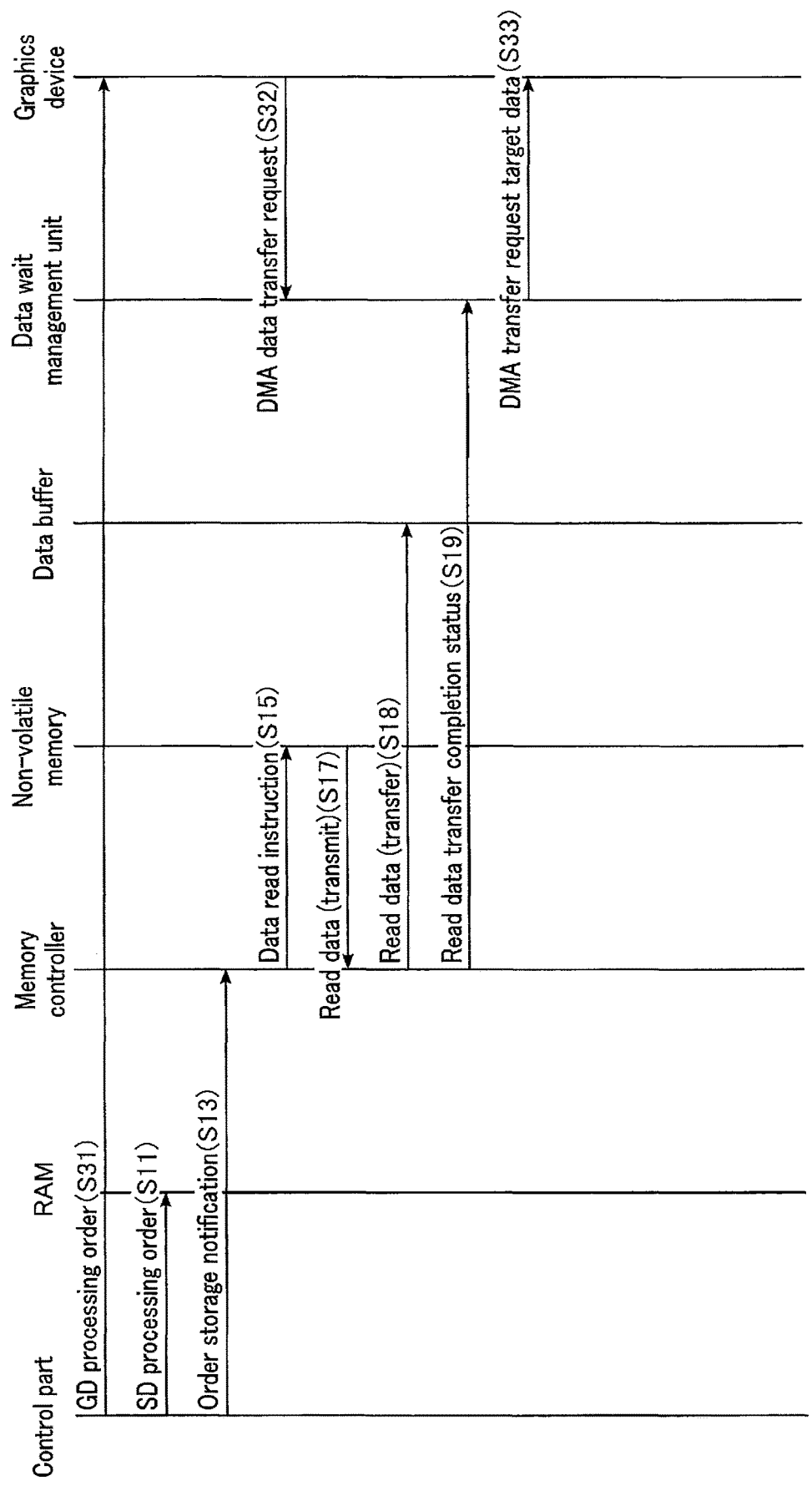
FIG. 22 is a sequence diagram of an operation in the storage system according to the third embodiment.

FIG. 22 is a sequence diagram of an operation in the storage system 1c according to the third embodiment. Specifically, FIG. 22 shows a process in which the control part 30c transfers data stored in the non-volatile memory 21 to the graphics device 12. The operation of FIG. 22 is started when the control part 30c determines to transfer data stored in the non-volatile memory 21 to the graphics device 12.

As shown in FIG. 22, the control part 30c orders that the graphics device 12 execute a process including access to the storage device 2 (S31). Hereinafter, an order on the graphics device 12 may be referred to as a "GD processing order". The GD processing order orders the graphics device 12 to acquire data of a size in an area of an address in the data buffer 23. An address and a size instructed by the GD processing order are, respectively, a transfer destination buffer address BFADD and a transfer target data size SIZE.

After S31, namely, upon receiving a GD processing order, the graphics device 12 generates, based on the GD processing order, a DMA data acquisition request, stores the generated DMA data acquisition request in the DMA request queue 54, and transmits a DMA data transfer request to the storage device 2 (S32). Specifically, the DMA controller 56 generates a DMA data acquisition request. The DMA data acquisition request includes information on an address and a data size of an area in the data buffer 23 in the storage device 2, and an address gbfadd of an area in the data buffer 55 in the graphics device 12. The address and size information of the area in the data buffer 23 in the DMA data acquisition request are respectively the transfer destination buffer address BFADD and the transfer target data size SIZE. The address gbfadd of an area in the data buffer 55 in the graphics device 12 is an address of an area in which DMA transfer request target data is to be stored in the data buffer 55.

The DMA controller 56 generates a DMA data transfer request based on the DMA data acquisition request. The DMA data transfer request includes a data read request and information on an address and a data size of an area in the data buffer 23 in the storage device 2. The address and the data size are the same as the address and the data size, respectively, of the area in the data buffer 23 in the DMA data transfer request, and are the transfer destination buffer address BFADD and the transfer target data size SIZE, respectively. The DMA controller 56 transmits the generated DMA data transfer request (target DMA data transfer request) to the storage device 2.

The target DMA data transfer request is transferred to the data wait management unit 40, and is received by the data wait management unit 40, for example, under the control of the memory controller 22. The data wait control part 42 of the data wait management unit 40 stores the received target DMA data transfer request in the DMA request queue 44. The data wait control part 42 periodically retrieves an entry corresponding to the stored target DMA data transfer request. Until a result of the retrieval is returned as a hit, the data wait control part 42 does not process the stored target DMA data transfer request.

After S31, then S11, S13, S15, S17, S18, and S19 of the first embodiment are performed. That is, the control part 30c stores an SD processing order in the SD submission queue 35 (S11). The control part 30c transmits an order storage notification to the memory controller 22 (S13). The memory controller 22 instructs the non-volatile memory 21 to perform a data read based on the SD processing order (S15). The non-volatile memory 21 transmits read data based on a read command set to the memory controller 22 (S17). The memory controller 22 transfers the read data to the data buffer 23 (S18). The control part 32 in the memory controller 22 transmits a read data transfer completion status to the data wait management unit 40 (S19). One or more of S15, S17, and S18 can be performed in parallel with S32.

After S32, similarly to the first embodiment, the data wait control part 42 periodically retrieves an entry corresponding to the target DMA data transfer request from the memory completion queue 43. That is, the data wait management unit 40 executes the flow shown in FIG. 4. If an entry corresponding to the target DMA data transfer request is returned as a hit as a result of the execution of the flow, the data wait management unit 40 transfers data of a size the transfer target data size SIZE in the transfer destination buffer address BFADD, namely, the DMA transfer request target data, to the graphics device 12 (S33). Through completion of S33, the processing of FIG. 22 ends. The DMA transfer request target data is stored in an area of an address gbfadd in the data buffer 55.

FIGS. 23 to 25 show data generated and transmitted and received during a process in the storage system 1c according to the third embodiment, specifically, data generated and transmitted and received during the process of FIG. 22. FIGS. 23 to 25 show only data generated and transmitted and received in the process of FIG. 22. FIG. 24 shows a state subsequent to the state of FIG. 23, and FIG. 25 shows a state subsequent to the state of FIG. 24.

As shown in FIG. 23, the GD processing order is transmitted to the graphics device 12 (S31). The GD processing order includes the transfer destination buffer address BFADD and the transfer target data size SIZE. The SD processing order is stored in the SD submission queue 35 (S11). The SD processing order includes a data read designation, the logical address LBA of DMA transfer request target data, the transfer destination buffer address BFADD, and the transfer target data size SIZE. An order storage notification is transmitted to the memory controller 22 (S13).

As shown in FIG. 24, the DMA data acquisition request is stored in the DMA request queue 54, and the DMA data transfer request is stored in the DMA request queue 44 (S32). The DMA data acquisition request includes the address gbfadd in the data buffer 55, the transfer destination buffer address BFADD, and the transfer target data size SIZE. The DMA data transfer request includes the transfer destination buffer address BFADD and the transfer target data size SIZE. Under the control of the memory controller 22, the DMA transfer request target data is stored in an area of the transfer destination buffer address BFADD (S18).

As shown in FIG. 25, the read data transfer completion status is stored in the memory completion queue 43 (S19). The read data transfer completion status includes the transfer destination buffer address BFADD and the transfer target data size SIZE. The DMA transfer request target data is transferred to the graphics device 12 under the control of the data wait management unit 40 (S33). The DMA transfer request target data is stored in an area of an address gbfadd in the data buffer 55.

3.3. Advantages

According to the third embodiment, as in the first embodiment, the control part 30c is capable of ordering the graphics device 12 to generate a DMA data transfer request before a status indicating that reading of the DMA transfer request target data has been completed is transmitted. Also, the storage system 1c includes a data wait management unit 40. Thus, even if the destination of data transfer by the DMA is the graphics device 12 unlike in the first embodiment, it is possible to obtain the same advantages as can be obtained by the first embodiment.

3.4. Modification

The description given above is based on an example in which the operation of FIG. 22 is started when the control part 30c determines to transfer data stored in the non-volatile memory 21 to the graphics device 12. The third embodiment is not limited to this example. For example, the operation of FIG. 22 may be started when the graphics device 12, in particular, the GPU 51, recognizes the necessity to transfer data stored in the non-volatile memory 21 to the graphics device 12. In this example, instead of execution of S31 in FIG. 22, the graphics device 12 notifies the control part 30c of the desire for DMA transfer request target data desired by the graphics device 12, the logical address LBA of the DMA transfer request target data, the transfer destination buffer address BFADD, and the transfer target data size SIZE. Upon receiving the notification, the control part 30c performs S11.

4. Fourth Embodiment

A fourth embodiment relates to processing of two different DMA data transfer requests, and relates to operations performed in addition to those in the first to third embodiments. An example in which the fourth embodiment is applied to the first embodiment will be described below as a representative. An example in which the fourth embodiment is applied to the second or third embodiment can be inferred by a person skilled in the art based on the description that follows.

4.1. Configuration

A storage system 1d of the fourth embodiment has the same hardware configuration as that of the storage system 1 of the first embodiment.

4.2. Operation

Figure 26:
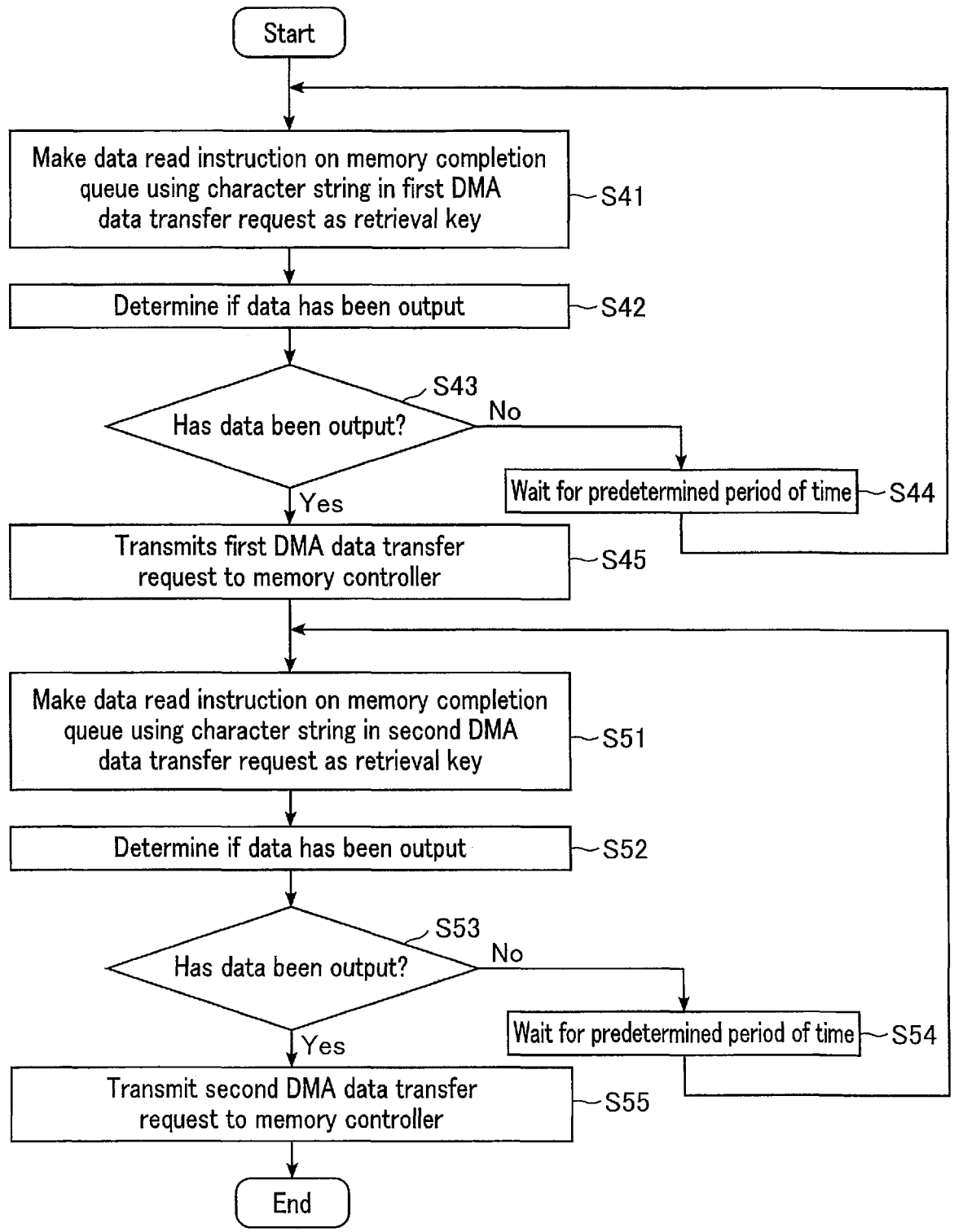
FIG. 26 shows a flow of an operation of a data wait management unit according to a fourth embodiment.

FIG. 26 shows a flow of an operation of the data wait management unit 40 according to the fourth embodiment. The flow of FIG. 26 can be started, for example, when a new DMA data transfer request is stored in a DMA request queue 44, when a DMA data transfer request in a head entry of the DMA request queue 44 is changed, when a new completion status is stored in a memory completion queue 43, or when a predetermined periodic timing comes. The flow of FIG. 4 shows a first DMA data transfer request in the head entry and a second DMA data transfer request in a second entry from the head.

As shown in FIGS. 26, S41, S42, S43, S44, and S45 are performed. Except for differences in data that is handled therein, S41, S42, S43, S44, and S45 are the same as S1, S2, S3, S4, and S5, respectively, of FIG. 4 of the first embodiment. The data wait control part 42 instructs the memory completion queue 43 to perform a data read using a character string in the first DMA data transfer request as a retrieval key (S41). The data wait control part 42 determines whether data designated by the retrieval key has been output from the memory completion queue 43 (S42). If the instructed data has not been output from the memory completion queue 43 (S43; No), the data wait control part 42 waits for a predetermined period of time (S44). After S44, the flow continues to S41. Instead of S44, another process may be performed. Examples of another process include a new DMA data transfer request having been stored in the DMA request queue 44, a new completion status having been stored in the memory completion queue 43, and a predetermined periodic timing having arrived. If the data designated by the retrieval key has been output from the memory completion queue 43 (S43; Yes), the data wait control part 42 transmits a first DMA data transfer request to the memory controller 22 (S45).

After S45, then S51, S52, S53, S54, and S55 are performed. Except for differences in data that is handled therein, S51, S52, S53, S54, and S55 are the same as S1, S2, S3, S4, and S5, respectively, of FIG. 4 of the first embodiment. The data wait control part 42 instructs the memory completion queue 43 to perform a data read using a character string in the second DMA data transfer request as a retrieval key (S51). The data wait control part 42 determines whether data designated by the retrieval key has been output from the memory completion queue 43 (S52). If the instructed data has not been output from the memory completion queue 43 (S53; No), the data wait control part 42 waits for a predetermined period of time (S54). After S54, the flow continues to S51. Instead of S54, another process may be performed. Examples of another process include a new DMA data transfer request having been stored in the DMA request queue 44, a new completion status having been stored in the memory completion queue 43, and a predetermined periodic timing having arrived. If the data designated by the retrieval key has been output from the memory completion queue 43 (S53; Yes), the data wait control part 42 transmits a second DMA data transfer request to the memory controller 22 (S55). After completion of S55, the flow of FIG. 26 is completed.

Figure 27:
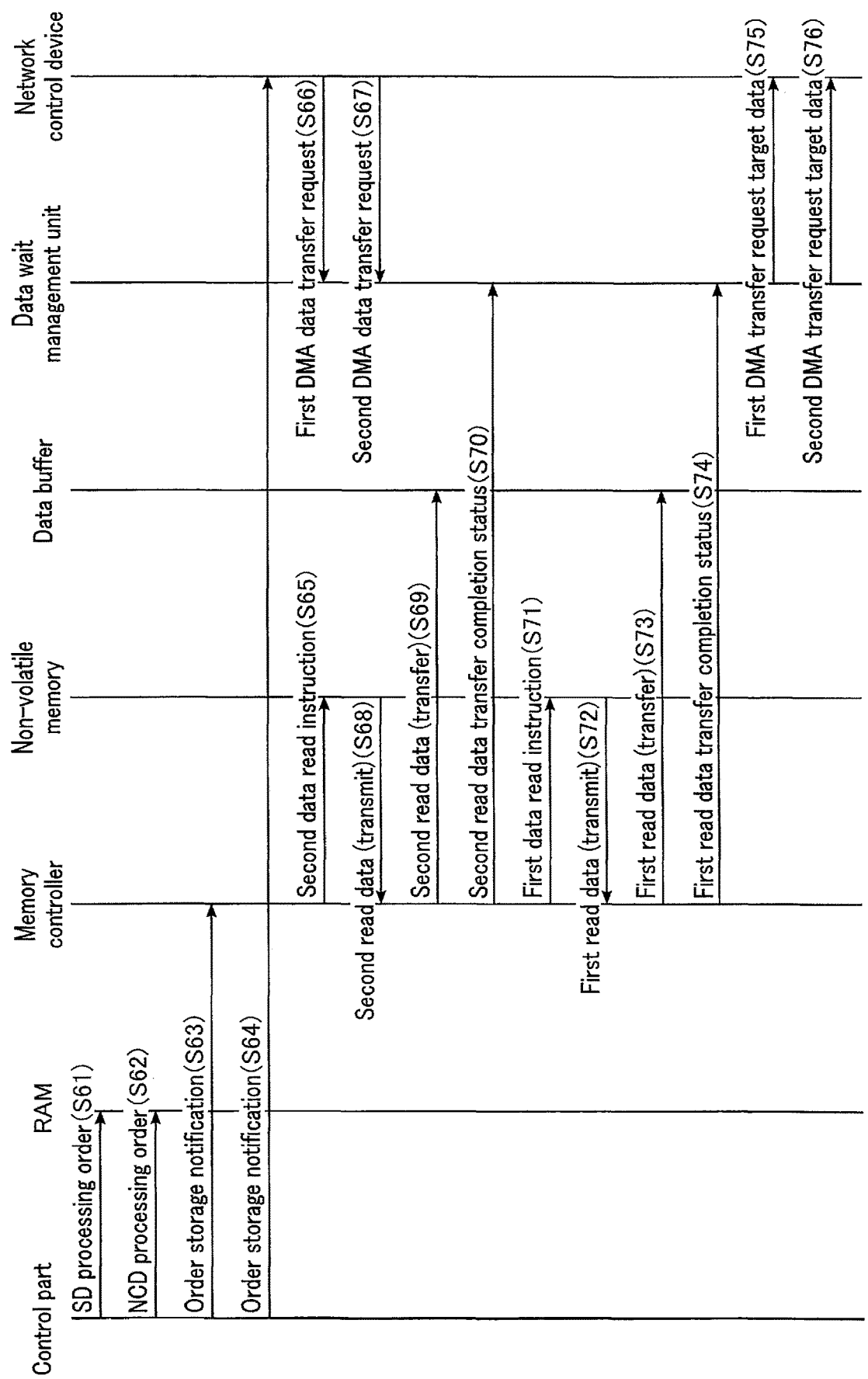
FIG. 27 is a sequence diagram of an operation in the storage system according to the fourth embodiment.

FIG. 27 is a sequence diagram of an operation in the storage system 1d according to the fourth embodiment. Specifically, FIG. 27 shows a process in which the control part 30 transfers two items of data stored in the non-volatile memory 21 to the network control device 7. The operation of FIG. 27 is started when the control part 30 determines to transfer two different items of data stored in the non-volatile memory 21 to the network control device 7.

As shown in FIG. 27, the control part 30 generates a first SD processing order and a second SD processing order, and stores the generated first and second SD processing orders in the SD submission queue 35 in the RAM 5 (S61). Each SD processing order orders reading of data, and includes information on a logical address, a data buffer address, and a data size of the read target data. The data designated by the first SD processing order is data of a first logical address LBA1, and may be referred to as "first DMA transfer request target data". The data designated by the second SD processing order is data of a second logical address LBA2, and may be referred to as "second DMA transfer request target data". The first DMA transfer request target data is data of a size of the first transfer target data size SIZE1 in an area of a first transfer destination buffer address BFADD1. The second DMA transfer request target data is data of a size of a second transfer target data size SIZE2 in an area of the second transfer destination buffer address BFADD2.

The control part 30 generates a first NCD processing order and a second NCD processing order, and stores the generated first and second NCD processing orders in the NCD submission queue 36 in the RAM 5 (S62). Each NCD processing order orders that data in the data buffer 23 be transferred to the network control device 7. The first NCD processing order designates, as target data, the first transfer destination buffer address BFADD1 and the transfer target data size SIZE1. The second NCD processing order designates, as target data, the second transfer destination buffer address BFADD2 and the transfer target data size SIZE2. The first and second NCD processing orders may include addresses rdmaadd1 and rdmaadd2, respectively, of a transmission destination device.

After S61, namely, when the control part 30 stores the first SD processing order in the SD submission queue 35, the notification part 31 transmits an order storage notification to the memory controller 22 (S63).

After S62, namely, when the control part 30 stores the second NCD processing order in the NCD submission queue 36, the notification part 31 transmits an order storage notification to the memory controller 22 (S64).

After S63, namely, upon learning that an order has been stored in the SD submission queue 35, the memory controller 22 learns the necessity to perform a process based on the first SD processing order and a process based on the second processing order. The memory controller 22 is not subject to the constraint that the received orders should be processed in the order of reception. Accordingly, the memory controller 22 may perform the process based on the first SD processing order and the process based on the second SD processing order in a given order. As an example, a process based on the second SD processing order is performed first. FIG. 27 and the description that follows are based on this example.

The memory controller 22 instructs the non-volatile memory 21 to perform a second data read based on the second SD processing order (S65). S65 is similar to S15 of the first embodiment. That is, the control part 32 transmits one or more read command sets for reading data of the second logical address LBA2 to the non-volatile memory 21.

After S64, namely, upon learning that an order has been stored in the NCD submission queue 36, the network control device 7 transmits a first DMA data transfer request based on the first NCD processing order (S66). S66 is similar to S16 of the first embodiment. The first DMA data transfer request includes the first transfer destination buffer address BFADD1 and the first transfer target data size SIZE1. The DMA controller 38 transmits the first DMA data transfer request to the storage device 2. The first DMA data transfer request is received by the storage device 2. The first DMA data transfer request is stored in the DMA request queue 44. The data wait control part 42 does not process the first DMA data transfer request until an entry corresponding to the first DMA data transfer request is returned as a hit, similarly to the first embodiment.

After S64, namely, upon learning that an order has been stored in the NCD submission queue 36, the network control device 7 transmits a second DMA data transfer request based on the second NCD processing order (S67). S67 is similar to S16 of the first embodiment. The second DMA data transfer request includes the second transfer destination buffer address BFADD2 and the second transfer target data size SIZE2. The DMA controller 38 transmits the second DMA data transfer request to the storage device 2. The second DMA data transfer request is received by the storage device 2. The second DMA data transfer request is stored in the DMA request queue 44. The data wait control part 42 does not process the second DMA data transfer request until an entry corresponding to the second DMA data transfer request is returned as a hit, similarly to first embodiment.

After S65, then S68, S69, and S70 are performed. Except for differences in data that is handled therein, S68, S69, and S70 are the same as S17, S18, and S19, respectively, of the first embodiment. The non-volatile memory 21 transmits second read data based on a read command set to the memory controller 22 (S68). The memory controller 22 transfers the second read data to the data buffer 23 (S69). The control part 32 in the memory controller 22 transmits a second read data transfer completion status to the data wait management unit 40 (S70). The second read data transfer completion status includes the second transfer destination buffer address BFADD2 and the second transfer target data size SIZE2. One or more of S65, S68, and S69 can be performed in parallel with S66 and/or S67.

The data wait control part 42 periodically retrieves an entry corresponding to the first DMA data transfer request from the memory completion queue 43, as described with reference to the operations performed as S66 and S67. At the time of completion of S70, the head entry of the DMA request queue 44 is the first DMA data transfer request. Accordingly, the data wait control part 42 repeats retrieval of the first DMA data transfer request. During such repetition, retrieval of an entry corresponding to the second DMA data transfer request is not performed, and thus a process of the second DMA data transfer request is not started.

After S70, namely, upon transmitting a second read data transfer completion status, the memory controller 22 instructs the non-volatile memory 21 to perform a first data read based on the first SD processing order (S71). S71 is similar to S15 in the first embodiment. That is, the control part 32 transmits one or more read command sets for reading data of the first logical address LBA1 to the non-volatile memory 21.

After S71, then S72, S73, and S74 are performed. Except for differences in data that is handled therein, S72, S73, and S74 are the same as S17, S18, and S19, respectively, of the first embodiment. The non-volatile memory 21 transmits first read data based on a read command set to the memory controller 22 (S72). The memory controller 22 transfers the first read data to the data buffer 23 (S73). The control part 32 in the memory controller 22 transmits a first read data transfer completion status to the data wait management unit 40 (S74). The first read data transfer completion status includes the first transfer destination buffer address BFADD1 and the first transfer target data size SIZE1. One or more of S71, S72, and S73 can be performed in parallel with S66 and/or S67.

After S74, an entry corresponding to the first DMA data transfer request is returned as a hit. Based thereon, the data wait management unit 40 transfers data having a size of the first transfer target data size SIZE1 in the first transfer destination buffer address BFADD1, namely, the first DMA transfer request target data, to the network control device 7 (S75).

After S75, the head entry of the DMA request queue 44 includes the second DMA data transfer request. Thus, an entry corresponding to the second DMA data transfer request is returned as a hit. Based thereon, the data wait management unit 40 transfers data having a size of the second transfer target data size SIZE2 in the second transfer destination buffer address BFADD2, namely, the second DMA transfer request target data, to the network control device 7 (S76). Through completion of S76, the processing of FIG. 27 ends.

Figure 28:
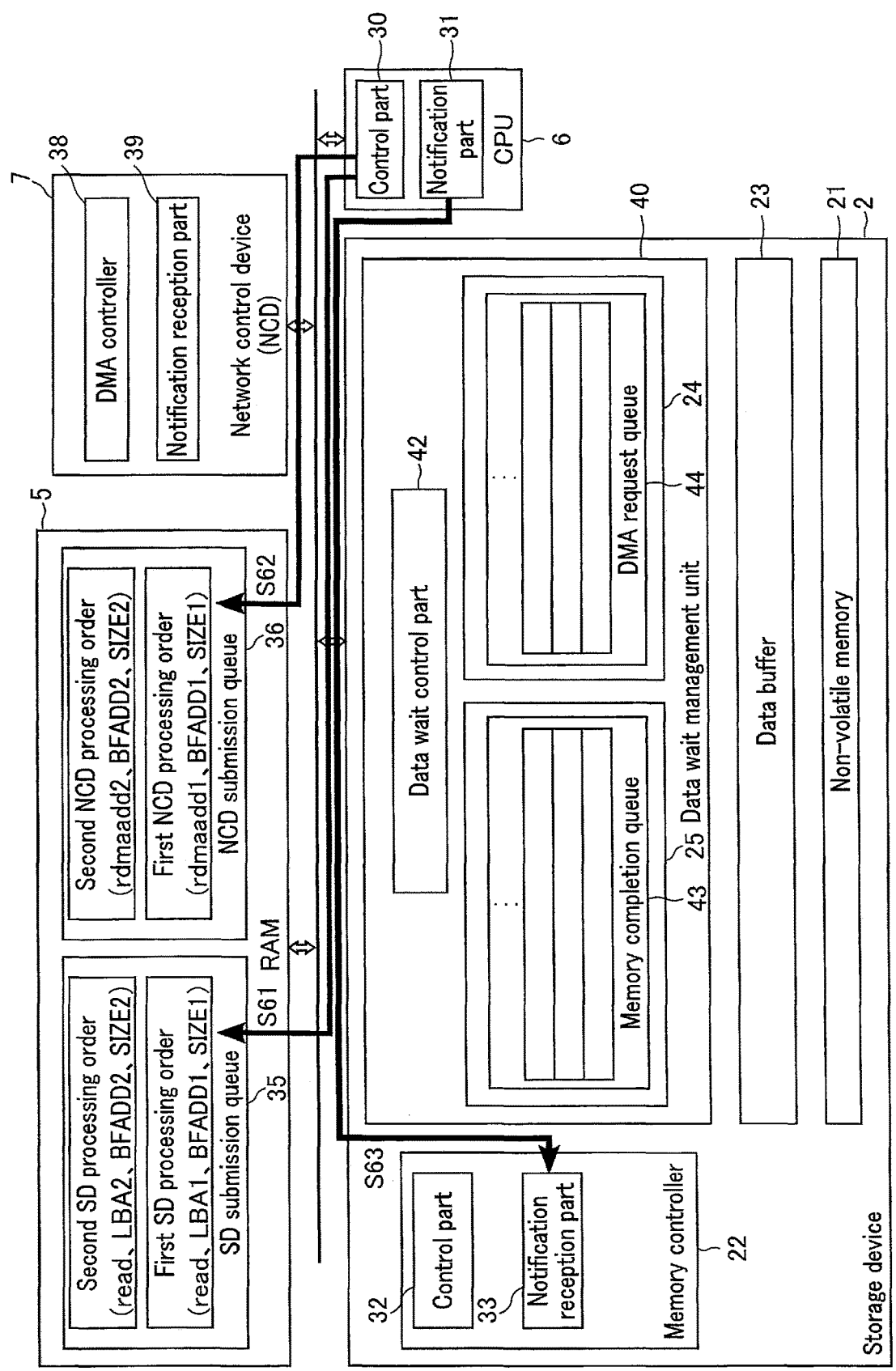
FIG. 28 shows data generated and transmitted and received during a process in the storage system according to the fourth embodiment.
Figure 29:
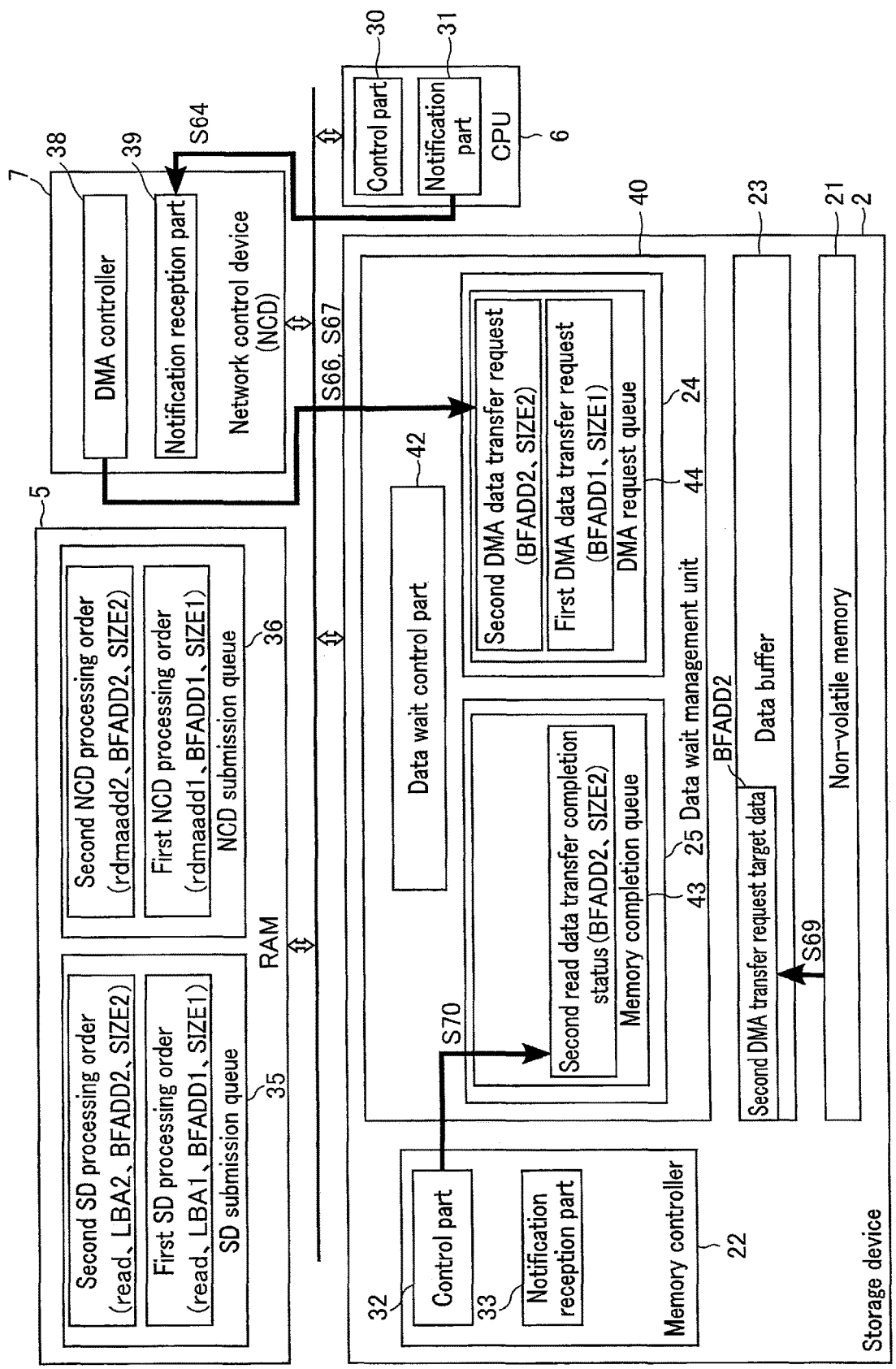
FIG. 29 shows data generated and transmitted and received during a process in the storage system according to the fourth embodiment.

FIGS. 28 to 31 show data generated and transmitted and received during a process in the storage system 1d according to the fourth embodiment, specifically, data generated and transmitted and received during the process of FIG. 27. FIGS. 28 to 31 show only data generated and transmitted and received in the process of FIG. 27. FIG. 29 shows a state subsequent to the state of FIG. 28, FIG. 30 shows a state subsequent to the state of FIG. 29, and FIG. 31 shows a state subsequent to the state of FIG. 30.

As shown in FIG. 28, the first SD processing order and second SD processing order are stored in the SD submission queue 35 (S61). The first SD processing order includes a data read designation, the first logical address LBA1 of first DMA transfer request target data, the first transfer destination buffer address BFADD1, and the first transfer target data size SIZE1. The second SD processing order includes a data read designation, the second logical address LBA2 of second DMA transfer request target data, the second transfer destination buffer address BFADD2, and the second transfer target data size SIZE2.

The first NCD processing order and the second NCD processing order are stored in the NCD submission queue 36 (S62). The first NCD processing order includes the address rdmaadd1, the first transfer destination buffer address BFADD1, and the first transfer target data size SIZE1. The second NCD processing order includes the address rdmaadd2, the second transfer destination buffer address BFADD2, and the second transfer target data size SIZE2. The order storage notification is transmitted to the memory controller 22 (S63).

As shown in FIG. 29, the order storage notification is transmitted to the network control device 7 (S64). The first DMA data transfer request and the second DMA data transfer request are stored in the DMA request queue 44 (S66 and S67). The first DMA data transfer request includes the first transfer destination buffer address BFADD1 and the first transfer target data size SIZE1. The second DMA data transfer request includes the second transfer destination buffer address BFADD2 and the second transfer target data size SIZE2. Under the control of the memory controller 22, the second DMA transfer request target data is stored in an area of the second transfer destination buffer address BFADD2 (S69). The second read data transfer completion status is stored in the memory completion queue 43 (S70). The second read data transfer completion status includes the second transfer destination buffer address BFADD2 and the second transfer target data size SIZE2.

As shown in FIG. 30, under the control of the data wait management unit 40, the first DMA transfer request target data is stored in an area of the first transfer destination buffer address BFADD1 (S73). The first read data transfer completion status is stored in the memory completion queue 43 (S74). The first read data transfer completion status includes the first transfer destination buffer address BFADD1 and the first transfer target data size SIZE1. Under the control of the data wait management unit 40, the first DMA transfer request target data is transferred to the network control device 7 (S75).

As shown in FIG. 31, under the control of the memory controller 22, the second DMA transfer request target data is transferred to the network control device 7 (S76).

4.3. Advantages

According to the fourth embodiment, as in the first embodiment, the control part 30 is capable of notifying an order destination (network control device 7) that an order for generating a DMA data transfer request has been stored in a queue before a status indicating that reading of the DMA transfer request target data has been completed is transmitted. Also, the storage system 1 includes a data wait management unit 40, as in the first embodiment. It is thus possible to obtain the same advantages as can be obtained by the first embodiment.

Also, the data wait management unit 40 is capable of storing a DMA data transfer request and a read data transfer completion status, and outputs, when a read data transfer completion status corresponding to the DMA data transfer request has been stored, the DMA data transfer request. This enables execution of the DMA data transfer request to be started after the DMA transfer request target data is prepared. Thus, even if a plurality of DMA data transfer requests are issued and preparation of the DMA transfer request target data is started in an order different from the order of reception of the DMA data transfer requests, it is possible to avoid mixing up of the DMA data transfer request and target data thereof. Furthermore, it is possible to transfer the DMA transfer request target data to the transfer destination in the order of reception of the DMA data transfer requests.

5. Fifth Embodiment

The fifth embodiment differs from the first to fourth embodiments in terms of the configuration of the data wait management unit 40. The fifth embodiment can be applied to the first to fourth embodiments. The fifth embodiment relates to processing of two different items of DMA transfer request target data, similarly to the fourth embodiment. An example in which the fifth embodiment is applied to the first embodiment will be described below as a representative. An example in which the fifth embodiment is applied to the second or third embodiment can be inferred by a person skilled in the art based on the description that follows.

5.1. Configuration

FIG. 32 shows a hardware configuration of a storage device 2e according to the fifth embodiment. As shown in FIG. 2, the storage device 2e includes hardware such as a non-volatile memory 21, a memory controller 22, a data buffer 23, a CAM 25, and a RAM 27. The memory controller 22, the data buffer 23, the CAM 25, and the RAM 27 are coupled to, for example, a bus in the storage device 2e to enable interactive communications.

Figure 33:
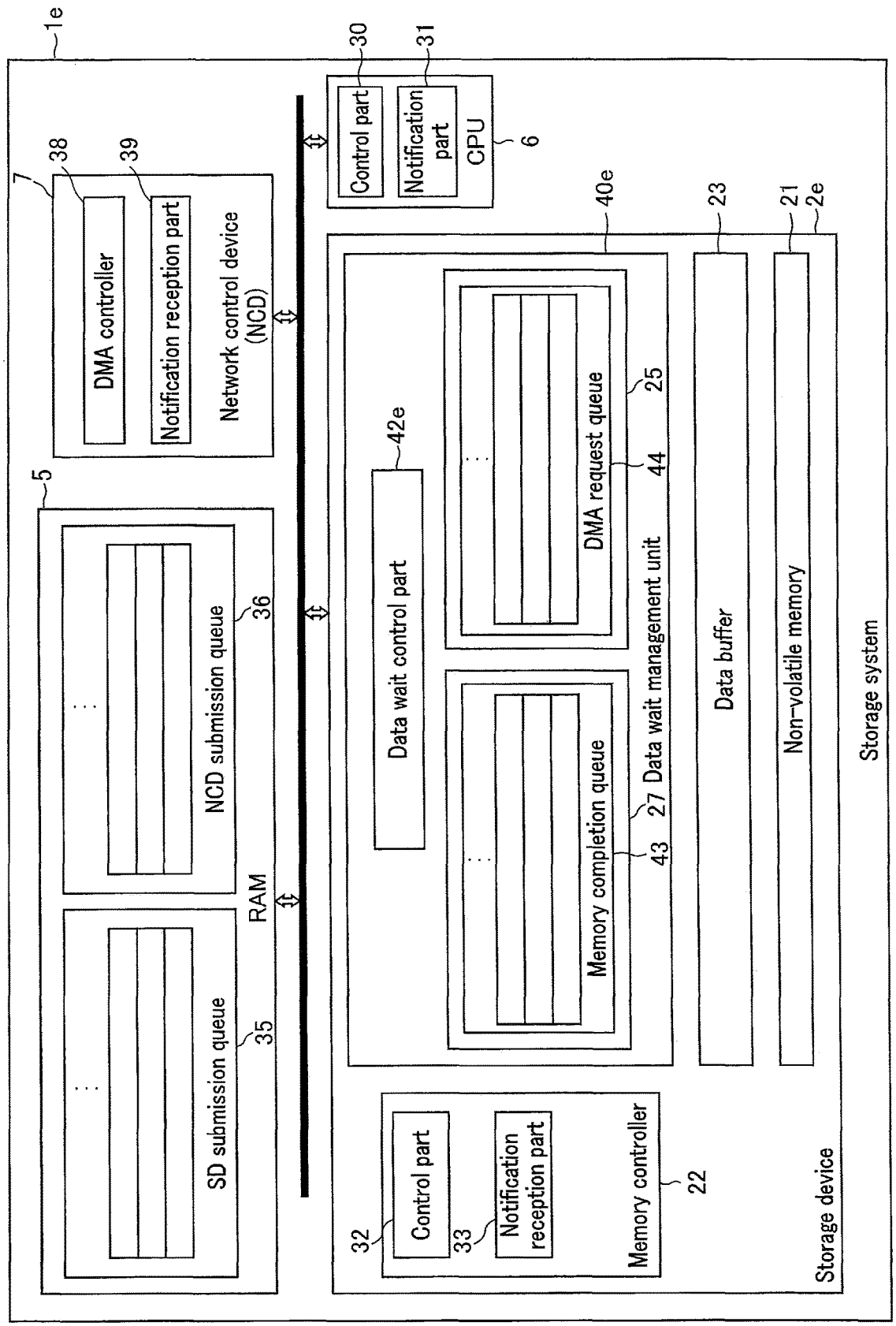
FIG. 33 shows functional blocks of the storage system according to the fifth embodiment.

FIG. 33 shows functional blocks of the storage system 1e according to the fifth embodiment. The storage system 1e is capable of serving the functions of the functional blocks to be described below with reference to FIG. 33, using the hardware and software included in the storage system 1e. As shown in FIG. 33, a memory completion queue 43 is realized by the RAM 27. The DMA request queue 44 is realized by the CAM 25.

The memory completion queue 43 includes a plurality of entries. Each order is put in an entry. The orders are stored and output according to the first-in-first-out principle. An order in a head entry is an order to be output next.

5.2. Operation

FIG. 34 shows a flow of an operation of the data wait management unit 40e according to the fifth embodiment. The flow of FIG. 34 can be started, for example, when a new DMA data transfer request is stored in the DMA request queue 44, when a data transfer completion status in a head entry of the memory completion queue 43 is changed, when a new completion status is stored in the memory completion queue 43, or when a predetermined periodic timing comes. The flow of FIG. 34 shows a DMA data transfer request in the head entry.

As shown in FIG. 34, the data wait control part 42e selects a head entry in the memory completion queue 43 (S80). The data wait control part 42e instructs the DMA request queue 44 to perform a data read using a character string in a read data transfer completion status in the selected entry as a retrieval key (S81).

The data wait control part 42e determines whether or not data designated by the retrieval key has been output from the DMA request queue 44 (S82). If the data has been output (S83; Yes), the data wait control part 42e transmits a DMA data transfer request including the retrieval key used for reading the output data to the memory controller 22 (S84). Also, the data wait control part 42e deletes contents of the selected entry. The data output by reading designated by the retrieval key is a DMA data transfer request which targets read data indicated by a read data transfer completion status including the retrieval key, and may be hereinafter referred to as a "DMA data transfer request" corresponding to the read data transfer completion status.

The data wait control part 42e determines whether there is another entry including a read data transfer completion status in the memory completion queue 43 (S85). The retrieval of another entry including the read data transfer completion status can be performed in, for example, increasing order of addresses of the entries of the memory completion queue 43. If an entry is not found (S86; No), the flow of FIG. 34 ends. On the other hand, if an additional entry has been found (S86; Yes), the data wait control part 42e selects the found entry (S87). After S87, the flow continues to S81.

If the data designated by the retrieval key is not output from the DMA request queue 44 (S83; No), the flow continues to S85. That is, if the data is not output, the data wait control part 42e shifts to determination as to whether data has been output in regard to a read data transfer completion status different from the read data transfer completion status of the current target of determination. Accordingly, if the determination in regard to a first read data transfer completion status stored in advance in the memory completion queue 43 is No, determination in regard to another read data transfer completion status is performed before the determination in regard to the first read data transfer completion status becomes Yes.

FIG. 35 is a sequence diagram of an operation in the storage system 1 according to the fifth embodiment. Specifically, FIG. 35 shows a process in which the control part 30 transfers data stored in the non-volatile memory 21 to the network control device 7. The operation of FIG. 35 is started when the control part 30 determines to transfer two different items of data stored in the non-volatile memory 21 to the network control device 7. FIG. 35 is similar to FIG. 27 in the fourth embodiment. The differences are the order and timing of transfer of the first DMA transfer request target data and the second DMA transfer request target data.

After S70, the data wait control part 42e instructs the DMA request queue 44 to perform a data read using a character string included in the second read data transfer completion status as a retrieval key. That is, part of the flow shown in FIG. 34 is executed. As a result of the execution of the flow, a second DMA data transfer request is output. The data wait management unit 40e transfers the second DMA data transfer request target data to the network control device 7 (S76).

After S74, the data wait control part 42e instructs the DMA request queue 44 to perform a data read using a character string included in the first read data transfer completion status as a retrieval key. That is, part of the flow shown in FIG. 34 is executed. As a result of the execution of the flow, a first DMA data transfer request is output. The data wait management unit 40e transfers the first DMA transfer request target data to the network control device 7 (S75). Through completion of S75, the processing of FIG. 35 ends.

5.3. Advantages

According to the fifth embodiment, as in the first embodiment, the control part 30 is capable of notifying an order destination (network control device 7) that an order for generating a DMA data transfer request has been stored in a queue (NCD submission queue 36) before a status indicating that reading of the DMA transfer request target data has been completed is transmitted. It is thus possible to obtain the same advantages as can be obtained by the first embodiment.

Also, the storage system 1e includes a data wait management unit 40e. The data wait management unit 40e is capable of storing a DMA data transfer request and a read data transfer completion status, and outputs, when a read data transfer completion status is stored, a DMA data transfer request corresponding to the read data transfer completion status. This enables execution of the DMA data transfer request to be started after the DMA transfer request target data is prepared. Thus, even if a plurality of DMA data transfer requests are issued and preparation of the DMA transfer request target data is started in an order different from the order of reception of the DMA data transfer requests, it is possible to avoid mixing up of the DMA data transfer request and target data thereof. Furthermore, it is possible to process a DMA data transfer request in an order different from the order of reception of the DMA data transfer requests from a DMA data transfer request for which target data has been prepared, namely, to transfer target DMA transfer request target data.

6. Sixth Embodiment

A sixth embodiment differs from the first to fifth embodiments in terms of the destination of data read from a non-volatile memory. The sixth embodiment can be applied to the first to fifth embodiments. An example in which the sixth embodiment is based on the first embodiment will be described below as a representative. Examples in which the sixth embodiment is based on the second to fourth embodiments can be inferred by a person skilled in the art based on the description that follows.

6.1. Configuration

FIG. 36 shows a hardware configuration of a storage device 2f according to the sixth embodiment. As shown in FIG. 36, a memory controller 22f of a storage device 2f includes a RAM 226, in addition to hardware components included in the memory controller 22 according to the first embodiment. The RAM 226 is, for example, a memory that can be operated at a higher speed than the RAM 223, and is, for example, a static random access memory (SRAM).

FIG. 37 shows functional blocks of the storage system 1f according to the sixth embodiment. The storage system 1f is capable of serving the functions of the functional blocks to be described below with reference to FIG. 37, using the hardware and software included in the storage system 1f.

As shown in FIG. 37, the storage system 1f further includes a data buffer 34. The data buffer 34 stores data while, for example, the storage system 1 is supplied with power. The data buffer 34 can be realized by, for example, part of the RAM 226.

6.2. Operation

Figure 38:
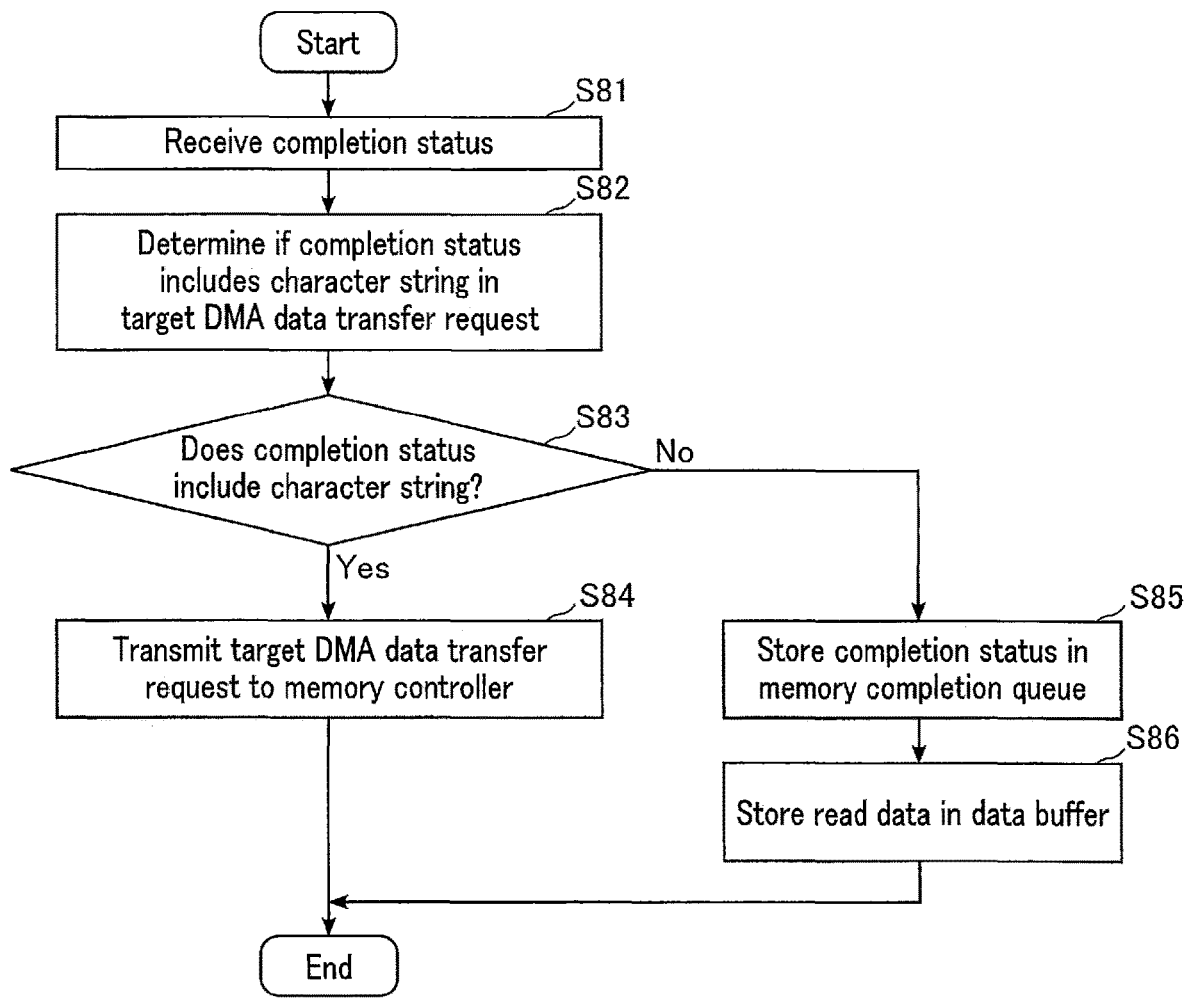
FIG. 38 shows a flow of an operation of a data wait management unit according to the sixth embodiment.

FIG. 38 shows a flow of an operation of the data wait management unit 40f according to the sixth embodiment. The flow of FIG. 38 is started when a DMA data transfer request is received and then the DMA data transfer request is stored in a head entry of the DMA request queue 44. The DMA data transfer request in the head entry is a target DMA data transfer request.

As shown in FIG. 38, the data wait management unit 40f receives a completion status of an order on the non-volatile memory 21 from the memory controller 22f (S81). The received completion status is not yet stored in the memory completion queue 43.

The data wait control part 42f determines whether the completion status includes a character string included in the target DMA data transfer request (S82). The completion status shows data lastly stored in the data buffer 34 (hereinafter also referred to as "latest read data").

If the completion status includes the character string in the target DMA data transfer request (S83; Yes), it means that the latest read data is data targeted by the target DMA data transfer request, namely, the DMA transfer request target data. Based thereon, the data wait control part 42f transmits the target DMA data transfer request to the memory controller 22f (S84). When the target DMA data transfer request is received by the memory controller 22f, the control part 32 transfers, based on the target DMA data transfer request, the DMA transfer request target data to the network control device 7. Through completion of S84, the processing of FIG. 38 ends.

If the completion status does not include a character string in the target DMA data transfer request (S83; No), it means that the latest read data is not data targeted by the target DMA data transfer request, namely, the DMA transfer request target data. Based thereon, the data wait control part 42f stores a completion status in the memory completion queue 43 (S85). The data wait control part 42f notifies the memory controller 22f to continue processing. Upon receiving the notification, the memory controller 22f stores the latest read data in the data buffer 23 (S86). If an SD processing order that instructs reading of the latest read data designates an area in the data buffer 23, the latest read data is stored in the designated area. The designated area is, for example, the transfer destination buffer address BFADD designated by the target DMA data transfer request. S86 may be performed prior to S85. Through completion of S86, the processing of FIG. 38 ends. After S86, an entry corresponding to the target DMA data transfer request is retrieved based on the first embodiment.

Figure 40:
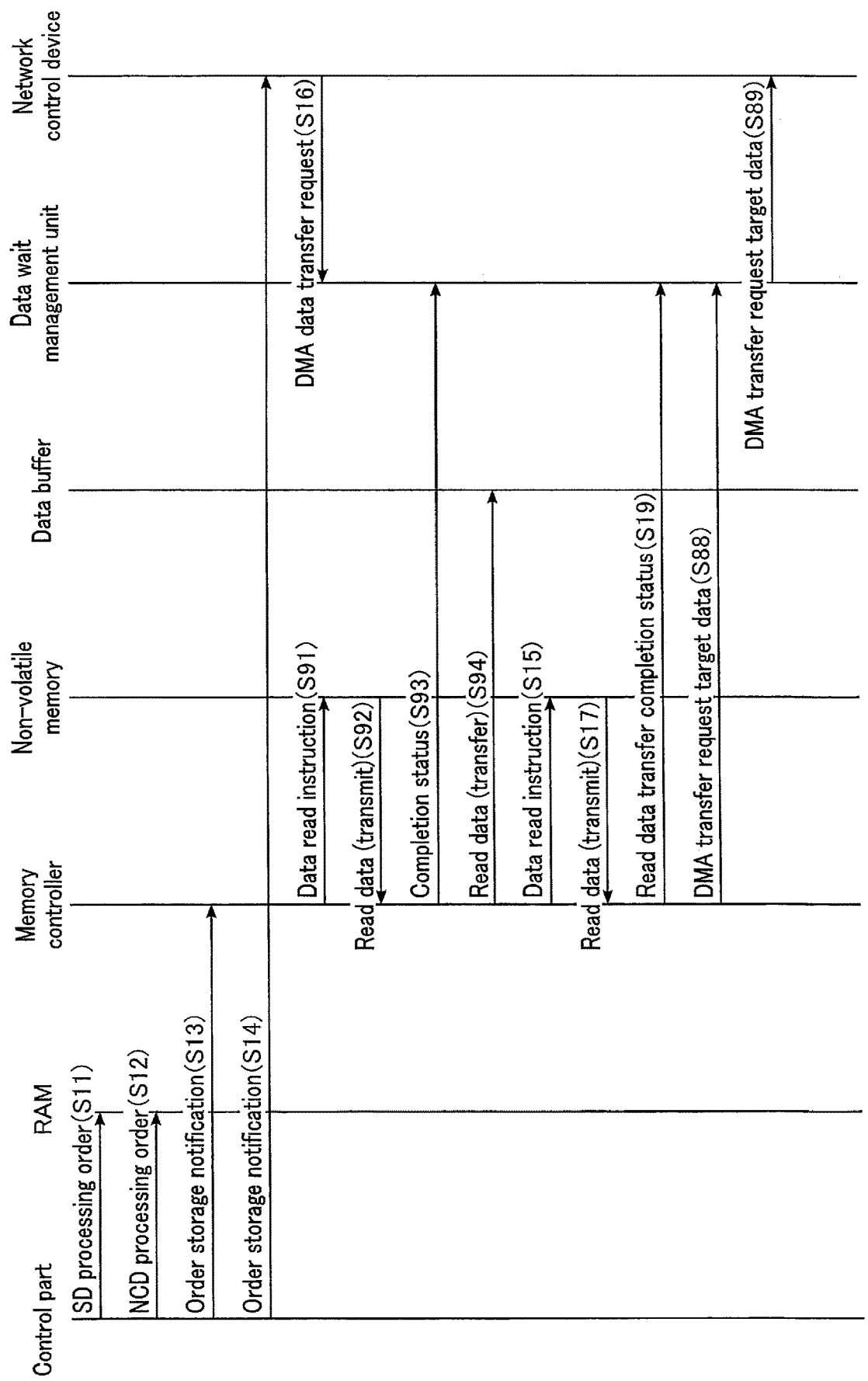
FIG. 40 is a sequence diagram of an operation in the storage system according to the sixth embodiment.

FIGS. 39 and 40 are sequence diagrams of an operation in the storage system 1f according to the sixth embodiment. Specifically, FIGS. 39 and 40 show processes in which the control part 30 transfers data stored in the non-volatile memory 21 to the network control device 7. The operations of FIGS. 39 and 40 are started when the control part 30 determines to transfer data stored in the non-volatile memory 21 to the network control device 7. FIG. 39 shows a case where the determination at step S82 in FIG. 38 is Yes (S83; Yes). FIG. 40 shows a case where the determination at step S82 in FIG. 38 is No (S83; No).

As shown in FIGS. 39, S11, S12, S13, S14, S15, S16, and S17 of the first embodiment are performed. That is, the control part 30 stores an SD processing order in the SD submission queue 35 in the RAM 5 (S11). The control part 30 stores the NCD processing order in an NCD submission queue 36 in the RAM 5 (S12). The notification part 31 transmits an order storage notification to the memory controller 22f (S13). The notification part 31 transmits an order storage notification to the network control device 7 (S14). The memory controller 22f instructs the non-volatile memory 21 to perform a data read (S15). The network control device 7 transmits a DMA data transfer request (S16). The non-volatile memory 21 transmits read data to the memory controller 22f (S17).

After S17, the data wait management unit 40f receives a completion status from the memory controller 22f (S81). The data wait management unit 40f outputs a target DMA data transfer request in a head entry of the DMA request queue 44 (S84). The DMA data transfer request is received by the memory controller 22f.

When the target DMA data transfer request is received by the memory controller 22f, the control part 32 transfers data of a size of the transfer target data size SIZE in the destination buffer address bfadd, namely, the DMA transfer request target data, to the data wait management unit 40f (S88).

Upon receiving the DMA transfer request target data, the data wait management unit 40f transfers the received DMA transfer request target data to the network control device 7 (S89). Through completion of S89, the processing of FIG. 39 ends.

As shown in FIGS. 40, S11, S12, S13, S14, and S16 are performed, as in FIG. 39. After S13, the memory controller 22f instructs the non-volatile memory 21 to perform a data read, similarly to S15 (S91). The data read instruction is not for reading data (DMA transfer request target data) targeted by the target DMA data transfer request, unlike S15. After S91, the non-volatile memory 21 transmits read data to the memory controller 22f, similarly to S17 (S92).

The control part 32 in the memory controller 22f transmits a read data transfer completion status to the data wait management unit 40f (S93). The completion status does not relate to reading of data (DMA transfer request target data) targeted by the target DMA data transfer request, unlike S81. Based thereon, after S93, the memory controller 22f transfers read data to the data buffer 23 (S94).

After S94, then S15, S17, and S19 are performed. That is, the memory controller 22f instructs the non-volatile memory 21 to perform a data read (S15). The non-volatile memory 21 transmits read data to the memory controller 22 (S17). The control part 32 in the memory controller 22f transmits a read data transfer completion status to the data wait management unit 40 (S19). S15, S17, and S19 relate to the DMA transfer request target data. After S19, the memory controller 22f transfers read data, namely, DMA transfer request target data, from the data buffer 34 in the memory controller 22f to the data wait management unit 40f (S88). The data wait management unit 40f transfers the DMA request target data to the network control device 7 (S89).

The read data stored in the data buffer 23 as S94 is transferred when a DMA data transfer request which targets the read data is stored in a head entry of the DMA request queue 44 based on, for example, the first embodiment.

Figure 41:
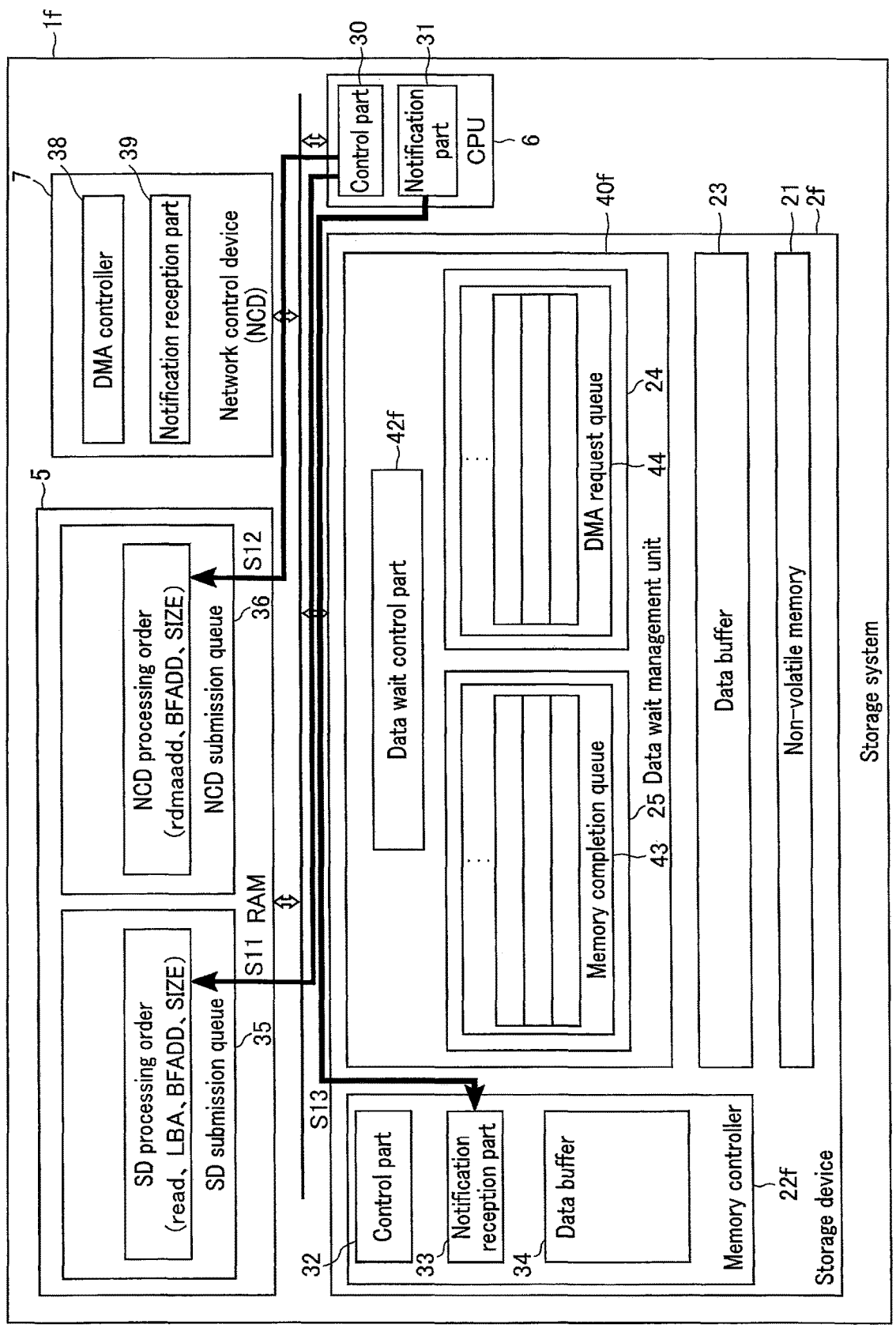
FIG. 41 shows data generated and transmitted and received during a process in the storage system according to the sixth embodiment.
Figure 42:
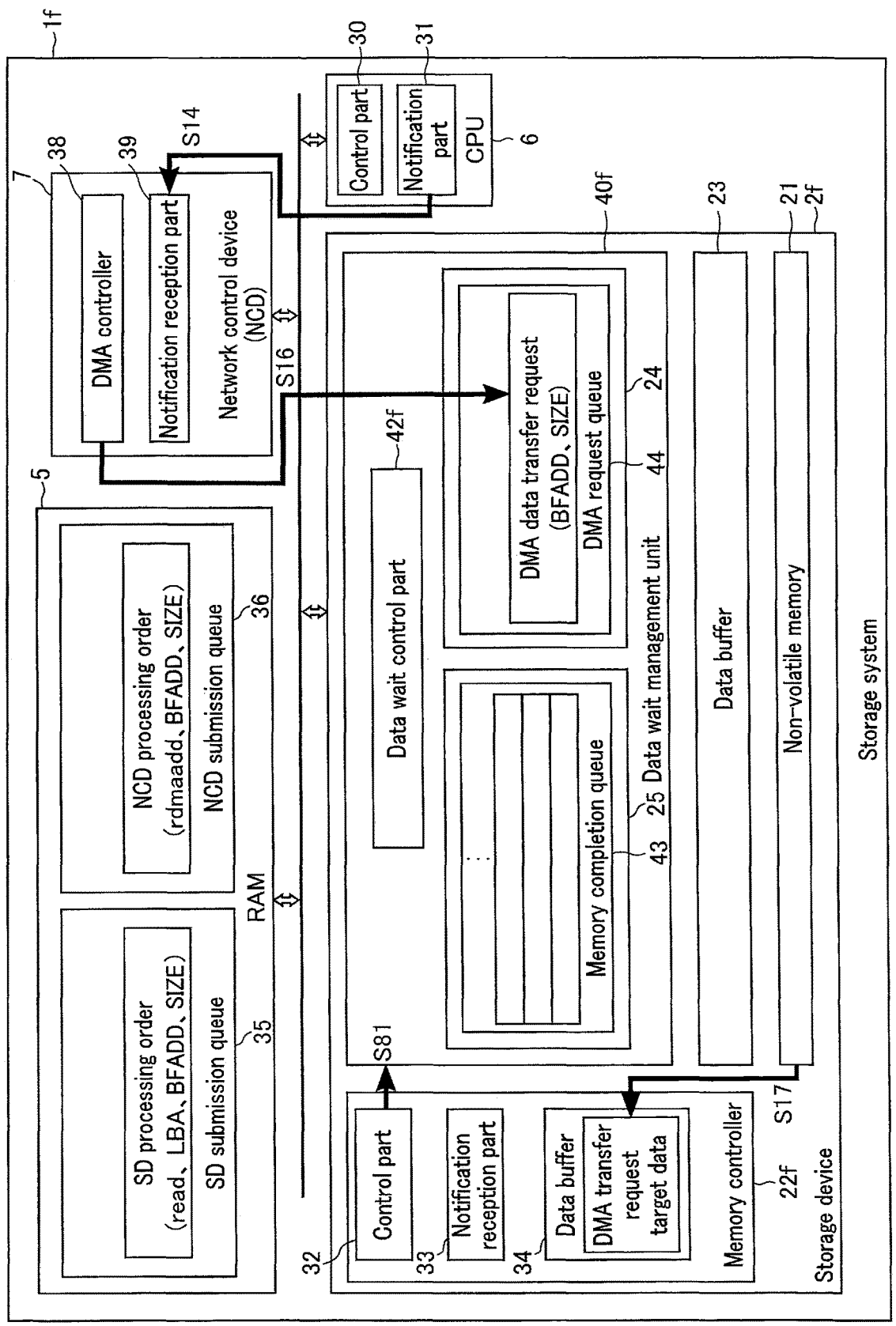
FIG. 42 shows data generated and transmitted and received during a process in the storage system according to the sixth embodiment.

FIGS. 41 to 43 show data generated and transmitted and received during a process in the storage system 1f according to the sixth embodiment, specifically, data generated and transmitted and received during the process of FIG. 39.

FIGS. 41 to 43 indicates show only data generated and transmitted and received in the process of FIG. 39. FIG. 42 shows a state subsequent to the state of FIG. 41, and FIG. 43 shows a state subsequent to the state of FIG. 42.

As shown in FIG. 41, the SD processing order is stored in the SD submission queue 35 (S11). The SD processing order includes a data read designation, the logical address LBA of DMA transfer request target data, the transfer destination buffer address BFADD, and the transfer target data size SIZE. The NCD processing order is stored in the NCD submission queue 36 (S12). The NCD processing order includes at least the transfer destination buffer address BFADD and the transfer target data size SIZE. The order storage notification is transmitted to the memory controller 22$f$ (S13).

As shown in FIG. 42, the order storage notification is transmitted to the network control device 7 (S14). The DMA data transfer request is stored in the DMA request queue 44 (S16). The DMA data transfer request includes the transfer destination buffer address BFADD and the transfer target data size SIZE. Under the control of the memory controller 22, the DMA transfer request target data is stored in the data buffer 34 of the memory controller 22$f$ (S17). The completion status is transmitted to the data wait management unit 40$f$ (S81).

As shown in FIG. 43, the DMA transfer request target data is transferred from the data buffer 34 to the data wait management unit 40$f$ (S88). The DMA transfer request target data is transferred from the data wait management unit 40$f$ to the network control device 7 (S89).

Figure 44:
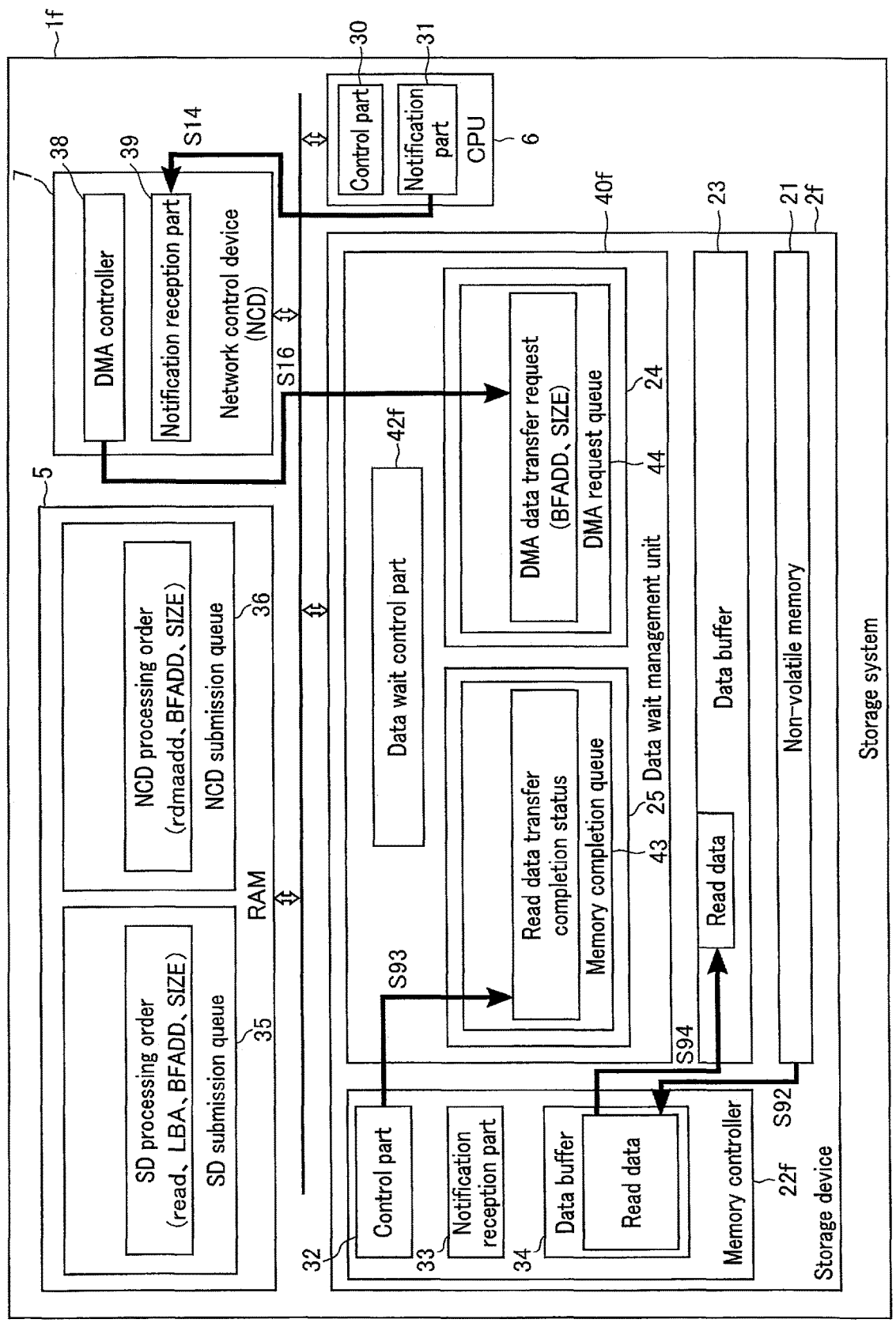
FIG. 44 shows data generated and transmitted and received during a process in the storage system according to the sixth embodiment.
Figure 45:
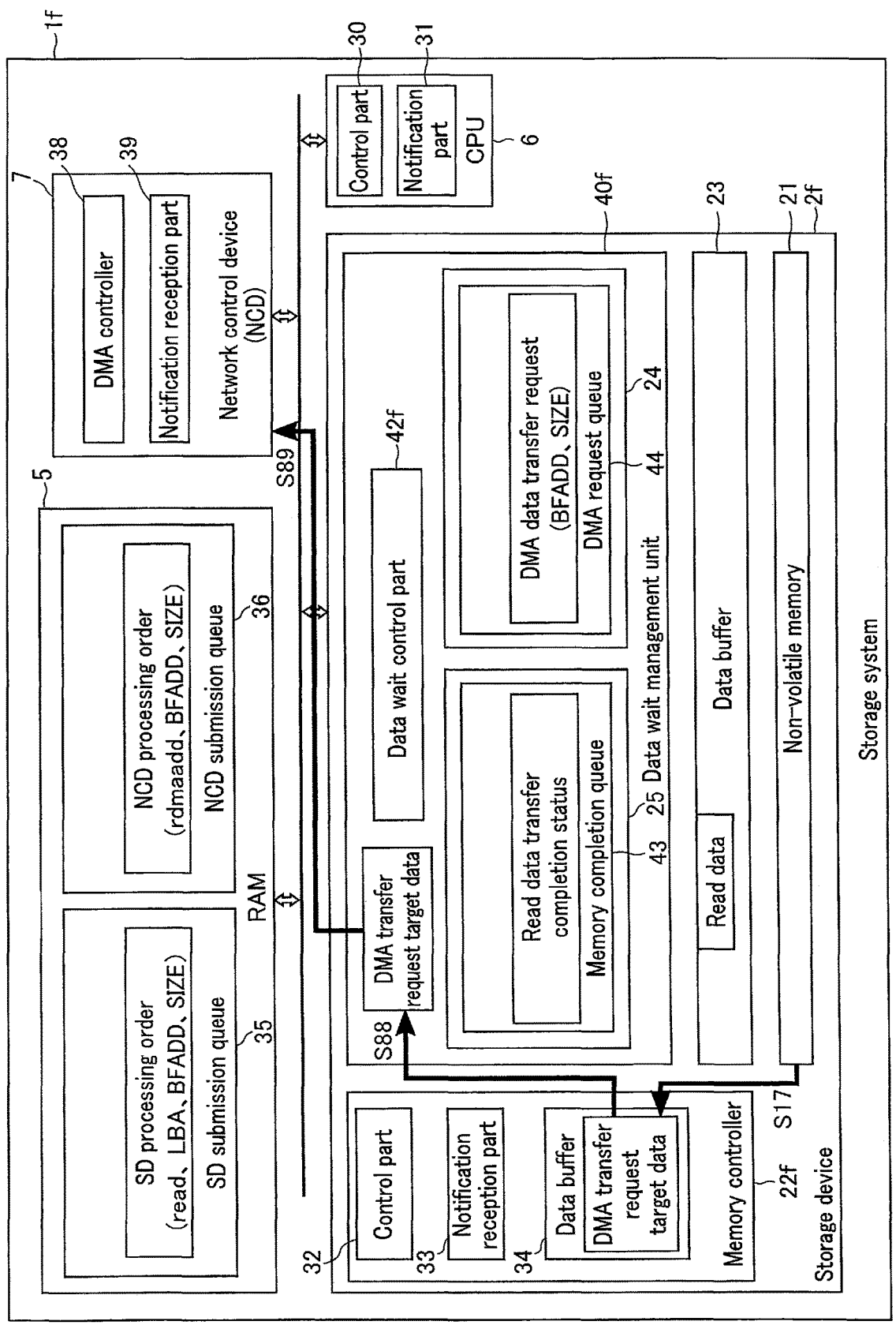
FIG. 45 shows data generated and transmitted and received during a process in the storage system according to the sixth embodiment.

FIGS. 44 and 45 show data generated and transmitted and received during a process in the storage system 1$f$ according to the sixth embodiment, specifically, data generated and transmitted and received during the process of FIG. 40. FIGS. 44 and 45 shows only data generated and transmitted and received in the process of FIG. 40. FIG. 44 shows a state subsequent to the state of FIG. 41, and FIG. 45 shows a state subsequent to the state of FIG. 44.

As shown in FIG. 44, the order storage notification is transmitted to the network control device 7 (S14). The DMA data transfer request is stored in the DMA request queue 44 (S16). The DMA data transfer request includes the transfer destination buffer address BFADD and the transfer target data size SIZE. Under the control of the memory controller 22$f$, the read data is stored in the data buffer 34 of the memory controller 22$f$ (S92). The read data transfer completion status is stored in the memory completion queue 43 (S93). Since the read data is not the DMA transfer request target data, the read data is transferred to the data buffer 23 under the control of the memory controller 22$f$ (S94).

As shown in FIG. 45, under the control of the memory controller 22$f$, the DMA transfer request target data is stored in the data buffer 34 of the memory controller 22$f$ (S17). The DMA transfer request target data is transferred from the data buffer 34 to the data wait management unit 40$f$ (S88). The DMA transfer request target data is transferred from the data wait management unit 40$f$ to the network control device 7 (S89).

6.3. Advantages

According to the sixth embodiment, as in the first embodiment, the control part 30 is capable of notifying an order destination (NCD submission queue 36) that an order for generating a DMA data transfer request has been stored in a queue (NCD submission queue 36) before a status indicating that reading of the DMA transfer request target data has been completed is transmitted. Also, the storage system 1$f$ includes a data wait management unit 40, as in the first embodiment. It is thus possible to obtain the same advantages as can be obtained by the first embodiment.

Moreover, according to the sixth embodiment, while read data from the non-volatile memory 21 is in the data buffer 34 in the memory controller 22$f$, a transfer completion status regarding the read data corresponds to the DMA data transfer request in the head entry of the DMA request queue 44. If there is such a correspondence, since the read data is the DMA transfer request target data, the read data is transferred from the data buffer 34 to the network control device 7, without being transferred to the data buffer 23. Accordingly, the number of transfer of the DMA transfer request target data is smaller than in the first embodiment. This enables a further efficient operation of the storage system 1$f$.

7. Seventh Embodiment

A seventh embodiment differs from the first to fifth embodiments in terms of the destination of data read from a non-volatile memory. The seventh embodiment can be applied to the first to fifth embodiments. An example in which the seventh embodiment is based on the first embodiment will be described below as a representative. Examples in which the seventh embodiment is based on the second to fourth embodiments can be inferred by a person skilled in the art based on the description that follows.

7.1. Configuration

A storage system 1$g$ of the seventh embodiment has the same hardware configuration as that of the storage system 1 of the embodiment on which the seventh embodiment is based. In the present example, a storage system 1 of the seventh embodiment has the same hardware configuration as that of the storage system 1 of the first embodiment.

FIG. 46 shows functional blocks of the storage system 1$g$ according to the seventh embodiment. The storage system 1$g$ is capable of serving the functions of the functional blocks to be described below with reference to FIG. 46, using the hardware and software included in the storage system 1$g$.

As shown in FIG. 46, the storage system 1$g$ includes a control part 30, a notification part 31, a control part 32$g$, a notification reception part 33, an SD submission queue 35, an NCD submission queue 36, a data buffer 62, a DMA controller 38, a notification reception part 39, and a data wait management unit 40$g$.

The data buffer 62 stores data while, for example, the storage system 1$g$ is supplied with power. The data buffer 62 can be realized by, for example, the RAM 5.

The data wait management unit 40$g$ further includes a DMA controller 64 and a data buffer 65. The DMA controller 64 is a functional block that performs control to allow the data wait management unit 40$g$ to access another device without intervention of the CPU 6 (control part 30). The DMA controller 64 can be realized by, for example, a dedicated circuit in the data wait management unit 40$g$. Alternatively, the DMA controller 64 can be realized by a combination of a program and a CPU 224 in a memory controller 22$g$.

The data buffer 65 stores data while, for example, the storage system 1$g$ is supplied with power. The data buffer 65 is, for example, a DRAM. Alternatively, the data buffer 65 can be realized by the RAM 223 of the memory controller 22g. The data buffer 65 plays at least some of the functions of the data buffer 23 according to the first embodiment. Accordingly, an address that specifies an area in the data buffer 23 in the first embodiment specifies an area in the data buffer 65 in the seventh embodiment. That is, in the seventh embodiment, the transfer destination buffer address BFADD specifies an area in the data buffer 65.

7.2. Operation

Figure 47:
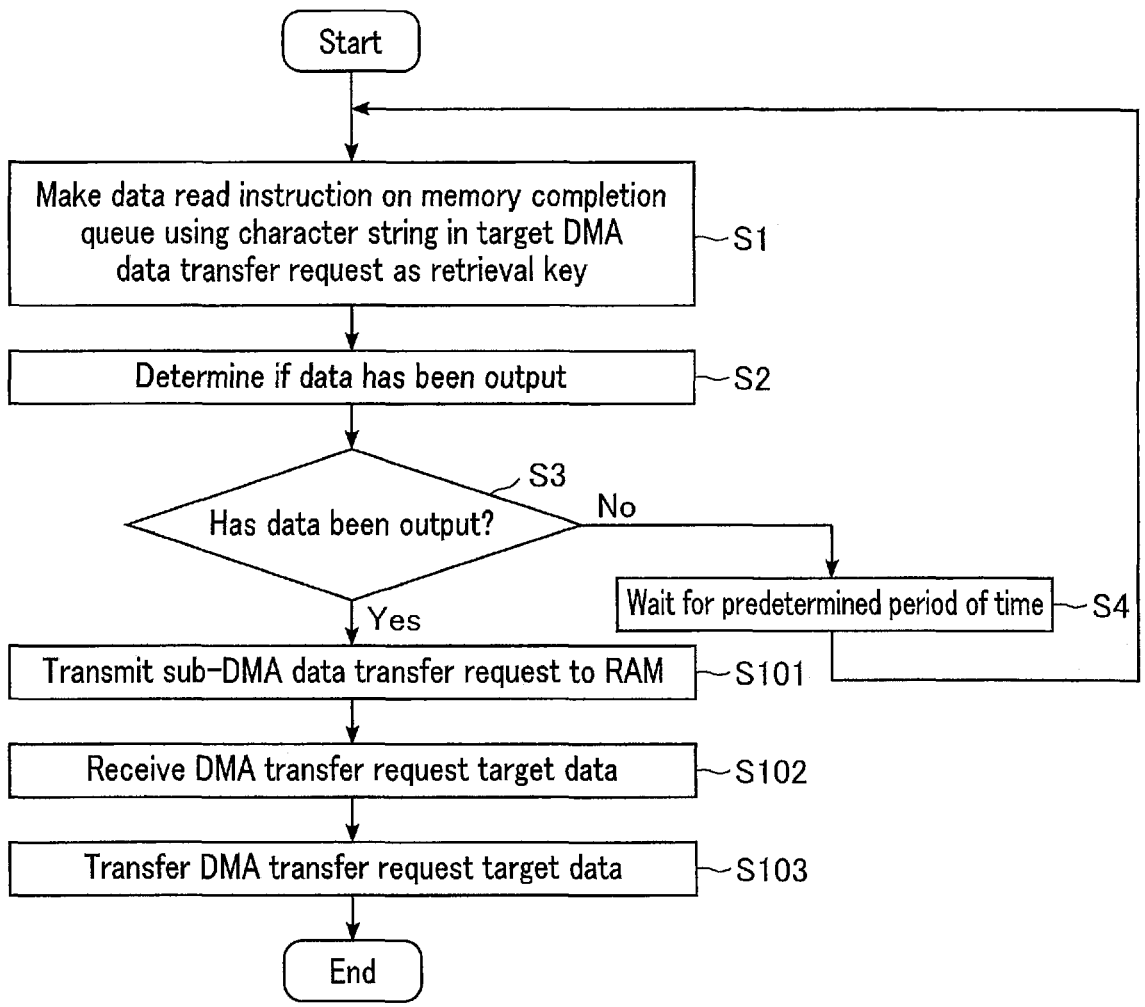
FIG. 47 shows a flow of an operation of a data wait management unit according to the seventh embodiment.

FIG. 47 shows a flow of an operation of a data wait management unit 40g according to the seventh embodiment. The flow of FIG. 4 can be started, for example, when a new DMA data transfer request is stored in the DMA request queue 44, when a DMA data transfer request in the head entry of the DMA request queue 44 is changed, when a new completion status is stored in the memory completion queue 43, or when a predetermined periodic timing comes. The flow of FIG. 47 shows a DMA data transfer request (target DMA data transfer request) in the head entry.

As shown in FIGS. 47, S1, S2, S3, and S4 according to the first embodiment are performed. That is, the data wait control part 42g instructs the memory completion queue 43 to perform a data read using a character string in the target DMA data transfer request as a retrieval key (S1). The data wait control part 42g determines whether or not data designated by the retrieval key has been output from the memory completion queue 43 (S2). If the instructed data has not been output from the memory completion queue 43 (S3; No), the data wait control part 42g waits for a predetermined period of time (S4).

If the data designated by the retrieval key has been output from the memory completion queue 43 (S3; Yes), the data wait control part 42g transmits a DMA data transfer request to the RAM 5 via the DMA controller 64 in the data wait management unit 40g (S101). The DMA data transfer request transmitted as S101 is part of the overall process for executing the target DMA data transfer request, and may be hereinafter referred to as a sub-DMA data transfer request. The sub-DMA data transfer request requests that data in the data buffer 62 be transferred to the data wait management unit 40g. For that purpose, the sub-DMA data transfer request includes a transfer destination buffer address BFADD and a transfer target data size SIZE, namely, designates a DMA transfer request target data. The sub-DMA data transfer request further designates an address of an area in the data buffer 65 in the data wait management unit 40g. In the DMA data transfer, the DMA controller 64 functions as a DMA controller master.

The data wait management unit 40g receives DMA transfer request target data (S102). The DMA transfer request target data is stored in an area of an address designated by the sub-DMA data transfer request in the data buffer 65.

The control part 32g transfers, based on the target DMA data transfer request, the DMA transfer request target data to the network control device 7 (S103). Through completion of S103, the processing of FIG. 4 ends.

FIG. 48 is a sequence diagram of an operation in the storage system 1g according to the seventh embodiment. Specifically, FIG. 48 shows a process in which the control part 30 transfers data stored in the non-volatile memory 21 to the network control device 7. The operation of FIG. 48 is started when the control part 30 determines to transfer data stored in the non-volatile memory 21 to the network control device 7.

As shown in FIGS. 48, S11, S12, S13, S14, S15, S16, and S17 of the first embodiment are performed. That is, the control part 30 stores an SD processing order in the SD submission queue 35 in the RAM 5 (S11). The control part 30 stores an NCD processing order in the NCD submission queue 36 in the RAM 5 (S12). The notification part 31 transmits an order storage notification to the memory controller 22g (S13). The notification part 31 transmits an order storage notification to the network control device 7 (S14). The memory controller 22g instructs the non-volatile memory 21 to perform a data read (S15). The network control device 7 transmits a DMA data transfer request (S16). The non-volatile memory 21 transmits read data to the memory controller 22g (S17).

After S17, the memory controller 22g stores the received read data in the data buffer 62 in the RAM 5 (S105). The read data is stored in the transfer destination buffer address BFADD in the data buffer 62. Completion of storage of read data in the data buffer 62 means that DMA transfer request target data has been prepared. Based thereon, after S105, the memory controller 22g transmits a read data transfer completion status to the data wait management unit 40g (S19).

After S16, as in the first embodiment, the data wait control part 42g periodically retrieves an entry corresponding to the target DMA data transfer request from the memory completion queue 43. That is, the data wait management unit 40g executes the flow shown in FIG. 47. If an entry corresponding to the target DMA data transfer request is returned as a hit as a result of the execution of the flow, the data wait management unit 40g outputs a sub-DMA data transfer request (S101). The sub-DMA data transfer request is received by the RAM 5. The data wait management unit 40g outputs a target DMA data transfer request. The target DMA data transfer request is received by the memory controller 22g.

Upon receiving the sub-DMA data transfer request, the RAM 5 transmits data of a size of the transfer target data size SIZE in the transfer destination buffer address BFADD in the data buffer 62, namely, the DMA transfer request target data, to the data wait management unit 40g (S102). The DMA transfer request target data is stored in an area of an address in the data buffer 65 designated by the sub-DMA data transfer request.

When the target DMA data transfer request is received by the data wait management unit 40g, the data wait management unit 40g transfers DMA transfer request target data in the data buffer 62 in the data wait management unit 40g to the network control device 7 (S103). Through completion of S103, the processing of FIG. 48 ends.

Figure 49:
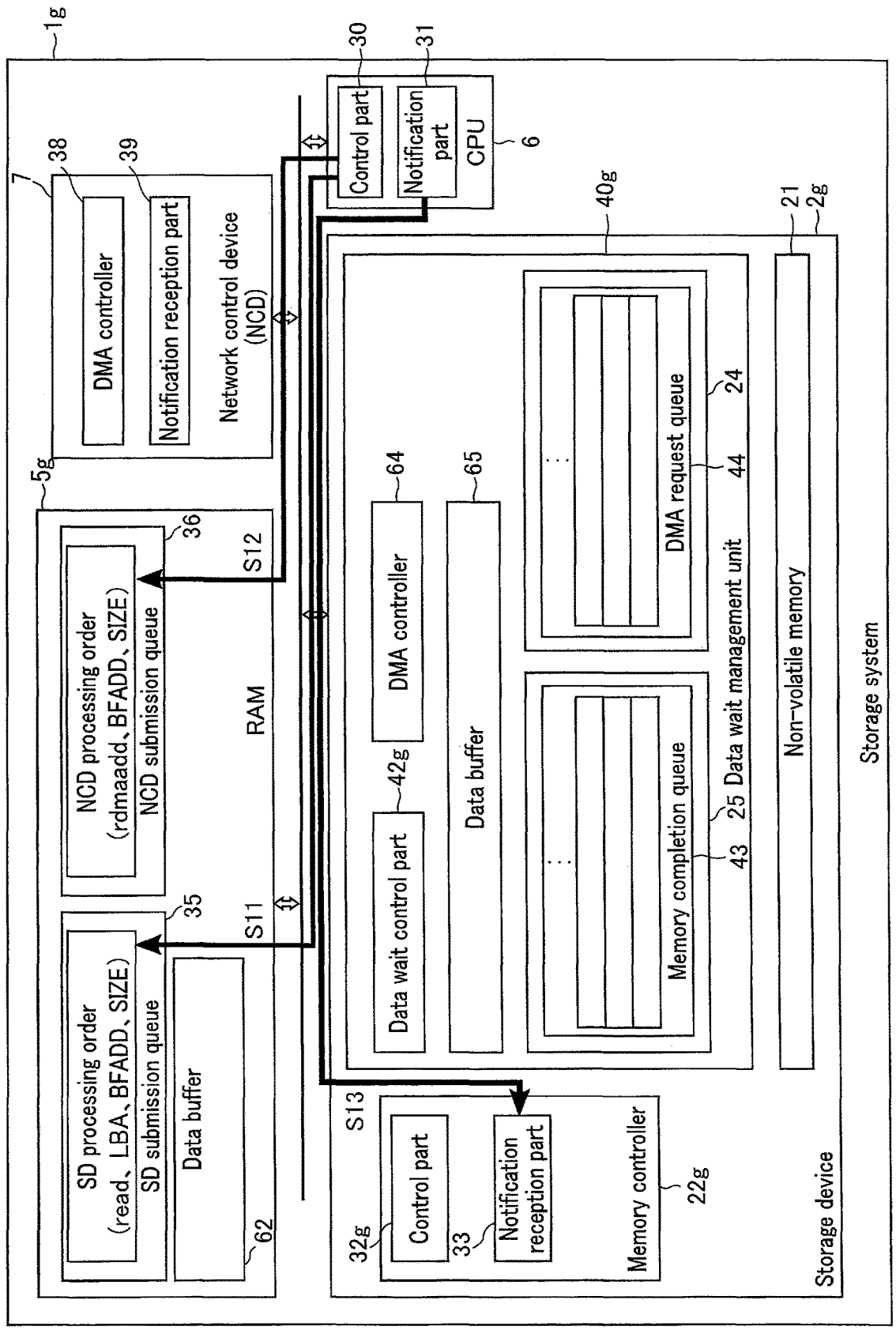
FIG. 49 shows data generated and transmitted and received during a process in the storage system according to the seventh embodiment.
Figure 50:
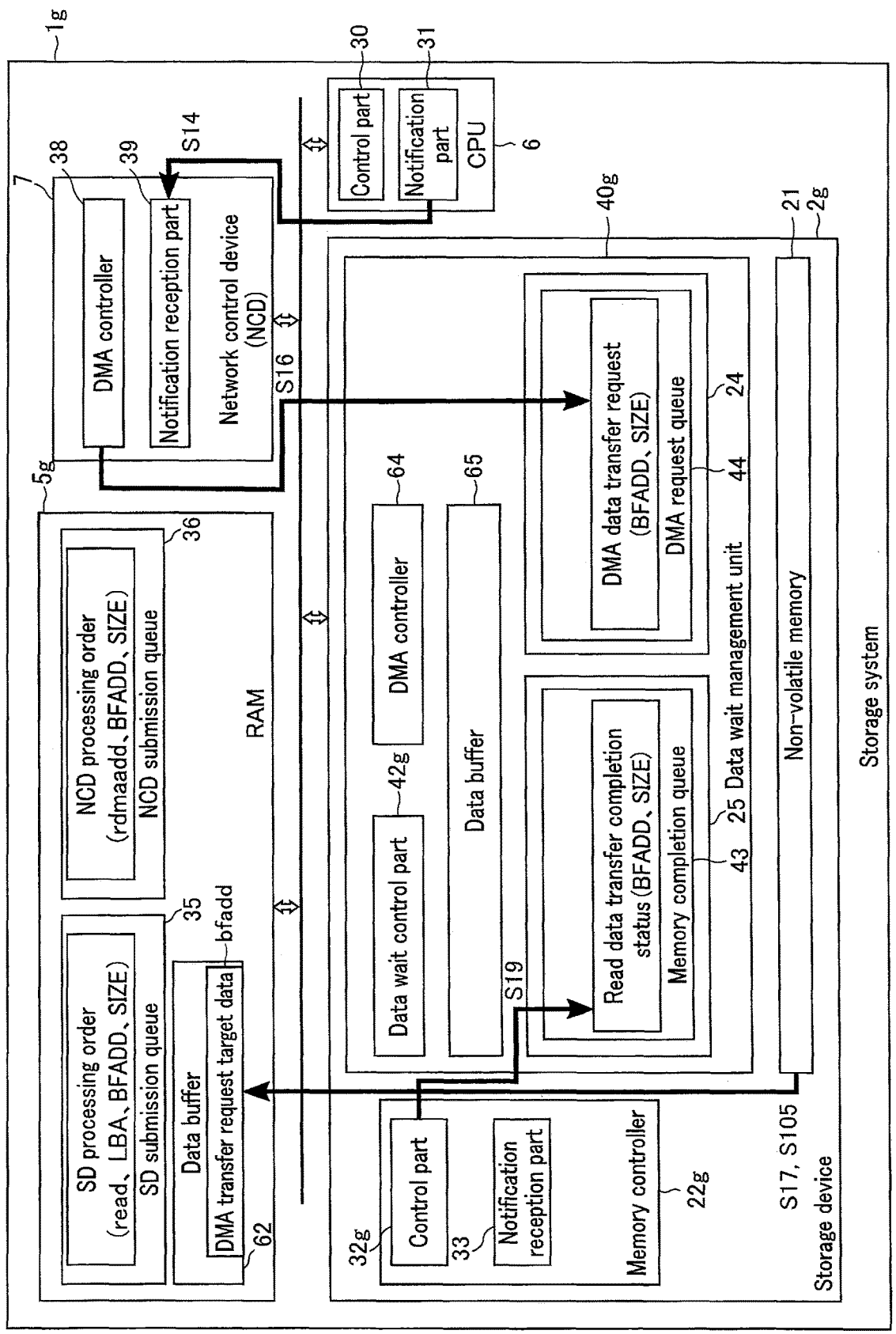
FIG. 50 shows data generated and transmitted and received during a process in the storage system according to the seventh embodiment.

FIGS. 49 to 51 show data generated and transmitted and received during a process in the storage system 1g according to the seventh embodiment. FIGS. 49 to 51 show data generated and transmitted and received during the process of FIG. 48. FIGS. 49 to 51 show only data generated and transmitted and received in the process of FIG. 48. FIG. 50 shows a state subsequent to the state of FIG. 49, and FIG. 51 shows a state subsequent to the state of FIG. 50.

As shown in FIG. 49, the SD processing order is stored in the SD submission queue 35 (S11). The SD processing order includes a data read designation, the logical address LBA of the DMA transfer request target data, the transfer destination buffer address BFADD, and the transfer target data size SIZE. The NCD processing order is stored in the NCD submission queue 36 (S12). The NCD processing order includes at least the transfer destination buffer address BFADD and the transfer target data size SIZE. The order storage notification is transmitted to the memory controller 22g (S13).

As shown in FIG. 50, the order storage notification is transmitted to the network control device 7 (S14). The DMA data transfer request is stored in the DMA request queue 44 (S16). The DMA data transfer request includes the transfer destination buffer address BFADD and the transfer target data size SIZE. Under the control of the memory controller 22g, the DMA transfer request target data is stored in the data buffer 62 of the RAM 5g (S17, S105). The read data transfer completion status is stored in the memory completion queue 43 (S19). The read data transfer completion status includes the transfer destination buffer address BFADD and the transfer target data size SIZE.

As shown in FIG. 51, the sub-DMA data transfer request is transmitted to the RAM 5g (S101). Based on the sub-DMA data transfer request, the DMA transfer request target data is transferred to the data buffer 65 of the data wait management unit 40g (S102). Under the control of the data wait management unit 40g, the DMA transfer request target data is transferred to the network control device 7 (S103).

7.3. Advantages

According to the seventh embodiment, as in the first embodiment, the control part 30 is capable of notifying an order destination (network control device 7) that an order for generating a DMA data transfer request has been stored in a queue (NCD submission queue 36) before a completion status indicating that the DMA transfer request target data has been transferred to the data buffer 62 is transmitted. Also, the storage system 1g includes a data wait management unit 40, as in the first embodiment. It is thus possible to obtain the same advantages as can be obtained by the first embodiment.

8. Eighth Embodiment

8.1. Configuration

8.1.1. Overall Hardware Configuration

FIG. 52 shows an example of a hardware configuration of a storage system according to an eighth embodiment. The storage system 1h includes hardware such as a storage device 2, a ROM 4, a RAM 5, a CPU 6, and a DMA control device 14. The storage device 2, the ROM 4, the RAM 5, the CPU 6, and the DMA control device 14 are coupled to, for example, a bus in the storage system 1h to enable interactive communications.

The DMA control device 14 controls DMA data transfer between components other than the DMA control device 14 in the storage system 1h. The DMA control device 14 can be realized by, for example, a dedicated circuit, a dedicated semiconductor chip, or a combination of a program and a CPU in the DMA control device 14. The DMA control device 14 generates and outputs a DMA data transfer request.

8.1.2. Functional Configuration of Storage System

Figure 53:
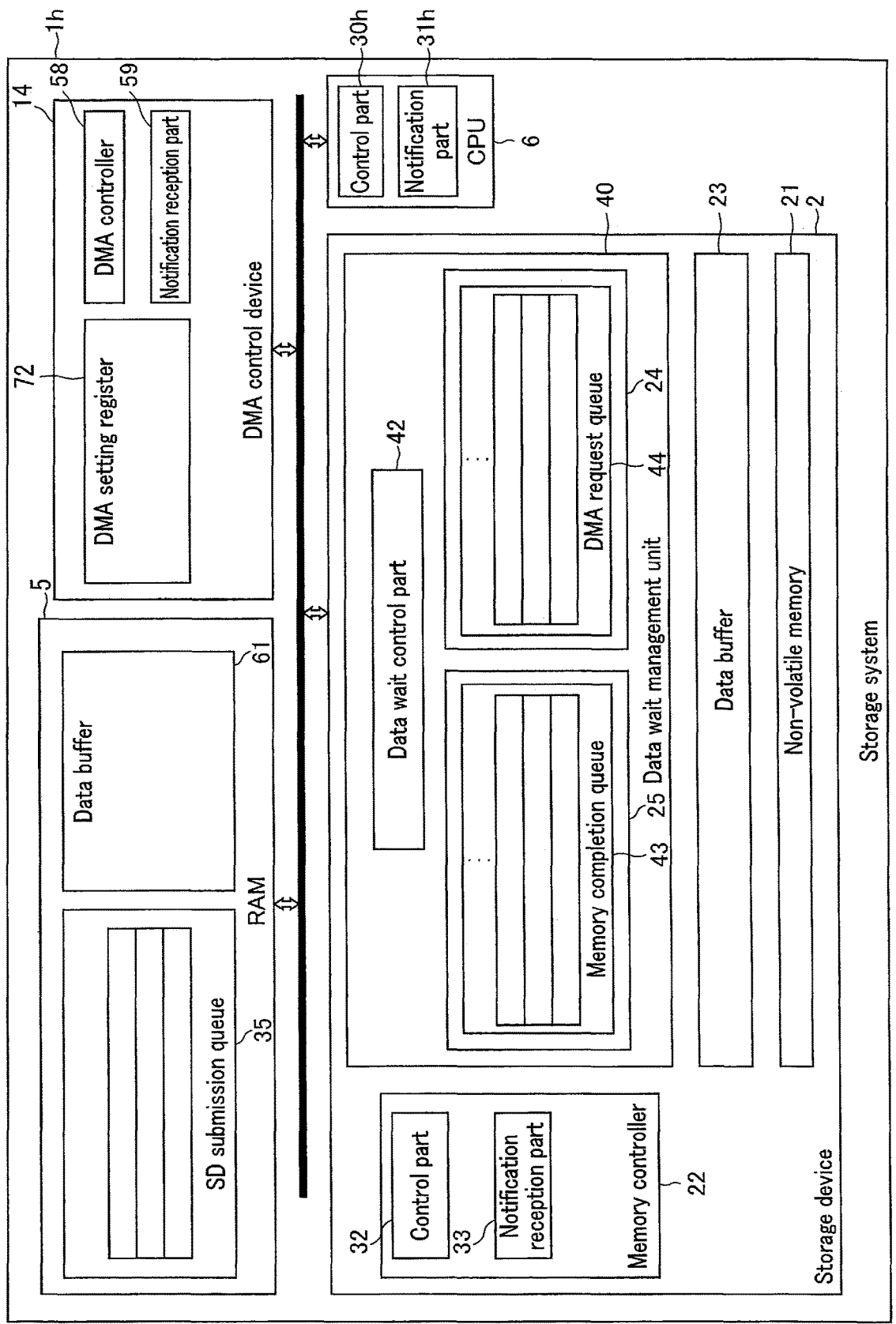
FIG. 53 shows functional blocks of the storage system according to the eighth embodiment.

FIG. 53 shows functional blocks of the storage system 1h according to the eighth embodiment. The storage system 1h is capable of serving the functions of the functional blocks to be described below with reference to FIG. 53, using the hardware and software included in the storage system 1h.

As shown in FIG. 53, the storage system 1h includes a control part 30h, a notification part 31h, a control part 32, a notification reception part 33, an SD submission queue 35, a data buffer 61, a DMA controller 58, a notification reception part 59, a DMA setting register 72, and a data wait management unit 40.

The data buffer 61 stores data while, for example, the storage system 1h is supplied with power. The data buffer 61 can be realized by, for example, part of the RAM 5. The data buffer 61 may be realized by a storing device (e.g., a memory) other than the RAM 5 in the storage system 1h.

The DMA setting register 72 stores a DMA data transfer order on the DMA control device 14. The DMA data transfer order on the DMA control device 14 may be referred to as a DMA processing order.

The DMA controller 58 is a functional block that controls the overall operation of the DMA control device 14. In the DMA control device 14, the DMA controller 58 can be realized by, for example, a dedicated circuit or a combination of a program and a CPU in the DMA control device 14.

The notification reception part 59 receives a notification from the notification part 31h. In the DMA control device 14, the notification reception part 59 can be realized by, for example, a dedicated circuit or a combination of a program and a CPU in the DMA control device 14. Upon receiving the notification, the notification reception part 59 notifies the DMA controller 58 of the reception of the notification. Upon learning the reception of the notification, the DMA controller 58 reads a DMA processing order in the DMA setting register 72, and generates a DMA data transfer request based on the DMA processing order. The notification reception part 59 is, for example, doorbell.

8.2. Operation

Figure 54:
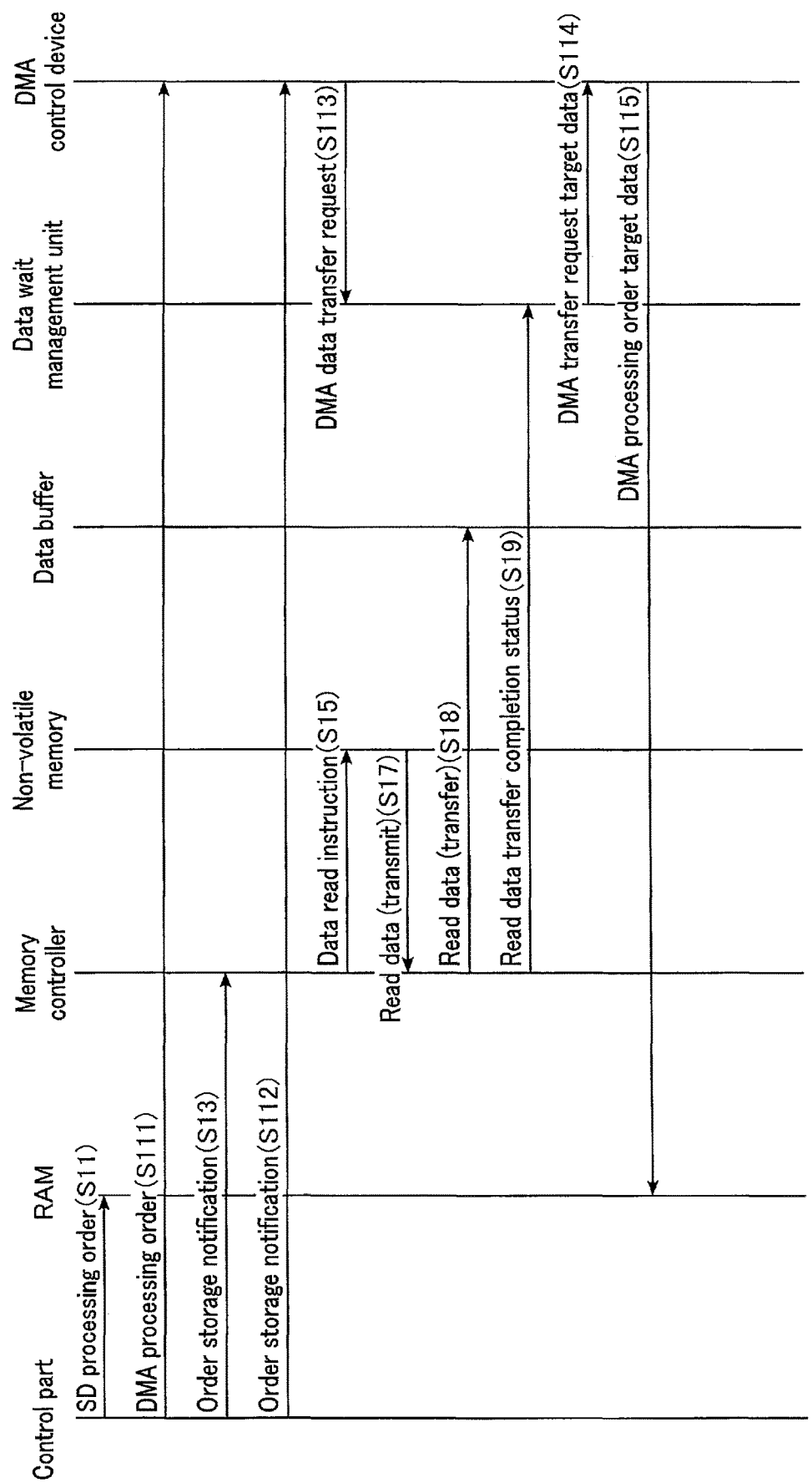
FIG. 54 is a sequence diagram of an operation in the storage system according to the eighth embodiment.

FIG. 54 is a sequence diagram of an operation in the storage system 1h according to the eighth embodiment. Specifically, FIG. 54 shows a process in which the control part 30h transfers data stored in the non-volatile memory 21 to the RAM 5. The operation of FIG. 54 is started when the control part 30h determines to transfer data stored in the non-volatile memory 21 to the RAM 5 (data buffer 61).

As shown in FIG. 54, S11 of the first embodiment is performed. That is, the control part 30h stores an SD processing order in the SD submission queue 35. The SD processing order includes information that designates a data read, a logical address LBA of DMA transfer request target data, a transfer destination buffer address BFADD, and a transfer target data size SIZE.

The control part 30h generates a DMA processing order, and stores the generated DMA processing order in the DMA setting register 72 in the DMA control device 14 (S111). The DMA processing order orders reading of data on the storage device 2 and execution of a process of transferring the read data to the data buffer 61 of the RAM 5. For that purpose, the DMA processing order includes a data buffer address in which DMA data transfer target data in the data buffer 23 is to be stored, size information of the DMA data transfer target data, and information (address information) indicating an address of an area in which the DMA data transfer target data in the data buffer 61 is to be stored. The address of the area in the data buffer 61 in which the DMA data transfer target data is to be stored may be referred to as a "destination buffer address bffadd3". The data buffer address in which DMA data transfer target data in the DMA processing order is to be stored is the transfer destination buffer address BFADD. The data size information in the DMA processing order is the transfer target data size SIZE.

After S11, then S13 of the first embodiment is performed. That is, the control part 30h transmits an order storage notification to the memory controller 22.

After S111, namely, when the control part 30h stores the DMA processing order in the DMA setting register 72, the notification part 31h transmits a notification (order storage notification) indicating that a DMA processing order has been stored in the DMA setting register 72 to the DMA control device 14 (S112). The order storage notification is received by the notification reception part 59 in the DMA control device 14. Through reception of the order storage notification, the DMA control device 14 learns that a new order has been stored in the DMA setting register 72.

After S112, namely, upon learning that an order has been stored in the DMA setting register 72, the DMA control device 14 transmits a DMA data transfer request based on the DMA processing order (S113). Specifically, the DMA controller 58 reads the DMA processing order from the DMA setting register 72, and receives the DMA processing order. The DMA controller 58 generates a required DMA data transfer request based on the DMA processing order. The generated DMA data transfer request includes the transfer destination buffer address BFADD and the transfer target data size SIZE. The DMA controller 58 transmits the generated DMA data transfer request (target DMA data transfer request) to the storage device 2.

The DMA data transfer request is received by the storage device 2. The DMA data transfer request is stored in the DMA request queue 44. The data wait control part 42 does not process the DMA data transfer request until an entry corresponding to the DMA data transfer request is returned as a hit, as in the first embodiment.

After S13, then S15 of the first embodiment is performed. That is, the memory controller 22 instructs the non-volatile memory 21 to perform a data read based on the SD processing order.

After S15, then S17, S18, and S19 of the first embodiment are performed. That is, the non-volatile memory 21 transmits read data based on a read command set to the memory controller 22 (S17). The memory controller 22 transfers the read data to the data buffer 23 (S18). The control part 32 in the memory controller 22 transmits a read data transfer completion status to the data wait management unit 40 (S19). One or more of S15, S17, and S18 can be performed in parallel with S113.

After S113, as in the first embodiment, the data wait control part 42 periodically retrieves an entry corresponding to the target DMA data transfer request from the memory completion queue 43. That is, the data wait management unit 40 executes the flow shown in FIG. 4. If an entry corresponding to the target DMA data transfer request is returned as a hit as a result of the execution of the flow, the data wait management unit 40 transfers data having a size of the transfer target data size SIZE in the transfer destination buffer address BFADD, namely, the DMA transfer request target data, to the DMA control device 14 (S114).

When the DMA control device 14 receives the DMA transfer request target data, the DMA controller 58 executes the continuation of the DMA processing order using the DMA transfer request target data. That is, the DMA controller 58 writes data of a target of the DMA processing order, namely, the DMA transfer request target data, into an area designated by the DMA processing order in the data buffer 61 by the RAM 5. Through completion of S115, the processing of FIG. 54 ends.

Figure 57:
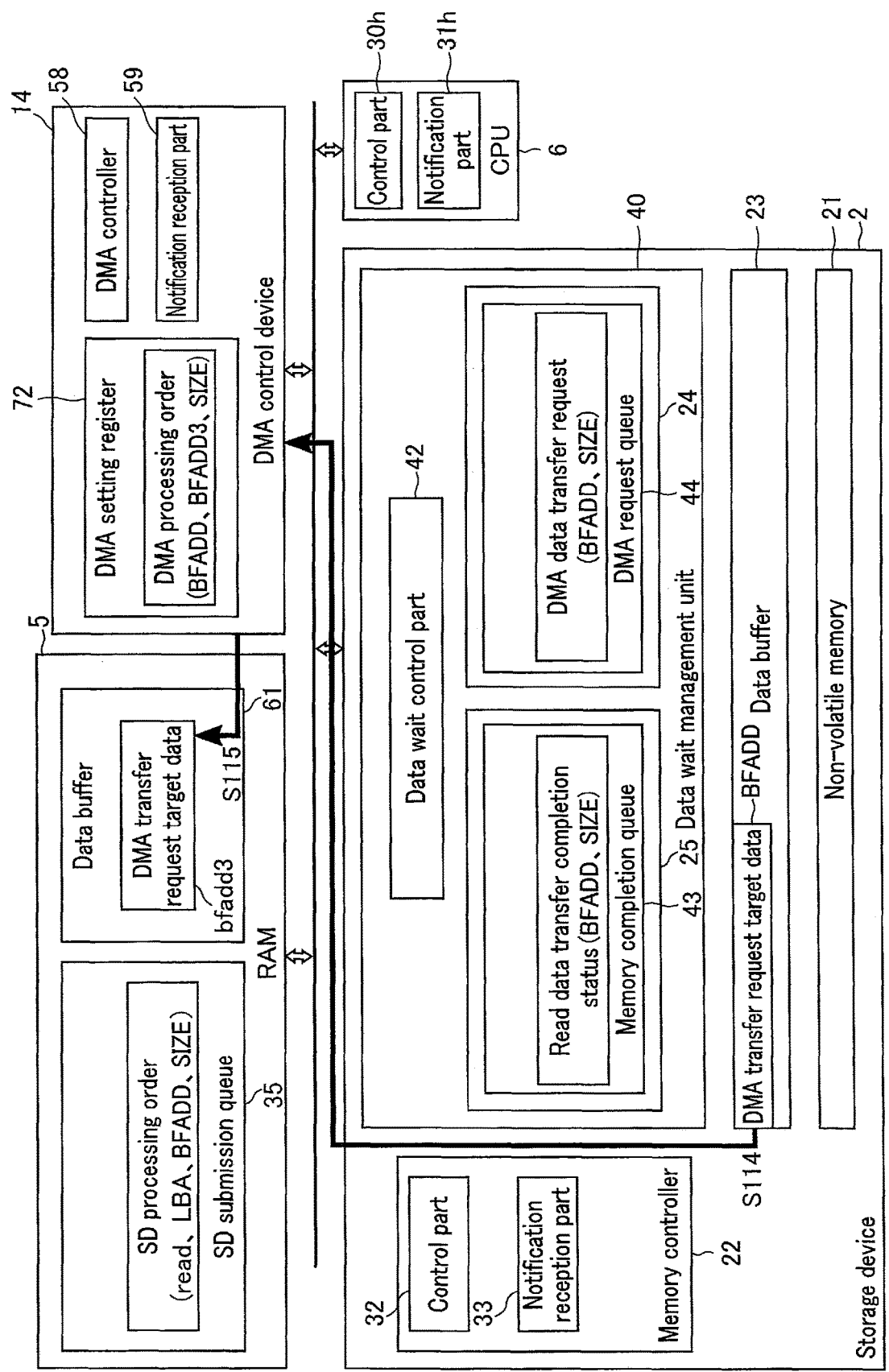
FIG. 57 shows data generated and transmitted and received during a process in the storage system according to the eighth embodiment.

FIGS. 55 to 57 show data generated and transmitted and received during a process in the storage system 1h according to the eighth embodiment, specifically, data generated and transmitted and received during the process of FIG. 54. FIGS. 55 to 57 show only data generated and transmitted and received in the process of FIG. 54. FIG. 56 shows a state subsequent to the state of FIG. 55, and FIG. 57 shows a state subsequent to the state of FIG. 56.

As shown in FIG. 55, the SD processing order is stored in the SD submission queue 35 (S11). The SD processing order includes a data read designation, the logical address LBA of DMA transfer request target data, the transfer destination buffer address BFADD, and the transfer target data size SIZE. The DMA processing order is stored in the DMA setting register 72 (S111). The DMA processing order includes at least the transfer destination buffer address BFADD, the destination buffer address bfadd3, and the transfer target data size SIZE. An order storage notification is transmitted to the memory controller 22 (S13).

As shown in FIG. 56, the order storage notification is transmitted to the DMA control device 14 (S112). The DMA data transfer request is stored in the DMA request queue 44 (S113). The DMA data transfer request includes the transfer destination buffer address BFADD and the transfer target data size SIZE. Under the control of the memory controller 22, the DMA transfer request target data is stored in an area of the transfer destination buffer address BFADD (S18). The read data transfer completion status is stored in the memory completion queue 43 (S19). The read data transfer completion status includes the transfer destination buffer address BFADD and the transfer target data size SIZE.

As shown in FIG. 57, the DMA transfer request target data is transferred to the DMA control device 14 under the control of the data wait management unit 40 (S114). Under the control of the DMA controller 58, the DMA transfer request target data is stored in the area of the destination buffer address bffadd3 (S115).

8.3. Advantages

According to the eighth embodiment, similarly to the first embodiment, the control part 30 is capable of notifying an order destination (DMA control device 14) that an order for generating a DMA data transfer request has been stored in the DMA setting register 72 before a completion status indicating that the DMA transfer request target data has been transferred to the data buffer 61 is transmitted. Also, the storage system 1h includes a data wait management unit 40, as in the first embodiment. It is thus possible to obtain the same advantages as can be obtained by the first embodiment. According to the eighth embodiment, even if a component (DMA control device 14) that generates a DMA data transfer request and a component including an area in which DMA transfer request target data is to be stored (e.g., RAM 5) are different, it is possible to obtain the same advantages as can be obtained by the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A storage system comprising:
a storage device including a memory and a memory controller;
a first device coupled to the storage device; and control circuitry configured to:
- store, in a first storing device, a first order that orders the storage device to read first data from the memory, wherein the storage device reads the first data from the memory based on the first order; and
- store a second order in a second storing device, the second order ordering the first device to transmit a first request to the storage device, the first request requesting the first data to be transferred to the first device, wherein the first device transmits the first request to the storage device based on the second order, wherein the first device is configured to start processing the second order before completion of the reading of the first data from the memory.

2. The system according to claim 1, wherein the storage device includes a data wait management circuitry configured to output the first request based on the data wait management circuitry storing status data that indicates that the reading of the first data has been completed.

3. The system according to claim 1, wherein the storage device includes a data wait management circuitry configured to receive the first request and store the first request.

4. The system according to claim 3, wherein the data wait management circuitry includes a first queue that stores the first request.

5. The system according to claim 4, wherein the data wait management circuitry is further configured to store first status data indicating that the reading of the first data has been completed.

6. The system according to claim 5, wherein the data wait management circuitry includes a second queue that stores the first status data.

7. The system according to claim 6, wherein the storage system includes a first data buffer, the first order orders that the first data read from the memory be stored in a first address of the first data buffer, and the first request includes the first address.

8. The system according to claim 7, wherein the storage device includes the first data buffer.

9. The system according to claim 7, wherein a set of the first storing device and the second storing device includes the first data buffer.

10. The system according to claim 6, wherein the data wait management circuitry includes a content addressable memory (CAM), and the CAM includes the second queue.

11. The system according to claim 10, wherein the data wait management circuitry includes a first-in first-out (FIFO) memory, and the FIFO memory includes the first queue.

12. The system according to claim 11, wherein the data wait management circuitry is configured to:
- instruct the CAM to output data through designation of a character string included in a head entry in the first queue as a retrieval key; and
- output the first request when the data is output.

13. The system according to claim 12, wherein the memory controller is further configured to output the first data from the storage device upon receiving the first request from the data wait management circuitry.

14. The system according to claim 6, wherein the data wait management circuitry includes a content addressable memory (CAM), and the CAM includes the first queue.

15. The system according to claim 14, wherein the data wait management circuitry is further configured to:
- instruct the CAM to output data through designation of a character string included in the second queue as a retrieval key; and
- output the first request when the data is output.

16. The system according to claim 14, wherein the memory controller is further configured to output the first data from the storage device upon receiving the first request from the data wait management circuitry.

17. The system according to claim 3, wherein the memory controller includes a second data buffer, the memory controller is further configured to store, in the second data buffer, second data read from the memory, and the data wait management circuitry is further configured to output the first request when the first request includes a character string included in second status data indicating that reading of data from the memory has been completed.

18. The system according to claim 17, wherein the memory controller is further configured to output the second data in the second data buffer from the storage device upon receiving the first request from the data wait management circuitry.

19. The system according to claim 17, wherein the storage device includes a first data buffer, and the data wait management circuitry is further configured to transfer the second data in the second data buffer to the first data buffer when the character string included in the second status data is not included in the first request.

20. A storage system comprising:
- a storage device including a memory and a memory controller;
- a first device coupled to the storage device;
- a first storing device coupled to the storage device and the first device;
- a data buffer coupled to the storage device and the first device; and
- control circuitry configured to:
  - store a first order in the first storing device, the first order ordering the storage device to read first data from the memory, wherein the storage device reads the first data from the memory based on the first order; and
  - store a second order in the first device, the second order ordering the first device to transmit a first request to the storage device, the first request requesting the first data to be transferred to the data buffer, wherein the first device transmits the first request to the storage device based on the second order, wherein the first device is configured to start processing the second order before completion of the reading of the first data from the memory.

* * * * *